US006515761B2

(12) United States Patent
Aoto et al.

(10) Patent No.: US 6,515,761 B2
(45) Date of Patent: Feb. 4, 2003

(54) CAMERA HAVING A PRINTER WITH A PAPER FEED DEVICE USING A VIBRATION ACTUATOR

(75) Inventors: Kazuaki Aoto, Yachiyo (JP); Shigeyoshi Fujie, Mito (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/172,250

(22) Filed: Oct. 14, 1998

(65) Prior Publication Data

US 2002/0089678 A1 Jul. 11, 2002

(30) Foreign Application Priority Data

Oct. 14, 1997 (JP) ............................................ 9-280415
Oct. 17, 1997 (JP) ............................................ 9-285535

(51) Int. Cl.[7] ................................................ G06K 15/00
(52) U.S. Cl. ......................................... 358/1.6; 358/1.1
(58) Field of Search ........................ 358/1.1, 296, 1.13, 358/1.6, 1.15, 1.16, 1.17, 531, 471; 710/1, 7, 8, 14, 15, 20, 23, 52, 62, 64, 72, 73

(56) References Cited

U.S. PATENT DOCUMENTS 4,262,301 A 4/1981 Erlichman ..................... 358/6
5,606,420 A * 2/1997 Maeda et al. ............... 358/296

* cited by examiner

*Primary Examiner*—Arthur G. Evans
(74) *Attorney, Agent, or Firm*—Staas & Halsey LLP

(57) ABSTRACT

An electronic camera having a printer with a portable printing function and a sheet feed device suitable for use with the printer. The electronic camera includes an image storage device it photoelectrically convert an optical image to picture data, a first memory to store picture data, and a printer unit to print the picture data. The printed picture data may be fed by a sheet drive mechanism having vibration member and a piezoelectric element fixed to the vibration member and expanding and contracting according to an applied voltage, and a driver which applies to the piezoelectric element a voltage including an alternating component, and at least one projection formed on the vibration member in a position in the neighborhood of a peak of the standing wave, and a sheet separation unit formed on the vibration member, outside the range of the standing wave. The sheet separation unit has a greater thickness than the thickness of the vibration member in the range of the standing wave, and includes a slit formed in the sheet separation unit. The slit has a thickness greater than the thickness of one sheet of paper being fed and smaller than the thickness of two sheets.

13 Claims, 45 Drawing Sheets

CAMERA HAVING A PRINTER WITH A PAPER FEED DEVICE USING A VIBRATION ACTUATOR

CROSS-REFERENCE TO RELATED APPLICATIONS

This application is based upon and claims priority of Japanese Patent Application Nos. 09-280415 filed Oct. 14, 1997 and 09-285535 filed Oct. 17, 1997, the contents being incorporated herein by reference.

BACKGROUND OF THE INVENTION

1. Field of the Invention

The present invention relates to an electronic camera having a printer with a paper feed device using a vibration actuator. Furthermore, the present invention is related to a paper feed device, suitable for use in conjunction with an electronic camera, which delivers recording sheets one at a time (seriatim) from a stack of recording sheets maintained in a layered state in a fixed position, and, more particularly, the present invention relates to a paper feed device having an ultrasonic motor to forward recording sheets.

2. Description of the Related Art

In conventional electronic cameras, such as shown in FIG. 44, printing of picture data photographed with the electronic camera 1 is performed by bringing the electronic camera 1 to a place where a printer 3 is set up, connecting the electronic camera 1 to the printer 3 using a cable 5, and transferring the picture data within the electronic camera 1 to the printer 3.

As shown in FIG. 44, the conventional printer 3 includes a central control circuit 7, a control panel 9, and a printing mechanism 11. A print lamp 9*a* and a print button 9*b* are arranged on the control panel 9 to control printing. The printing mechanism 11 is connected to the central control circuit 7, and photosensitive, pressure-sensitive paper 13 is stored in the printing mechanism 11. A paper ejection aperture 3*b* for ejection of the photosensitive, pressure-sensitive paper 13 which has been printed is formed in a wall 3*a* of the printer 3, adjacent to the printing mechanism 11.

In the operation of the printer 3, picture data is transmitted to the central control circuit 7 from the electronic camera 1 via the connecting cable 5. After the picture data has been transferred to the central control circuit 7, the picture data is temporarily stored by the central control circuit 7, and the print lamp 9*a* is lighted. Next, when pressing of the print button 9*b* is detected by the central control circuit 7, the temporarily stored picture data is sent from the central control circuit 7 to the printing mechanism 11. Then, the printing mechanism 11 is controlled by the control circuit 7, and the picture data is printed on the photosensitive, pressure-sensitive paper 13 by the printing mechanism 11. The printed photosensitive, pressure-sensitive paper 13 is ejected from the ejection aperture 3*b* of the printer 3.

Nevertheless, in the conventional electronic camera 1 and printer 3, the electronic camera and the printer are not made integral because of the large size of the printer 3. Because of the inability to make the electronic camera 1 and printer 3 integral, it is difficult to print the picture data photographed with the electronic camera on the spot. Moreover, in the conventional printer 3, the central control circuit 7 controls only the printer itself and does not, for example, control camera functions such as release and the like of the electronic camera 1 from the printer 3.

Furthermore, a conventional printer, or the like device, which performs recording on recording sheets (generally paper) of fixed size, normally maintains the recording sheets which are not yet recorded in a stacked state in a fixed cassette or tray. The recording sheets are then delivered in turn from the top of the stack, and are sent to a recording unit. FIG. 60 illustrates a conventional paper feed device. As shown in FIG. 60, a plurality of recording sheets 110 having a predetermined size are maintained in a stacked state on a paper sheet tray 101 which is fixed in a predetermined position. One end of the recording sheets 110 rides on a lifter plate 104.

A compression coil spring 105 is arranged between the liter plate 104 and the paper feed tray 101. The neighborhood of one end of the recording sheets 110 is lifted up in the thickness direction by the lifter plate 104. A paper feed roller 111 is disposed upward of the neighborhood of the end of the recording sheets 110 lifted by the lifter plate 104, in a position opposite the compression coil spring 105, with the recording sheets 110 sandwiched between the paper feed roller 111 and the compression coil spring 105. The paper feed roller 111 is supported for free rotation, and is coupled to an electric motor 112 via a belt 113. When the electric motor 112 is driven, the paper feed roller 111 rotates in the direction of the arrow in FIG. 60.

As shown in FIG. 60, when a paper feed operation is performed, the paper feed roller 111 is in a position in contact with the uppermost recording sheet 110*a*. When the electric motor 112 is driven, the paper feed roller 111 is rotated via the belt 113, and a force arises to drive the recording sheet 110.

The paper feed roller 111 consists of rubber having a high wear coefficient. Accordingly, the frictional force operating between the paper feed roller 111 and the recording sheet 110 is higher than the frictional force between mutually stacked recording sheets 110. Because of these differences in frictional force, when the paper feed roller 111 rotates, the uppermost recording sheet 110*a* in contact with the paper feed roller 111 is delivered by frictional force in the direction of the arrow A in FIG. 16.

In the conventional paper feed device shown in FIG. 16, the paper feed roller 111, belt 113 and electric motor 112 are necessary components. However, these elements have a comparatively large weight. Moreover, the movable parts of the conventional paper feed device, such as the electric motor 112 and the like, generate noise when they are driven. Furthermore, because it is possible that the belt 113 will break due to fatigue when used for a long time, the belt 113 becomes a source of breakdown of the paper feed device.

SUMMARY OF THE INVENTION

It is an object of the present invention to solve the above-noted problems of the conventional electronic camera, and to provide an electronic camera including a printer having a portable printing function, and which can control camera functions from the printer side.

It is another object of the present invention to provide a paper feed device, suitable for use with an electronic camera, having a smaller size, lighter weight, reduced noise, and improved durability compared to prior art paper feed devices.

Objects and advantages of the present invention are achieved in accordance with embodiments of the present invention with a portable electronic camera comprising a camera unit including an image conversion and storage device to photoelectrically convert an optical image to picture data, and a first memory to store the picture data; and a printer unit including a print device to print the picture data.

In accordance with embodiments of the invention, the camera unit includes a first connection device to connect the camera unit and the printer unit in a mutually detachable state, and a first communication device to communicate the picture data and control information between the camera unit and the printer unit; and the printer unit includes a second connection device to connect the camera unit and the printer unit in a mutually detachable state, and a second communication device to communicate the picture data and the control information between the camera unit and the printer unit.

In accordance with embodiments of the present invention, the first connection device is in a position on a side opposite the optical image, and the second connection device is in a position facing the optical image.

In accordance with embodiments of the present invention, the printer unit includes a display to display the picture data.

In accordance with embodiments of the present invention, the camera unit includes a first release device to store in the first memory the picture data photoelectrically converted by the image conversion and storage device, and the printer unit includes a second release device to store in the first memory, the picture data photoelectrically converted by the image conversion and storage device.

In accordance with embodiments of the present invention, the first release device is in a position separated from a center of the camera unit, and the second release device is in a position opposite the first release device with respect to the center of the camera unit.

In accordance with embodiments of the present invention, when at least one of the first release device and the second release device operates, the camera unit stores the picture data in the first memory.

In accordance with embodiments of the present invention, the electronic camera further comprises an instruction device to instruct commencement of printing of the picture data by the printer device.

In accordance with embodiments of the present invention, the instruction device is opposite to the second release device with respect to the center of the camera unit.

In accordance with embodiments of the present invention, the camera unit further comprises a selection device to select an operating mode, and the storing of the picture data in the first memory and the commencement of printing are controlled by the operation of the second release device and the instruction device according to the operating mode selected by the selection device.

In accordance with embodiments of the present invention, when the operating mode selected by the selection device is a photographic mode, and when the second release device and the instruction device are actuated together, the camera unit stores the picture data in the first memory, and the printer unit prints the picture data stored in the first memory.

In accordance with embodiments of the present invention, when the instruction device is actuated, and the operating mode selected by the selection device is a playback mode, the printer unit prints the picture data.

In accordance with embodiments of the present invention, when the instruction device is actuated, and the operating mode selected by the selection device is a photography mode, the printer unit prints the picture data stored in the first memory.

In accordance with embodiments of the present invention, the electronic camera further comprises a display to display the picture data.

In accordance with embodiments of the present invention, the display device displays the picture data stored in the first memory.

In accordance with embodiments of the present invention, the electronic camera further comprises a second memory to which the picture data stored in the first memory is transferred, and the display displays the picture data stored in the second memory.

In accordance with embodiments of the present invention, the printer unit includes a release device, and stores the picture data photoelectrically converted by the image conversion and storage device in the first memory according to the operation of the release device.

In accordance with embodiments of the present invention, the printer unit receives photosensitive, pressure-sensitive paper capable of paper feeding, and further comprises a detachable storage unit having a light screening door to screen light from the photosensitive, pressure-sensitive paper; a paper feed unit to feed the photosensitive, pressure-sensitive paper from the storage unit; a conveyor unit to convey the photosensitive, pressure-sensitive paper fed by the paper feed unit; an exposure unit to expose a latent image in the photosensitive, pressure-sensitive paper conveyed by the conveyor unit; and a development unit to compress the exposed photosensitive, pressure-sensitive paper.

In accordance with embodiments of the present invention, the printer unit comprises a first ultrasonic motor which vibrates at a frequency above the audible frequency.

In accordance with embodiments of the present invention, the first ultrasonic motor includes a vibration member having a projection of about rectangular shape contacting the photosensitive, pressure-sensitive paper at one surface, and a piezoelectric element adhered to the vibration member, wherein the projection contacts the photosensitive, pressure-sensitive paper, and feeds the photosensitive, pressure-sensitive paper.

In accordance with embodiments of the present invention, the paper feed unit includes a mechanism to open and close the light-screening door according to the detachment of the detachable storage unit.

In accordance with embodiments of the present invention, the conveyor unit includes a first roller which is freely rotatable, and a second roller which is driven in rotation, with the photosensitive, pressure-sensitive paper interposed between the first roller and the second roller.

In accordance with embodiments of the present invention, the development unit includes a second ultrasonic motor which vibrates at a frequency above the audible frequency, and a pressing member which compresses the photosensitive, pressure-sensitive paper together with the second ultrasonic motor.

In accordance with embodiments of the present invention, the second ultrasonic motor comprises a vibration member having a projection extending in a direction of motion of the photosensitive, pressure-sensitive paper and in a direction at right angles to the direction of motion of the photosensitive, pressure sensitive paper, and a piezoelectric element adhered to the vibration member.

In accordance with embodiments of the present invention, the conveyor unit and the development unit are shorter than about the length of the direction of motion of the photosensitive, pressure-sensitive paper, and the exposure unit and the development unit are separated by a distance longer than the length in the direction of motion of an exposed latent image.

In operation of the electronic camera having a printer in accordance with the present invention, optical images are photoelectrically converted to electrical signals, the electrical signals are photoelectrically converted to picture data, and the picture data of the optical image is stored. The picture data is printed by the printing device of the printer unit.

The camera unit and the printer unit are connected together by the first connection device of the camera unit and the second connection device of the printer unit, and are freely detachable.

Moreover, the picture data and control information are transmitted by the first communication device of the camera unit and the second communication device of the printer unit, and the camera unit and the printer unit are mutually controllable.

The first connection device is located on a side opposite the position of the optical image side of the camera, and the second connection device is located in a position on an optical image side of the printer unit.

The electronic camera includes a display device in the printer unit which displays the picture data.

The first release device provided in the camera unit, and the second release device provided in the printer unit cause the picture data photoelectrically converted by the image conversion device to be stored in the first memory. The first release device and the second release device are correspondingly symmetrically arranged in positions separated from the center of the camera, and a release operation is possible from either the left-hand side or the right-hand side of the center of the camera. The picture data is stored in the first memory by the operation of at least one of the first release device and the second release device.

The electronic camera includes an instruction device in the printer unit to instruct the printing of the picture data. The instruction device and the second release device are arranged in correspondingly symmetrical positions, separated from the center of the camera unit.

The electronic camera includes a selection device in the camera unit to select an operating mode, and the storage of the picture data in the first memory is controlled by the operation of the second release device and the instruction device according to the operating mode selected by the selection device. Moreover, the commencement of printing of the picture data is controlled.

In operation of the electronic camera, when the operating mode selected by the selection device is the photographic mode, and when the second release device and the instruction device are operated together, by the control of the camera unit the picture data is stored in the first memory, and by the control of the printer unit the picture stored in the first memory is printed.

When the operating mode selected by the selecting device is the photographic mode, and when the instruction device is operated, the picture data is printed by control of the printer unit.

In operation of the electronic camera, when the operating mode selected by the selection device is the photographic mode, and when the instruction device is operated, the picture data is stored in the first memory by control of the camera unit, and the picture data stored in the first memory is printed by control of the printer unit.

The printer unit includes a display to display the picture data, and the picture data stored in the first memory is displayed by the display.

In the electronic camera, the printer unit includes the second memory, and picture data transmitted from the first memory to the second memory is displayed in the display.

In the electronic camera, the printer unit includes a release device, and photoelectrically converted picture data is stored in the first memory by the operation of the release device.

In the electronic camera, the housing unit which receives the photosensitive, pressure-sensitive paper includes a light screening door to screen the photosensitive, pressure-sensitive paper from light out of the housing unit, and is detachably arranged in the printer. Moreover, the photosensitive, pressure-sensitive paper received in the storage unit is fed toward the conveyor unit by the paper feed unit. Furthermore, the photosensitive, pressure-sensitive paper is forwarded at an approximately constant speed by the conveyor unit toward the exposure unit, and a latent image on the photosensitive, pressure-sensitive paper is exposed to light. Then, the photosensitive, pressure-sensitive paper with the latent image which has been exposed to light is forwarded to the development unit, and coloring of the latent image is performed by the development unit.

In the electronic camera, the paper feed unit has a first ultrasonic motor which vibrates at a frequency higher than an audible frequency, and the photosensitive, pressure-sensitive paper is forwarded by the first ultrasonic motor, without the generation of noise.

In the electronic camera, the first ultrasonic motor comprises a vibration member including a piezoelectric element and an approximately rectangular parallelepipedal projection, attached to the piezoelectric element, with one face contacting the photosensitive, pressure-sensitive paper.

The photosensitive, pressure-sensitive paper is reliably forwarded, without being developed, by the surface of the rectangular parallelepipedal unit which vibrates ultrasonically.

In the electronic camera, the light screening door opens and closes according to the detachment of the storage unit, and exposure of the housing unit to outside light is prevented.

In the electronic camera, the conveyor unit includes a first roller which is freely rotatable, and a second roller which is driven in rotation, and the photosensitive, pressure-sensitive paper is interposed between the first roller and the second roller. The photosensitive, pressure-sensitive paper is then reliably forwarded at an approximately constant speed into the exposure unit.

In the electronic camera, the development unit includes a second ultrasonic motor which vibrates at an above audible frequency, and a pressing unit. Coloring of the latent image of the photosensitive, pressure-sensitive paper is performed by the second ultrasonic motor and the pressing unit, and simultaneously the printed photosensitive, pressure-sensitive paper is ejected from the development unit.

In the electronic camera, the second ultrasonic motor comprises a vibration member having a piezoelectric element and a projection attached to the piezoelectric element, extending in a direction at right angles to the movement direction of the photosensitive, pressure-sensitive paper. The coloring of the latent image of the photosensitive, pressure-sensitive paper is reliably performed, and simultaneously the printed photosensitive, pressure-sensitive paper is ejected from the development unit by of the projection which vibrates ultrasonically.

In the electronic camera, the interval between the conveyor unit and the development unit is shorter than the length of the region of the movement direction of the photosensitive, pressure-sensitive paper. By making the interval between the conveyor unit and development unit shorter than the length of the region of the movement direction of the photosensitive, pressure sensitive paper, the photosensitive, pressure-sensitive paper within the conveyor does not stop within the printer unit, and is reliably movable.

Moreover, the interval between the exposure unit and the development unit is made longer than the length in the movement direction of the exposure region of the photosensitive, pressure-sensitive paper. During exposure of the photosensitive, pressure-sensitive paper to light, the photosensitive, pressure-sensitive paper moves only by the conveyor unit, and is moved at a stable, approximately constant speed.

Objects and advantages of the present invention are achieved with a recording sheet feed device, comprising: a vibration member; a piezoelectric element fixed to the vibration member, the piezoelectric element expanding and contracting according to an applied voltage; a driver to apply a voltage to the piezoelectric element, the voltage including an alternating component; a projection formed on the vibration member in a neighborhood of a peak of a standing wave generated in the vibration member, wherein the vibration member includes first and second mutually opposing surfaces in a thickness direction of the vibration member outside the range of the standing wave, the first and second mutually opposing surfaces forming a slit, and a distance between the first and second mutually opposing surfaces is larger than the thickness of one sheet being fed and smaller than the thickness of two sheets being fed, and wherein the first surface of the slit, a surface of the projection, and the second surface of the slit, are arranged in about the same position with respect to a thickness direction of the vibration member.

The paper feed device in accordance with embodiments of the present invention may comprise a tapered portion formed on a sheet entry side of the slit, the tapered portion including an aperture having a thickness larger than the thickness of two recording sheets being fed.

In accordance with embodiments of the present invention, the tapered portion includes two mutually opposite surfaces in a thickness direction of the vibration member, wherein a surface of the projection, and one of the two mutually opposite surfaces of the tapered portion are arranged in about the same position with respect to the thickness direction of the vibration member.

The vibration member of the paper feed device in accordance with embodiments of the present invention may further comprise a sheet separation unit outside the range of the standing wave, and having a thickness larger than the thickness of the vibration member in the range of the standing wave.

In accordance with embodiments of the present invention, one surface of the sheet separation unit may be arranged in about the same position with respect to the thickness direction as the surface of the projection.

In accordance with embodiments of the present invention, the projection is formed in the vibration member with respect to an axial direction at right angles to the movement direction of the sheet which is fed, or in the neighborhood of the center of the sheet.

The paper feed device in accordance with embodiments of the present invention may further comprise a plurality of projections, wherein the respective projections are formed in a neighborhood of respective positions through which two axes pass, and wherein the distance from the vibration member to the sheet which is fed is equal with respect to the axial direction at right angles to the movement direction of the sheet which is fed, or the center of the sheet.

The paper feed device in accordance with embodiments of the present invention may comprise a plurality of projections formed on the vibration member in positions in a neighborhood of respective top parts of two peaks of the standing wave in the vibration member.

The paper feed device in accordance with embodiments of the present invention may comprise a movable pressure member arranged in a thickness direction of a fed recording sheet, in a position opposite to the projection of the vibration member, and sandwiching the fed recording sheet.

In accordance with embodiments of the present invention, a portion of the movable pressure member contacting the fed recording sheet has a flat surface.

In accordance with embodiments of the present invention, a portion of the movable pressure member contacting the fed recording sheet includes a roller which revolves freely.

In accordance with embodiments of the present invention, a portion of the movable pressure member contacting the sheet includes a sheet material having a curved surface projecting in the direction of the fed sheet.

The paper feed device in accordance with embodiments of the present invention may further comprise a spherical member which revolves freely and is arranged in a portion of the pressure member contacting the recording sheet.

In accordance with embodiments of the present invention, when electric power including an alternating component is applied to the piezoelectric element, the piezoelectric element is repeatedly expanded and contracted according to the applied electric power. The repetition of expansion and contraction generates vibration in the vibration member to which the piezoelectric element is fixed. The vibration arising in the vibration member includes standing waves, and a vibration of large amplitude occurs at a specific position on the vibration member. Because a projection is formed at the specific position on the vibration member, a portion of the projection has a comparatively large vibration such that an elliptical locus is described. If the surface of a recording sheet contacts and pushes against the projection on the vibration member, the recording sheet moves in a specific direction, according to the vibrational motion of the projection, as a result of the frictional force operating between the recording sheet and the projection. That is, the recording sheet in contact with the projection is delivered in a specific direction.

If the frequency of the alternating component of the electric power applied to the piezoelectric element is higher than a range which is audible to humans, the frequency of the vibration arising in the sheet drive mechanism is high, and noise perceptible to human ears is negligible.

Since an adhesion force resulting from frictional force or static electricity acts between the stacked plurality of sheets, when a force in the feed direction is applied to the uppermost sheet, it is possible for two or more superposed sheets to be delivered at the same time, in the superposed state. However, because the thickness of the slit is greater than the thickness of one (1) sheet being fed, but less than the thickness of two (2) sheets, even when delivering plural sheets in an unchanged superposed state, only one sheet passes through the slit. More particularly, the superposed sheets are separated when passing through the slit and delivered one at a time. Since an electric motor, paper feed roller and belt are not necessary with the paper feed mechanism in accordance with the present invention, smaller size and lighter weight are possible, the generation of noise is reduced, and durability is improved.

Because the thickness of the sheet entry side aperture of the slit is greater than two times the thickness of the sheets being fed, it is possible for two (2) or more sheets to enter the aperture in an unchanged superposed state. However, because the thickness of the tapered portion of the slit gradually decreases accompanying the forward travel of the sheets, when two (2) or more sheets have entered the aperture in the unchanged superposed state, one sheet comes into contact with the inclined surface of the tapered portion, and the entry of more than one sheet at a time is regulated. Accordingly, two (2) or more superposed sheets are separated by the tapered portion, and only one sheet passes through the slit.

Normally, the sheet to be fed is an uppermost sheet, and the projection contacting the surface of the sheet to be fed applies a drive force to the uppermost sheet. However, since the surface of one portion of the tapered portion is arranged in the same position with respect to the thickness direction as the surface of the top portion of the projection, the uppermost sheet is delivered by the projection, and can enter the slit.

Since the thickness of the sheet separation unit is large, vibration does not occur. Accordingly, if the delivered sheet is guided in the sheet separation unit, the sheet can be reliably delivered in a predetermined direction.

Because one surface of the sheet separation unit is arranged in about the same position, with respect to the thickness direction as the surface of the top part of the projection, one sheet delivered by the projection can be guided by the sheet separation unit.

For example, with respect to the direction of the axis (termed hereinbelow "width direction") at right angles to the direction of movement of the fed sheet, when the positions of the sheet and the vibration member are combined, such that the center position of the vibration member passes through the center of the sheet, when forming the projection, in the neighborhood of the center position of the vibration member, the drive force to deliver a sheet is applied to the center of the sheet. In this case, there is a load with respect to the drive force, the weight and static frictional force of the sheet become about equal to the right and left (i.e., the width direction) of the position where the drive force is applied. Accordingly, it is difficult to change the direction of travel of the sheet, and the sheet travels straight in the direction of the applied drive force.

For example, when the position of the sheet and the vibration member combine, such that the center of the sheet passes through the center position of the vibration member, with respect to the width direction of the sheet, the distance from the center of the vibration member is equal, in the neighborhood of the position through which two axes respectively pass, when plural projections are formed, the drive force to deliver a sheet is uniformly applied to the right and left with respect to the center of the sheet. In this case, there is a load with respect to the drive force, the weight and static frictional force of the sheet become about equal to the right and left (width direction) with respect to the sheet center. Accordingly, it is difficult to change the direction of travel of the sheet, and the sheet travels straight in the direction of the applied drive force.

Moreover, the paper feed operation can be performed with good efficiency because drive forces are applied to the sheet in a plurality of respective positions, applying a comparatively large force to the sheet.

The standing wave includes portions where the amplitude of the vibration is large (antinodes) and where the amplitude of vibration is small (nodes). The vibration waveform of 2.5 waves appears within the range in which the standing wave arises on the vibration member. Because the amplitude of the vibration is large, by arranging the projections in the neighborhood of the top portions of two peaks of the vibration waveform, the sheet can be more efficiently moved.

By moving the compression member in the thickness direction to compress the sheet, the state of contact of the sheet and the projection can be adjusted.

Because the portion of the compression member which contacts the sheet has a flat plate form, when a plurality of projections are arranged in mutually spaced-apart positions, the state of contact of the plurality of projections and the sheet can be made uniform.

Because the portion of the compression member which contacts the sheet is a freely rotatable roller, among the sheets which contact the roller in a stacked state, the last sheet, which is positioned lowermost, moves easily. That is, the last sheet remaining on the tray can be delivered.

Because the portion of the compression member which contacts the sheet is a curved surface which projects toward the sheet, the friction between the curved surface and the sheet which contacts the curved surface is small. That is, the last sheet remaining in the tray can be delivered.

Because the portion of the compression member which contacts the sheet is a freely rotatable spherical surface, among the sheets which contact the spherical surface in a stacked state, the last sheet, which is positioned lowermost, moves easily. That is, the last sheet remaining on the tray can be delivered.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
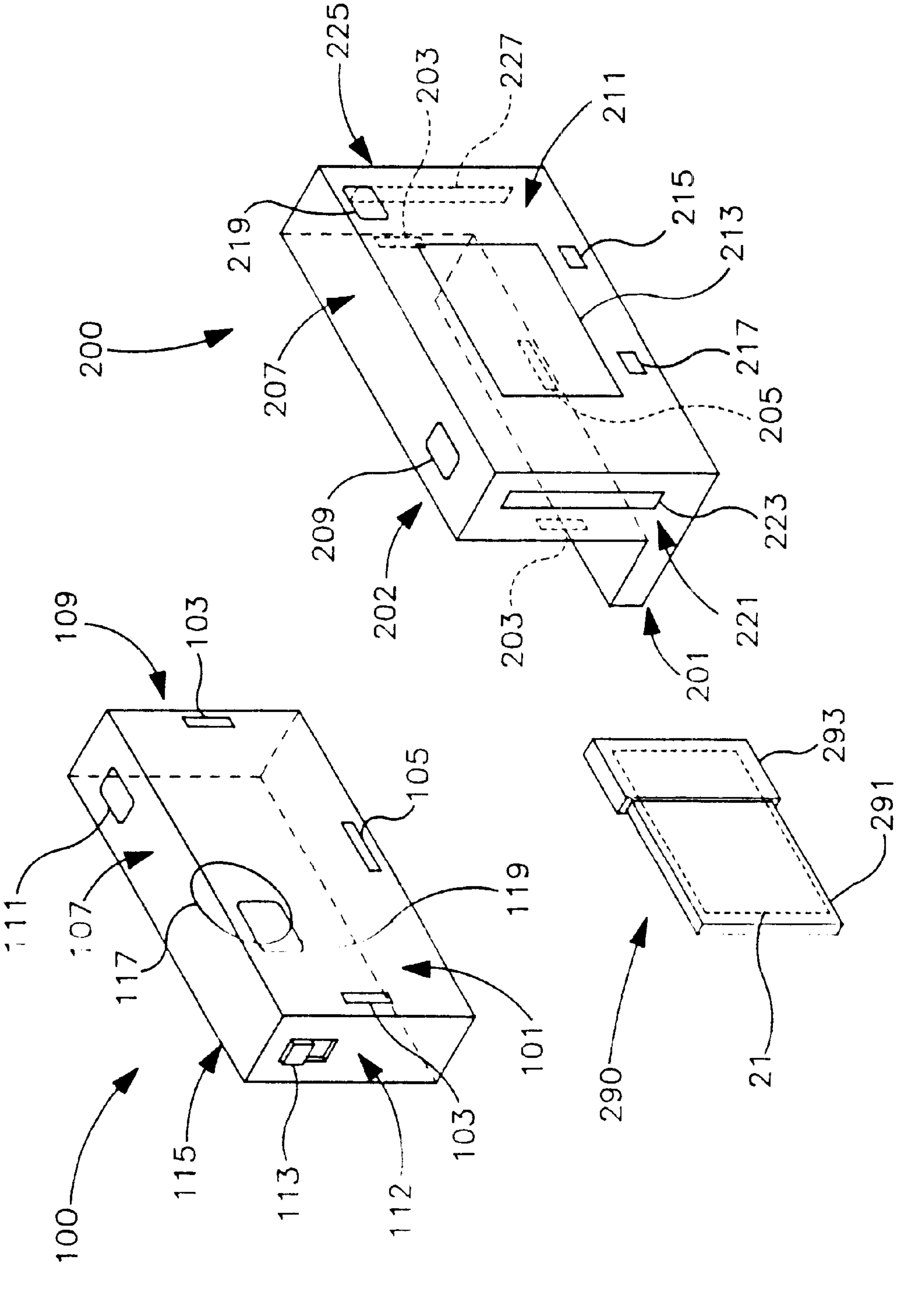
FIG. 1 is an exploded, oblique diagram illustrating an electronic camera having a printer in accordance with a first embodiment of the present invention.

Reference will now be made in detail to the preferred embodiments of the present invention, examples of which are illustrated in the accompanying drawings, wherein like reference numerals refer to like elements throughout.

First Preferred Embodiment

Figure 2:
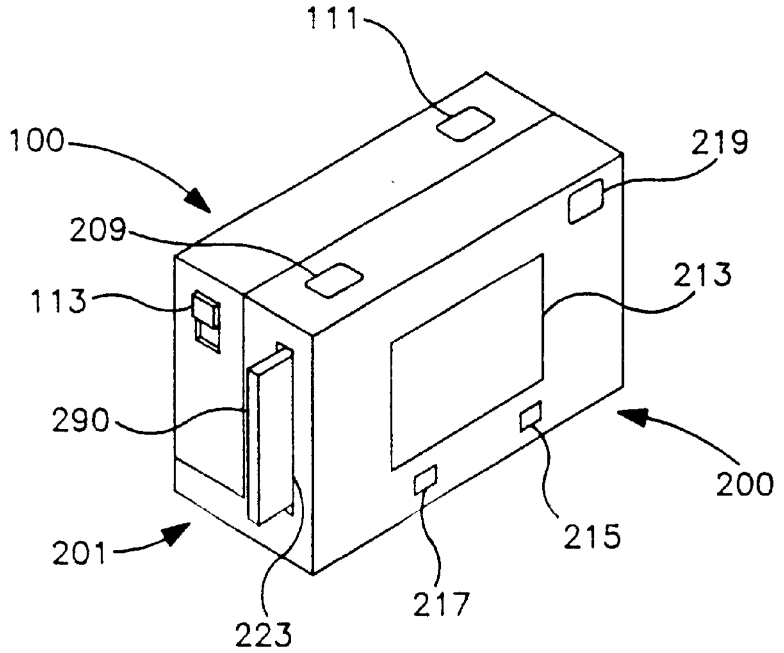
FIG. 2 is an oblique diagram of the camera shown in FIG. 1 in accordance with the first embodiment of the present invention.

FIGS. 1 and 2 illustrate an electronic camera having a printer in accordance with a first embodiment of the present invention.

FIG. 1 is an exploded oblique diagram illustrating the external appearance of an electronic camera having a printer in accordance with the first embodiment of the present invention. As shown in FIG. 1, the electronic camera comprises a camera unit 100, and a printer unit 200. The printer unit includes a freely detachably storage unit 290. The storage unit 290 comprises a cassette body 291 and a light screening door 293. A photosensitive, pressure-sensitive paper 21 is received in a laminated state in the cassette body 291.

The photosensitive, pressure-sensitive paper 21 is formed in a photographic service size or about a visiting card size. The storage cassette 290 is preferably formed of an opaque material, for example, hard paper or sheet metal.

FIG. 2 is an oblique view showing the external appearance of the camera unit 100 and printer unit 200 in an assembled state in accordance with the first embodiment of the present invention. As shown in FIG. 2, the camera unit 100 and printer unit 200 are a portable size which can be handled with one hand or both hands. The camera unit 100 is positioned on an L-shaped angle portion 201 of the printer unit 200.

Connectors 103, 103 are formed on the back surface 101 of the camera unit 100 positioned toward the printer unit 200, in order to detachably connect the camera unit 100 to the printer unit 200. The connectors 103, 103 comprise, for example, permanent magnets or the like.

An infrared interface 105 is built into the back surface 101 of the camera unit 100 to communicate picture data and control information to the printer 200. A first release button 111 is arranged in a top surface 107 of the camera unit 100, toward a right side surface 109. The first release button 111, when the electronic camera is held with both hands, is disposed in a position easily operated with the right hand. A mode switch 113 is arranged in a left side surface 112 opposite to the right side surface 109 of the camera unit 100.

In accordance with the first embodiment of the present invention, the mode switch 113 selects either a photographic mode in which an optical image of a subject is photographed, or a playback mode which provides a playback display of an optical image which has been photographed.

A photographic lens 117 is arranged in a front surface 115 of the camera unit 100 on a side remote from the printer unit 200. An optical viewfinder 119 is arranged in the back surface 101 of the camera unit 100. The optical viewfinder 119 is used when the camera unit 100 and the printer unit 200 are not connected and an optical image is photographed with the camera unit 100 independently. When the camera unit 100 and the printer unit 200 are connected, the optical viewfinder 119 is in a position covered by the printer unit 200. Accordingly, when the camera 100 and the printer 200 are connected, the optical viewfinder 119 does not fulfill the function of a viewfinder.

Figure 3:
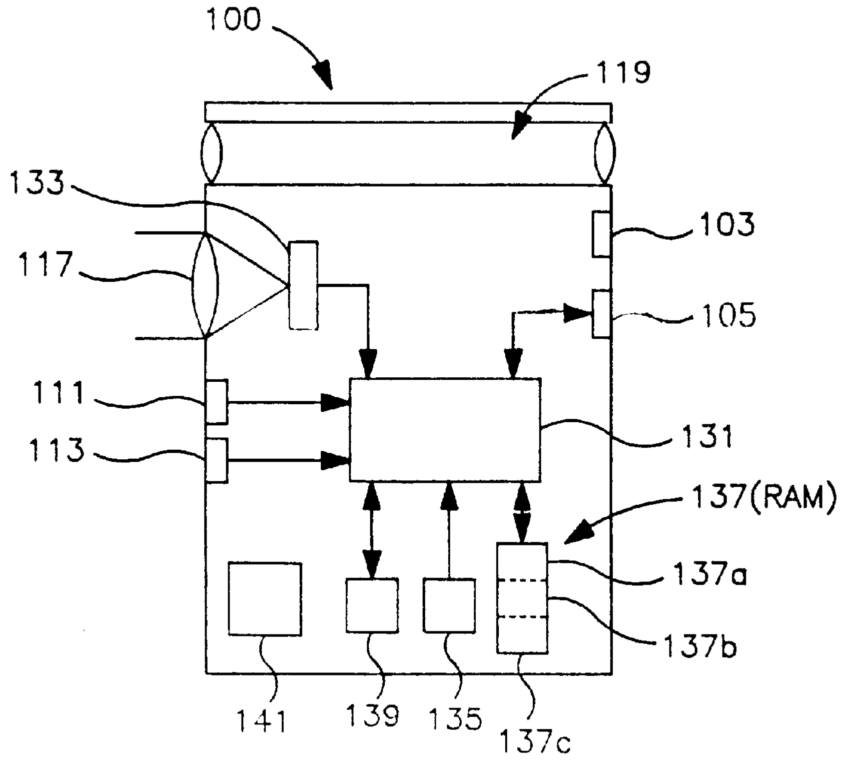
FIG. 3 is a block diagram of the camera unit in accordance with the first embodiment of the present invention.

FIG. 3 is a block diagram of the camera unit 100 in accordance with the first embodiment of the present invention. As shown in FIG. 3, the camera unit 100 includes a central control circuit 131, an image storage circuit 133, a ROM 135, a RAM 137, and an interface unit 139 which connects to an IC card and the like, built into the camera unit 100.

The image storage circuit 133 comprises, for example, a CCD type image element and an A/D converter circuit. The image storage circuit 133 has the function of forming image data, which is a digital signal, by photoelectrically converting an optical image imaged on the image storage circuit 133. The ROM 135 stores control programs written therein which are executed by the central control circuit 131. The RAM 137 is divided into a picture information region 137*a* which temporarily stores photoelectrically converted picture data, a release time picture storage region 137*b* which stores picture data of release time, and a working region 137*c* while the central control circuit 131 executes the control program.

The image storage circuit 133, ROM 135, RAM 137, interface unit 139, and an infrared interface 105, are controlled by the central control circuit 131.

The first release button 111 and the mode switch 113 are monitored by the central control circuit 131.

A battery 141 is mounted in the camera unit 100 and stores electricity which supplies electric power to the various circuits in the camera unit 100.

As shown in FIGS. 1 and 2, connectors 203, 203 are formed in the front face 202 of the printer unit 200, positioned toward the camera unit 100. The connectors 203, 203 are formed in positions which can connect to the connectors 103, 103 in a state in which the camera unit 200 is positioned in the L-shaped angle of the printer unit 200. The connectors 203, 203 comprise, for example, permanent magnets or the like. The connectors 103, 103 and the connectors 203, 203 are disposed in positions pulled together by mutual magnetic force.

An infrared interface 205 which communicates with the infrared interface 105 of the camera unit 100 is built into the front face 202 of the printer unit 200. The infrared interfaces 105, 205 include light emitting units which emit infrared rays having a predetermined width. The infrared interface 105 includes a receiving unit to receive infrared rays output by the infrared interface 205. The infrared interface 205 includes a receiving unit to receive infrared rays output by the infrared interface 105. The infrared interface 105 and the infrared interface 205 mutually communicate by mutually outputting and mutually receiving infrared rays.

The fixing of the camera unit 100 and the printer unit 200 by the connectors 103, 103 and the connectors 203, 203 is performed with a degree of position accuracy such that communication by the infrared interfaces 105, 205 can be reliably performed.

The L-shaped angle unit 201 is positioned in a position in which the infrared interface 205 is capable of receiving the infrared rays output by the infrared interface 105. The camera unit 100 is positioned in a position in which the infrared interface 105 is capable of receiving the infrared rays output by the infrared interface 205.

Furthermore, the infrared interface 105, other than communicating with the infrared interface 205, is capable of communicating picture data and control information with a communication instrument having a function equivalent to the infrared interface 205. The communication instrument, for example, is a personal computer and the like. Accordingly, when the camera unit 100 and the print unit 200 are not combined, the camera 100 can output picture data to communication equipment other than the print unit 200. Similarly, the infrared interface 205, other than communicating with the infrared interface 105, is capable of communicating picture data and control information with a communication instrument having a function equivalent to the infrared interface 105. Accordingly, when the camera unit 100 and the print unit 200 are not combined, the print unit 200 can input picture data from communication equipment other than the camera unit 100. Furthermore, the print unit 200 can print picture data which is input from communication equipment other than the camera unit 100. Moreover, the picture data input by the print unit 200 may be picture data which is not restricted to that which the camera unit 100 photographed and may be picture data imaged by communication equipment, other than the camera unit 100.

A second release button 209 is arranged in the top surface 207 of the printer unit 200, in a position opposite to the first release button 111 of the camera unit 100. The second release button 209 is disposed close to a left side surface 221. Moreover, the second release button 209 is disposed in a position where it is easily operated with the left hand when both hands hold the electronic camera.

A liquid crystal viewfinder 213 is arranged in the back surface 211 of the printer unit 200 positioned remote from the camera unit 100.

An on-line lamp 215 and a print lamp 217 are arranged in a position adjacent to the liquid crystal viewfinder 213. The on-line lamp 215 lights up when the infrared interface 205 receives infrared rays output by the infrared interface 105. Specifically, the on-line lamp 215 lights up when the infrared interface 105 and the infrared interface 205 are in a state in which mutual communication is possible. A print lamp 217 lights up when the printer unit 200 is in printing operation.

A print button 219 is arranged in the back surface 211 of the printer unit 200, in a position remote from the second release button 209. The print button 219 is disposed close to a right surface 225. The print button 219, when the electronic camera is held with both hands, is disposed in a position easily operated with the right hand. Accordingly, when the camera unit 100 and the print unit 200 are combined, the print button is positioned close to the first release button 111. Accordingly, when the camera unit 100 and the print unit 200 are combined, the first release button 111 and the print button 219 can respectively be independently operated with the right hand, and, moreover, can respectively be operated simultaneously.

An insertion aperture 223 for a storage cassette 290 is formed in the left side surface 221 of the printer unit 200. An ejection aperture 227 for the photosensitive, pressure-sensitive paper 21 is formed in the right side surface 225 of the printer unit 100 opposite to the left side surface 221.

Figure 4:
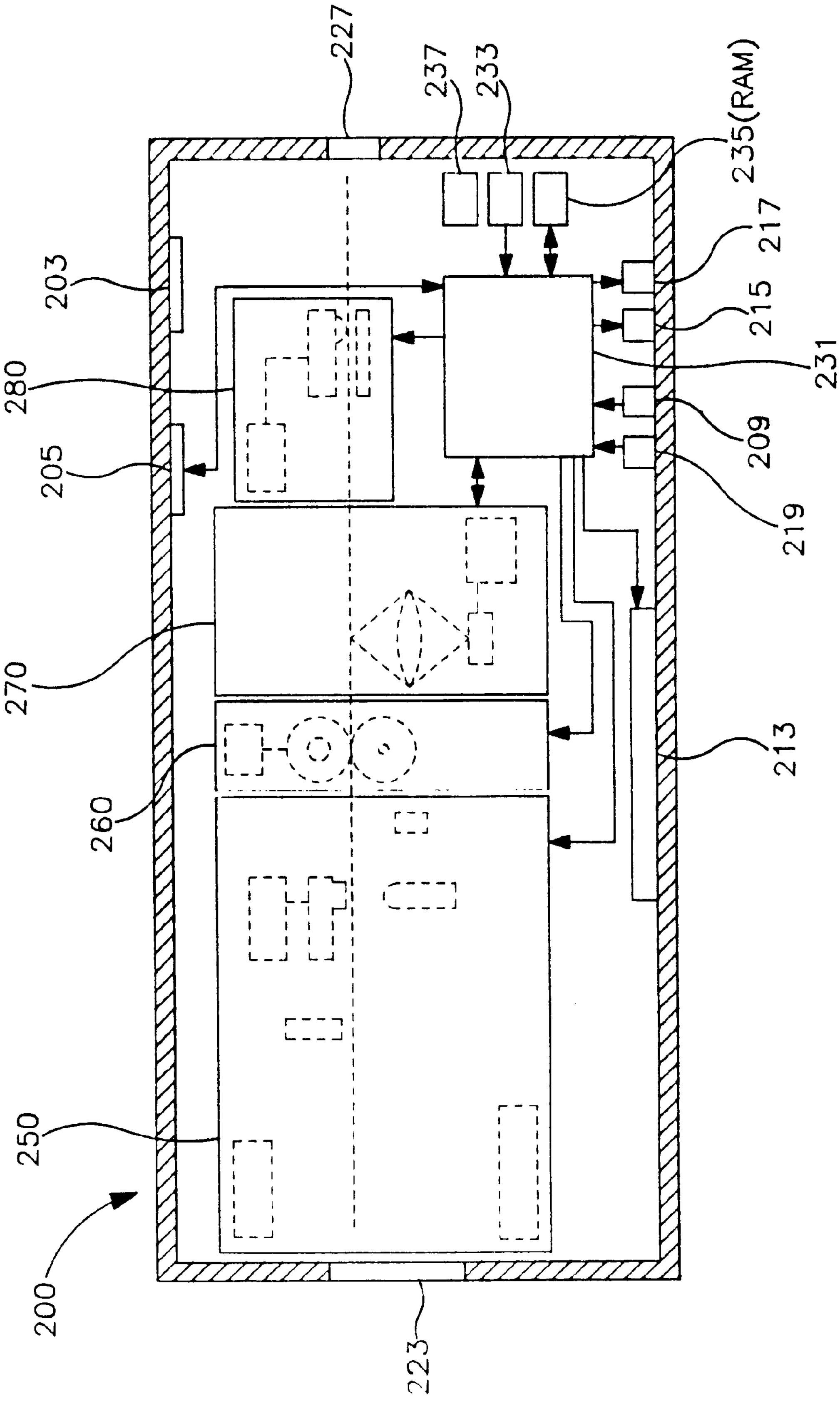
FIG. 4 is a block diagram of the printer unit in accordance with the first embodiment of the present invention.

As shown in FIG. 4, a central control circuit 231, ROM 233, RAM 235, paper feed unit 250, conveyor unit 260, exposure unit 270, and development unit 280 are built into the printer unit 200.

Control programs executed by the central control circuit 231 are written into the ROM 233. The RAM 235 is used for temporary storage of, for example, picture data which is transmitted via the infrared interfaces 105, 205, and of stack data and the like for temporary use while the central control circuit 231 is executing the control program.

The ROM 233, RAM 235, paper feed unit 250, conveyor unit 260, exposure unit 270, development unit 280, infrared interface 205, on-line lamp 215, liquid crystal viewfinder 213, and print lamp 217 are controlled by the central control circuit 231. The second release button 209 and the print button 219 are monitored by the central control circuit 231.

A battery 237 is mounted in the printer unit 200 and stores electricity which supplies electric power to all circuits in the printer unit 200. The paper feed unit 250, conveyor unit 260, exposure unit 270, and development unit 280 will now be described in more detail hereinbelow.

Figure 5:
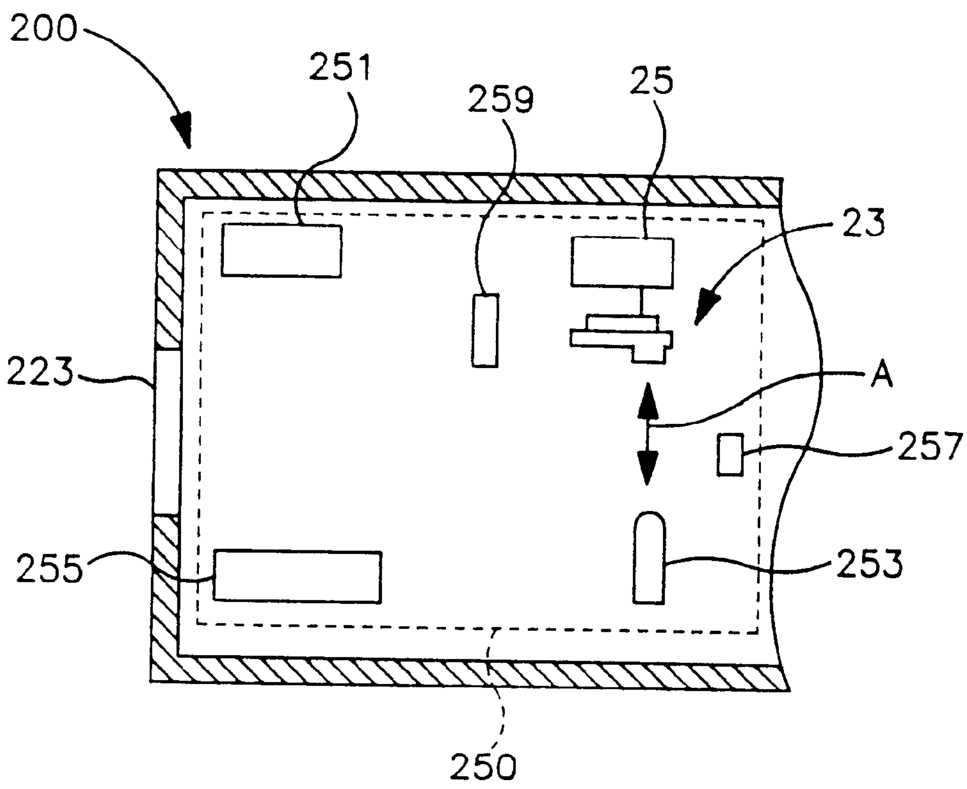
FIG. 5 is a cross-sectional diagram of the paper feed unit of the printer unit in accordance with the first embodiment of the present invention.
Figure 6:
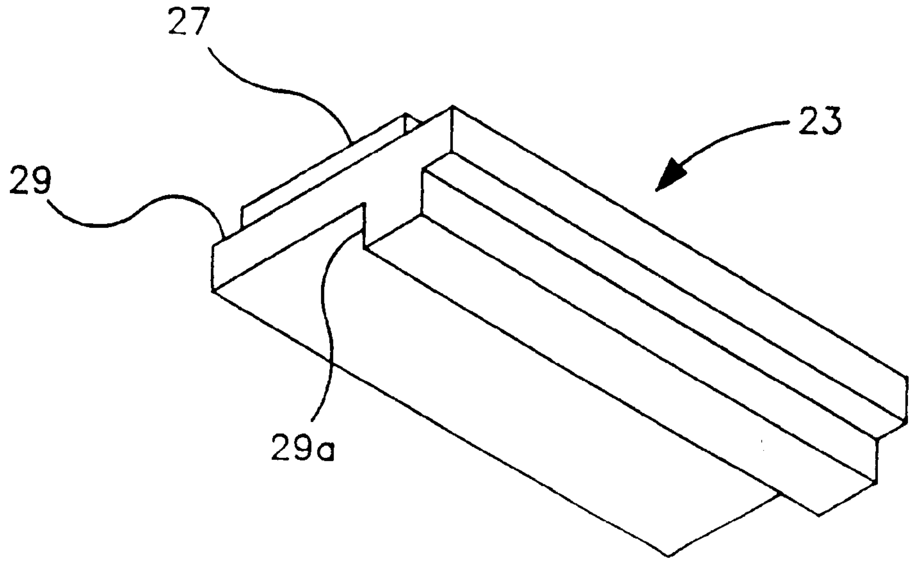
FIG. 6 is an oblique diagram of a first ultrasonic motor in accordance with the first embodiment of the present invention.

As shown in FIG. 5, the paper feed unit 250 includes a first ultrasonic motor 23 and a drive circuit 25 to drive the first ultrasonic motor 23. As shown in FIG. 6, the first ultrasonic motor 23 comprises a piezoelectric element 27 and a vibration plate 29. A parallelepipedal projection 29*a* is formed on the vibration plate 29. A front end of the projection 29*a* has a plane surface form.

A rise and fall mechanism 251 which raises and lowers the first ultrasonic motor 23 in a direction A at right angles to the paper feed direction is connected to the first ultrasonic motor 23. A press-up member 253 is arranged on an extension of the right angle direction A of the first ultrasonic motor 23. A rise and fall mechanism 255 which raises and lowers the press-up member 253 in the right angle direction A is connected to the press-up member 253.

A limit switch 257 is arranged in an opposite side to the insertion aperture 223 of the paper feed unit 250 to regulate an insertion position of the storage cassette 290. A stop 259 which contacts the light screening door 293 of the storage cassette 290 is located toward the insertion aperture 223 for the storage cassette 290.

Figure 7:
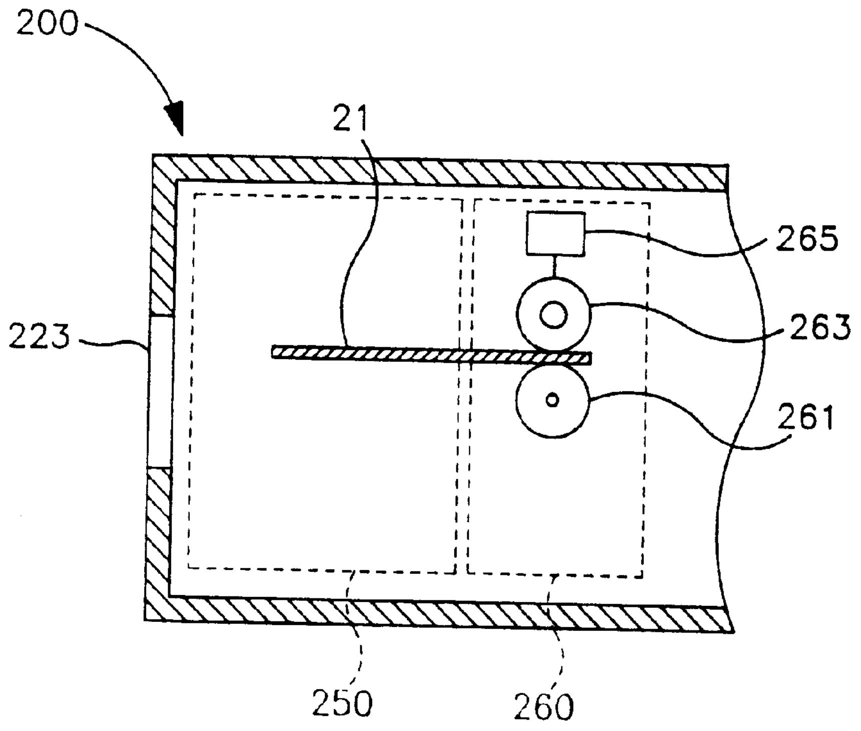
FIG. 7 is a cross-sectional diagram of a conveyor unit of the printer unit in accordance with the first embodiment of the present invention.

As shown in FIG. 7, a first roller 261 and a second roller 263 are arranged in the conveyor unit 260 with the photosensitive, pressure-sensitive paper 21 interposed between the rollers 261, 263. The first roller 261 is arranged to be freely rotatable. The second roller 263 is connected to a rotary mechanism 265 which causes it to rotate.

Figure 8:
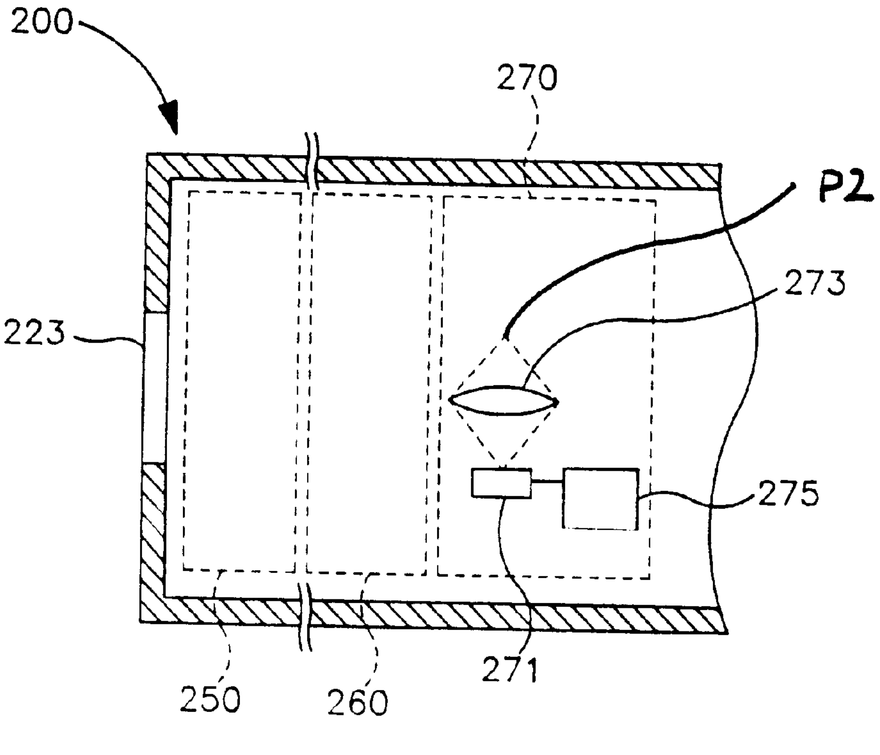
FIG. 8 is a cross-sectional diagram of an exposure unit of the printer unit in accordance with the first embodiment of the present invention.
Figure 9:
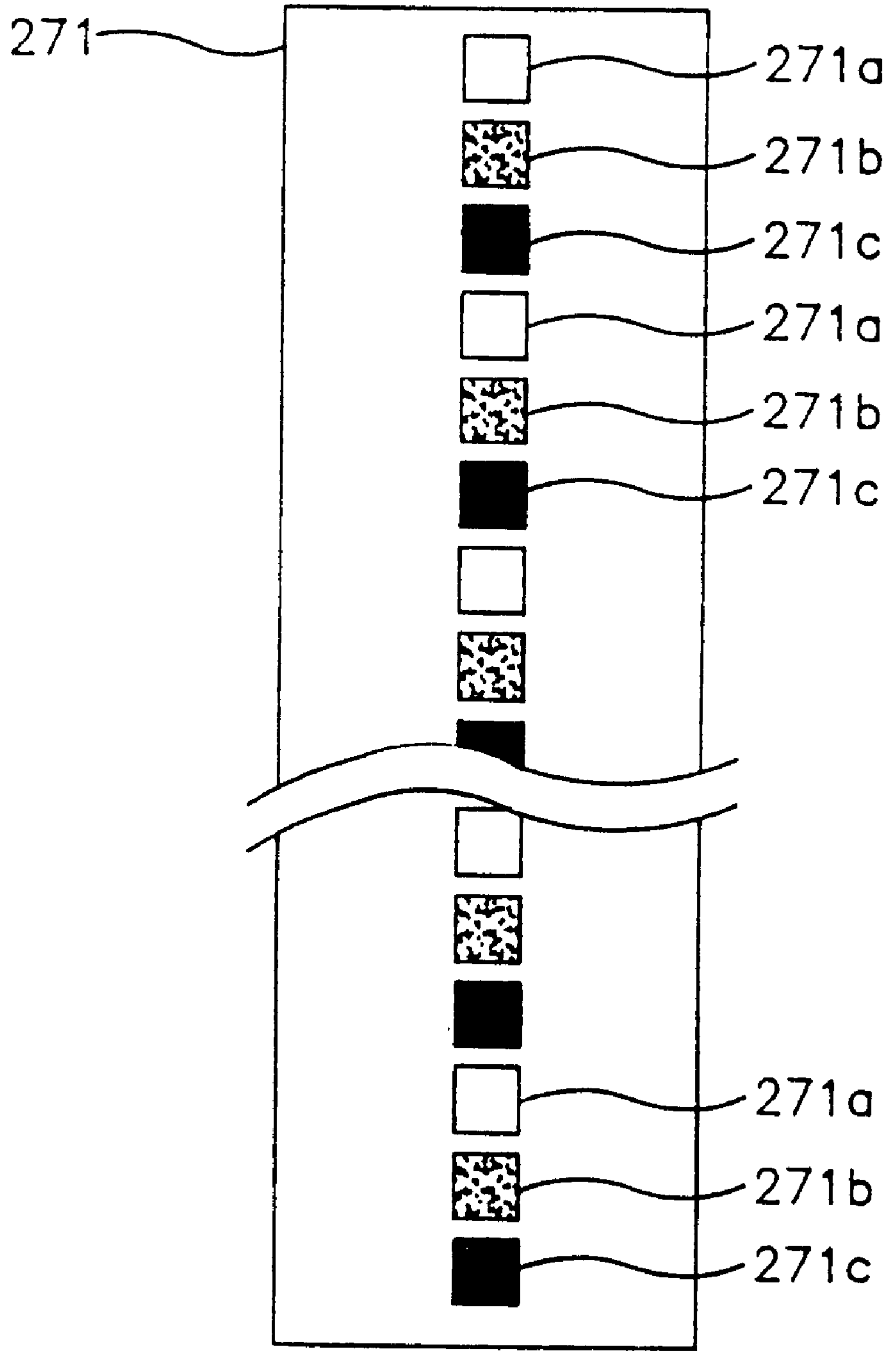
FIG. 9 is a top view of an LED array in accordance with the first embodiment of the present invention.

As shown in FIG. 8, the exposure unit 270 includes an LED array 271 and an exposure lens 273. A drive circuit 275 is connected to the LED array 271. As shown in FIG. 9, the LED array 271 includes three types of LEDs which respectively emit red, green, and blue light. The red LEDs 271*a*, green LEDs 271*b*, and blue LEDs 271*c*, are alternately arranged in straight line form. The respective red LEDs 271*a*, green LEDs 271*b* and blue LEDs 271*c* are capable of emitting full color by lighting and extinguishing in correspondence with the picture data. The exposure lens 273 images light from the LED array 271 to the position of the exposure position P2.

Figure 10:
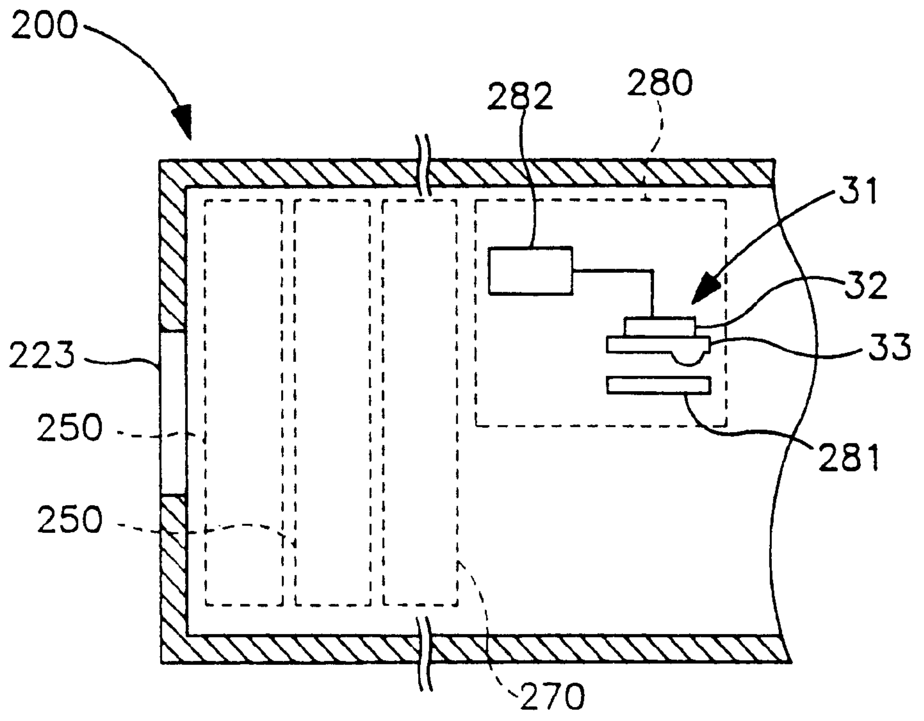
FIG. 10 is a cross-sectional diagram of a development unit of the printer unit in accordance with the first embodiment of the present invention.
Figure 11:
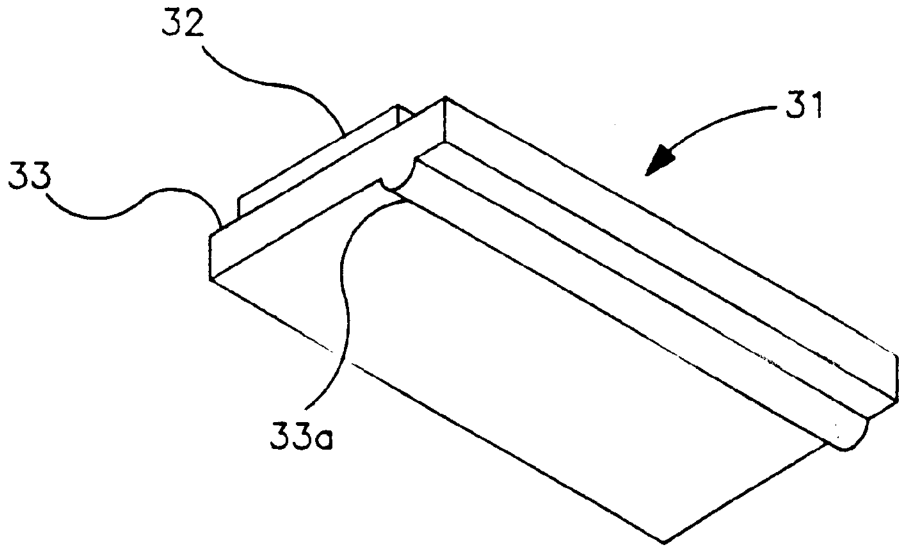
FIG. 11 is an oblique diagram of a second ultrasonic motor in accordance with the first embodiment of the present invention.

As shown in FIG. 10, the development unit 280 includes a second ultrasonic motor 31 and a driver circuit 282 to drive the second ultrasonic motor 31. As shown in FIG. 11, the second ultrasonic motor 31 comprises a piezoelectric element 32 and a vibration plate 33. The piezoelectric element 32 expands and contracts in the direction of movement of the pressure sensitive paper 21. A projection 33*a* having a semi-cylindrical form is formed on the vibration plate 33. The projection 33*a* extends in a direction at right angles to the direction of expansion and contraction of the piezoelectric element 32.

Further, a presser plate 281 is arranged toward the vibration plate 33 of the second ultrasonic motor 31. The pressure plate 281 is disposed in a position separated by a distance shorter than the thickness of the photosensitive, pressure-sensitive paper 21, the distance between the projection 33*a* and the surface of the pressure plate 281 which faces the vibration plate 33.

Figure 12:
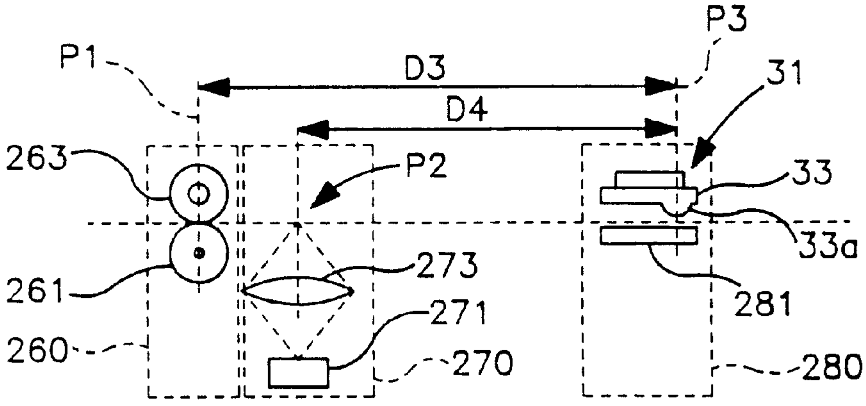
FIG. 12 is a top view of the length of the photosensitive, pressure-sensitive paper and the length of the photosensitive region of the photosensitive, pressure-sensitive paper in accordance with the first embodiment of the present invention.
Figure 13:
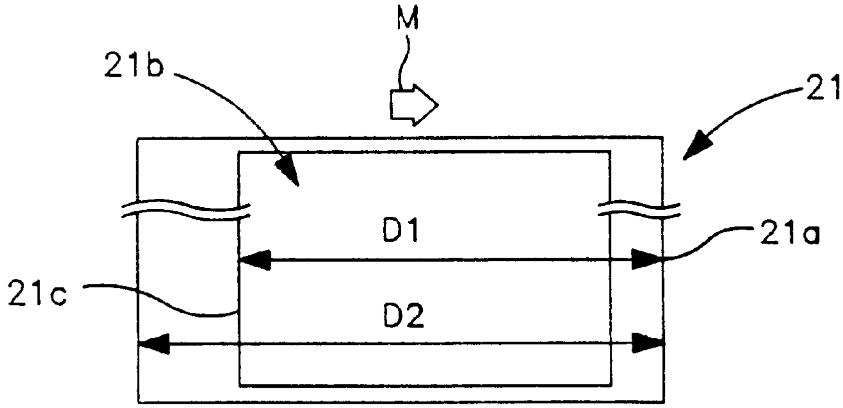
FIG. 13 is a side view of an interval between a conveyor unit of the printer unit, and an exposure unit and a development unit in accordance with the first embodiment of the present invention.

FIGS. 12 and 13 show the size of the photosensitive, pressure-sensitive paper 21 and the positional relationship of the conveyor unit 260, exposure unit 270 and development unit 280 within the printer unit 200 in accordance with the first embodiment of the invention.

As shown in FIGS. 12 and 13, an interval D3 between an interposed position P1 of the second ultrasonic motor 31 and the first roller 261 of the conveyor unit 260 and a central position P3 of the projection 33*a* of the vibration plate 33 of the development unit 280 is shorter than a length D2 of the photosensitive, pressure-sensitive paper 21 in a movement direction M. The central position P3 is the center of a region where the projection 33*a* and the photosensitive, pressure-sensitive 21 come into contact.

Moreover, an interval D4 between the exposure position P2 of the exposure unit 270 and the center position P3 of the projection 33*a* of the vibration plate 33 is longer than the length D1 of the front end 21*a* of the photosensitive, pressure-sensitive paper 21 and back end 21*c* of the light sensitive region 21*b* of the photosensitive, pressure-sensitive paper 21.

Figure 14:
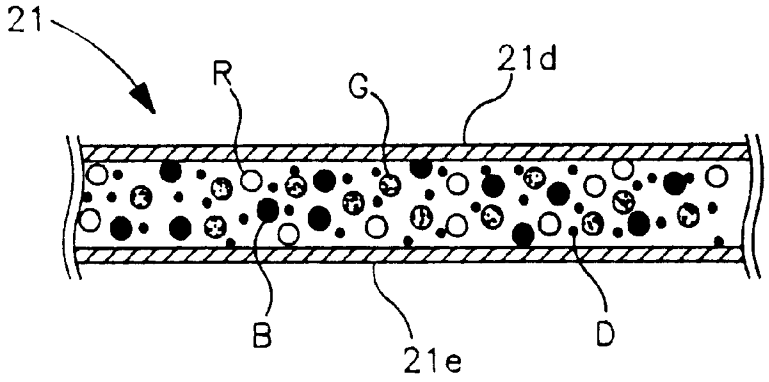
FIG. 14 is a cross-sectional diagram showing details of the photosensitive, pressure-sensitive paper in accordance with the first embodiment of the present invention.

As shown in FIG. 14, the photosensitive, pressure-sensitive paper 21 comprises three (3) types of microcapsules R, G, B, and a development agent D, between a pair of opposed films 21*d*, 21*e*. The respective microcapsules R, G, B are filled with colorants and develop the corresponding red, green and blue colors when they react with the development agent D. Each microcapsule has the property of hardening in response to exposure to light. Specifically, the microcapsules R are hardened by red light, the microcapsules G are hardened by green light, and the microcapsules B are hardened by blue light. The wavelengths of the red light, green light and blue light are about in agreement with the wavelengths of the light emitted respectively by the red LEDs 271*a*, the green LEDs 271*b*, and the blue LEDs 271*c*.

The unhardened respective microcapsules R, G, B burst when a specific pressure is applied to them (hereinafter referred to as the "development pressure"). When each microcapsule R, G, B bursts, the respective colorant with which it is filled flows out of the microcapsules R, G, B.

Figure 15:
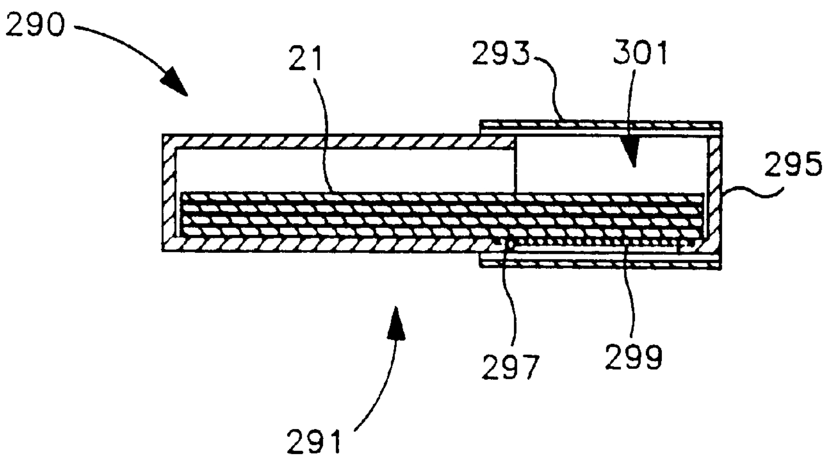
FIG. 15 is a cross-sectional diagram showing details of a storage cassette in accordance with the first embodiment of the present invention.

FIG. 15 illustrates in detail the storage cassette 290 in accordance with the first embodiment of the present invention.

As shown in FIG. 15, a freely rotatable press-up plate 299 is connected at a support point 297 to the cassette body 291 toward a front surface 295 of the cassette body 291. A light screening door 293 of the storage cassette 290 slides freely, in a direction parallel to the direction of insertion into the insertion aperture 223, in the cassette body 291 such that it opens and closes a paper feed aperture 301 of the cassette body 291. The paper feed aperture 301 opens facing in a direction about at right angles to the direction in which the screening door 293 slides.

Figure 16:
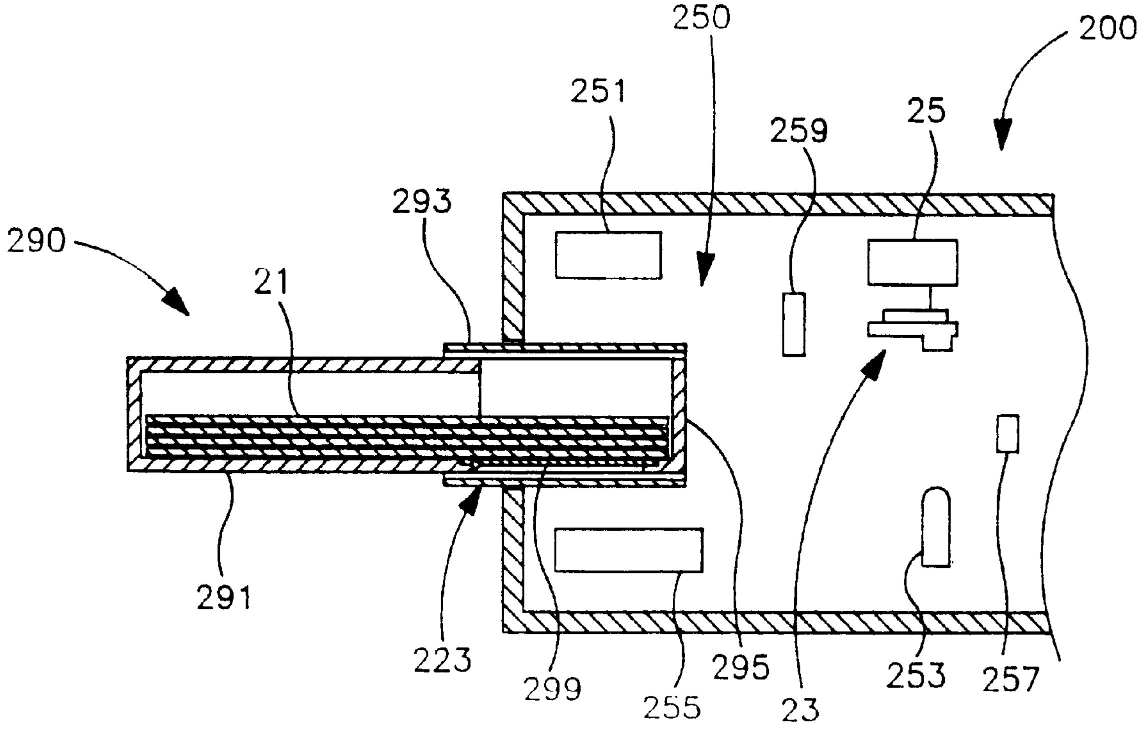
FIG. 16 is a cross-sectional diagram of the storage cassette inserted into the printer unit in accordance with the first embodiment of the present invention.
Figure 17:
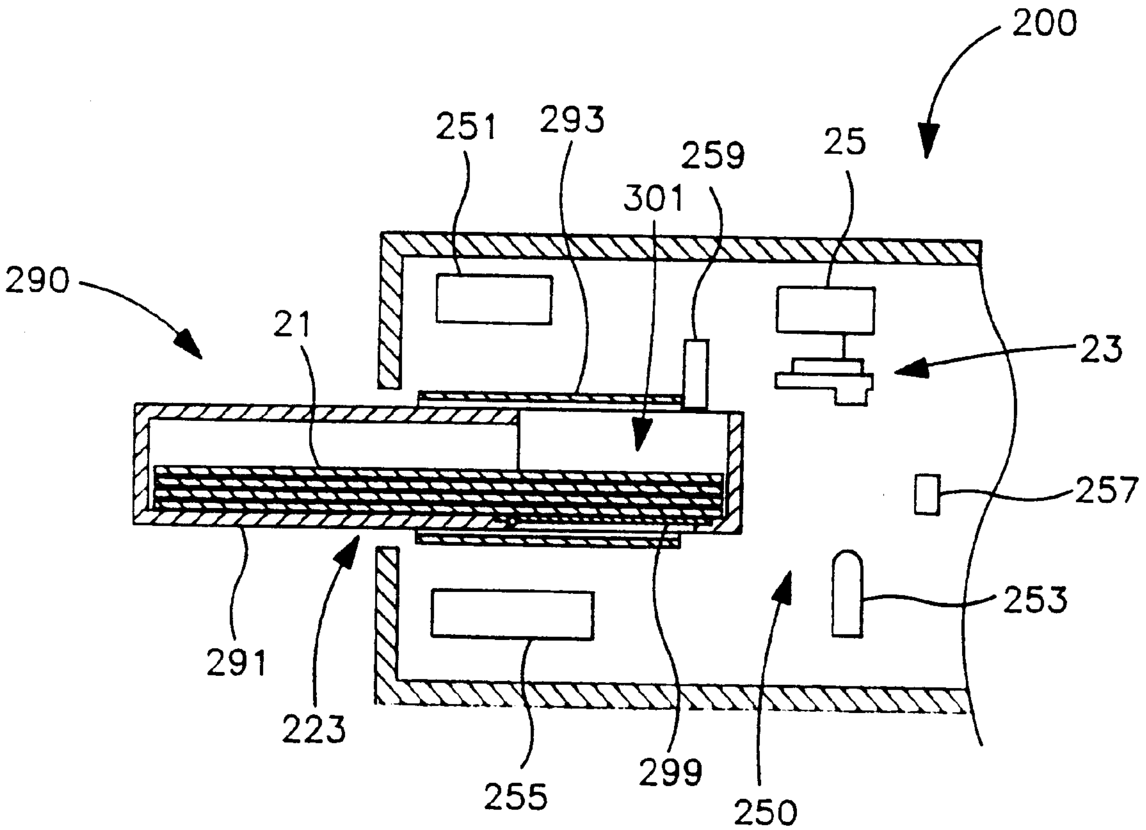
FIG. 17 is a cross-sectional diagram of a light screening door of the storage cassette brought into contact with a stop in accordance with the first embodiment of the present invention.

As described hereinbelow with reference to FIGS. 16–29, the photosensitive, pressure-sensitive paper 21 within the printer unit 200 is fed from the storage cassette 290, conveyed, picture data exposed, and developed. More particularly, firstly, as shown in FIG. 16, the front surface 295 side of the storage cassette 290 is inserted into the insertion aperture 223 of the printer unit 200. As shown in FIG. 17, after the insertion of the storage cassette 290, the light screening door 293 of the storage cassette 290 contacts the stop 259 of the paper feed unit 250. After this, only the cassette body 291 moves within the paper feed unit 250, and opens the paper feed aperture 301. The paper feed aperture 301 opens facing the first ultrasonic motor 23.

Figure 18:
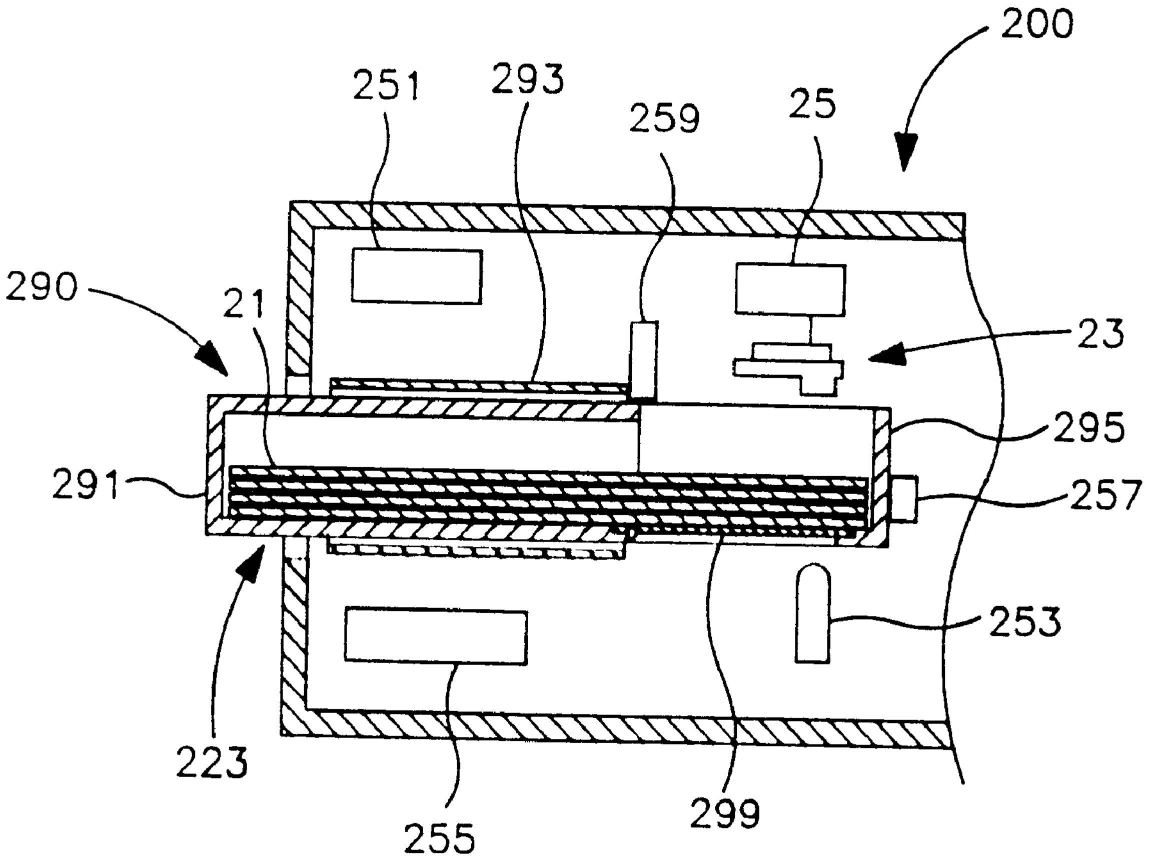
FIG. 18 is a cross-sectional diagram showing the front end of the storage cassette brought into contact with a limit switch in accordance with the first embodiment of the present invention.
Figure 19:
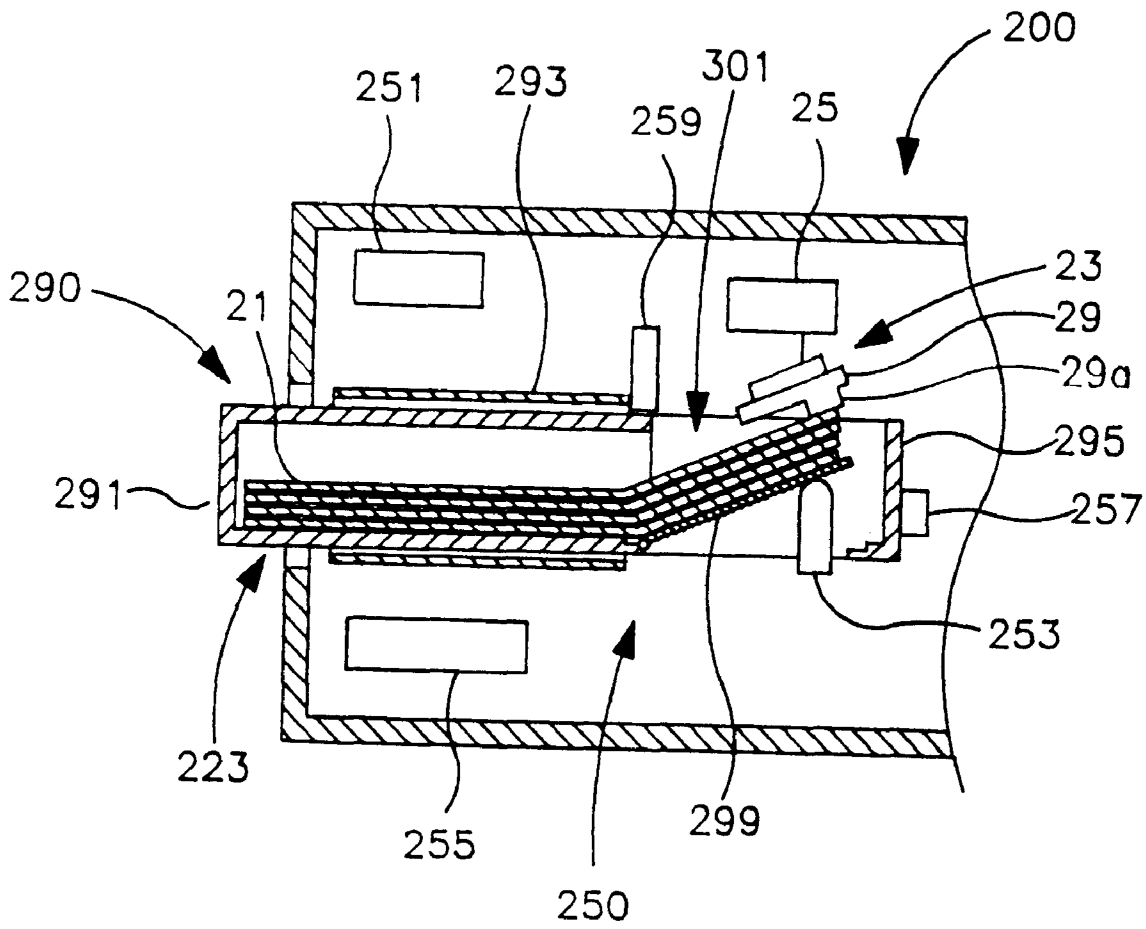
FIG. 19 is a cross-sectional diagram showing a press-up plate and the photosensitive, pressure-sensitive paper pressed up by the press-up member in accordance with the first embodiment of the present invention.

As shown in FIG. 18, the storage cassette 290 is inserted until the front surface 295 comes into contact with the limit stop 257. As shown in FIG. 19, when the front surface 295 comes into contact with the limit stop 257, the press-up member 253 is raised by the rise and fall mechanism 255. Moreover, the first ultrasonic motor 23 is lowered by the rise and fall mechanism 251. The press-up member 253 is raised until it presses up the press-up plate 299 of the storage cassette 290. Then, the front end side of the photosensitive, pressure-sensitive paper 21 is pressed up along the press-up plate 299.

The first ultrasonic motor 23 is lowered toward the paper feed aperture 301 by the rise and fall mechanism 251. The projection 29*a* presses against the photosensitive, pressure-sensitive paper 21, but stops before it reaches the development pressure.

Figure 20:
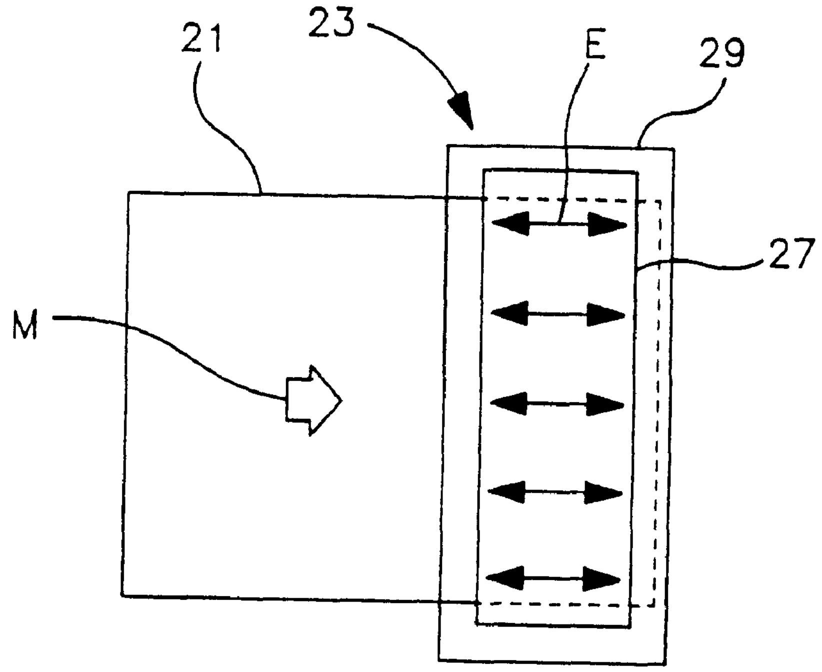
FIG. 20 is a top view of a piezoelectric element showing the expansion and contraction state of the piezoelectric element in accordance with the first embodiment of the present invention.
Figure 21:
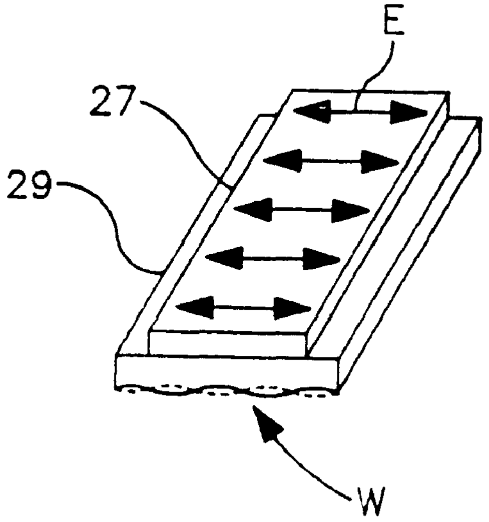
FIG. 21 is an oblique diagram showing the state of a standing wave in accordance with the first embodiment of the present invention.
Figure 22:
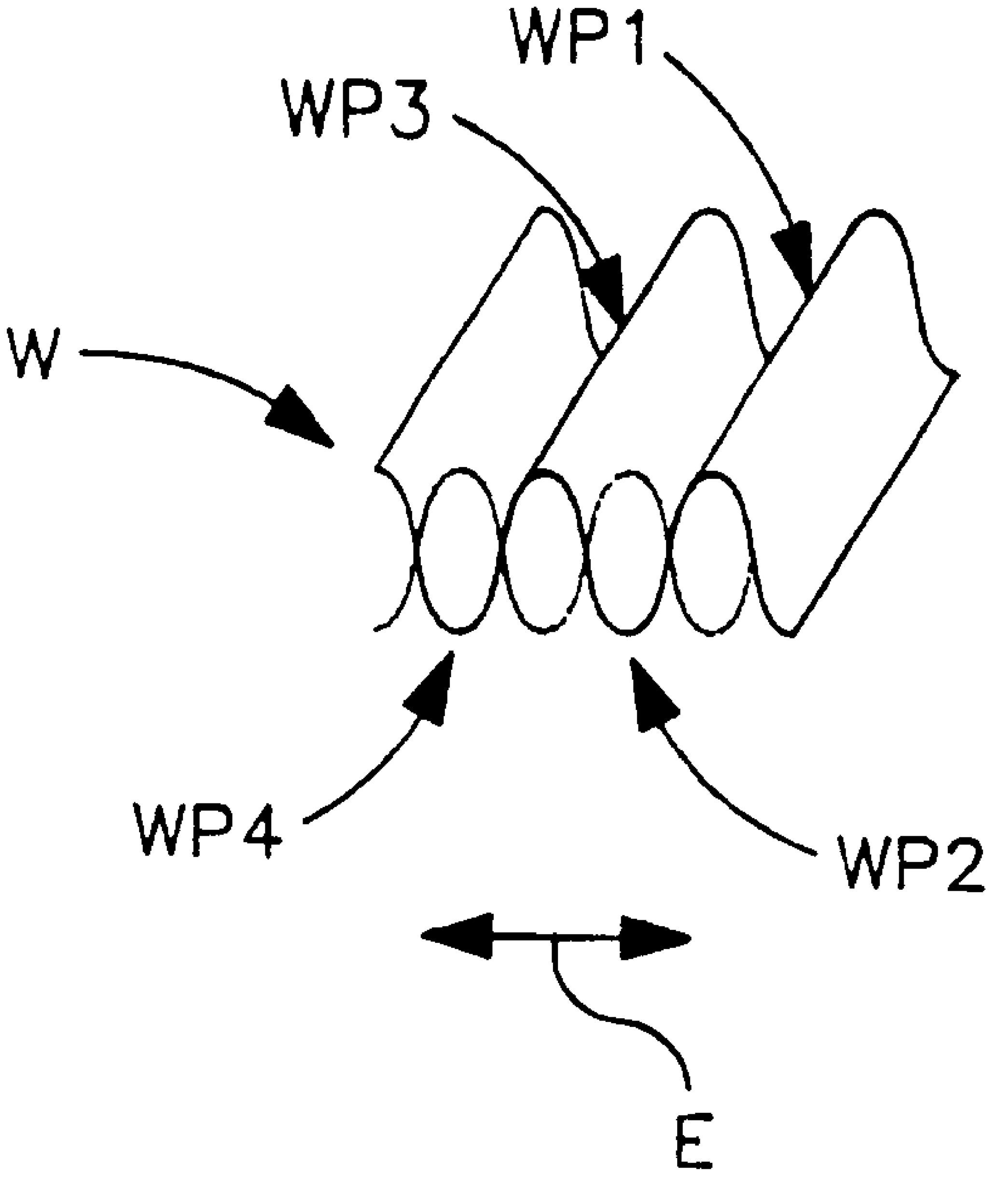
FIG. 22 is an illustrative diagram showing a state of formation of a standing wave in accordance with the first embodiment of the present invention.

Next, as will be described below, the photosensitive, pressure-sensitive paper 21 is pulled out of the storage cassette 290 by the ultrasonic vibrations generated by the first ultrasonic motor 23. Specifically, firstly, as shown in FIG. 20, the piezoelectric element 27 is driven by the driver circuit 25, and expands and contracts in a direction E parallel to the forwarding direction M of the photosensitive, pressure-sensitive paper 21. As shown in FIGS. 21 and 22, a standing wave W is generated in the vibration plate 29 by the expansion and contraction.

Figure 23:
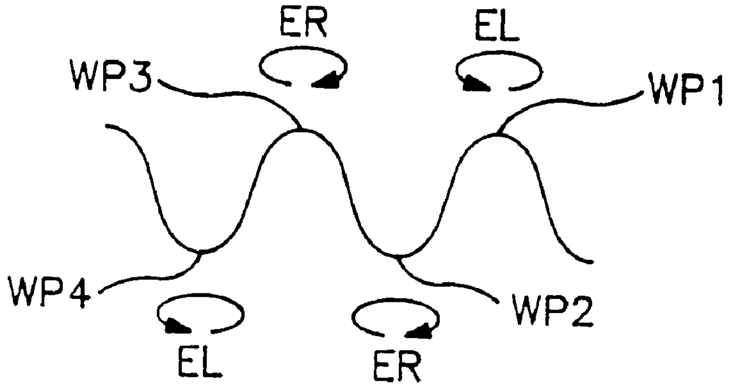
FIG. 23 is an illustrative diagram showing an elliptical locus of a maximum amplitude position in accordance with the first embodiment of the present invention.

In accordance with the first of embodiment of the present invention, the piezoelectric element 27 is driven by the driver circuit 25 to expand and contract in the direction of E at a frequency of 48 kHz. A standing wave W is generated in a direction at right angles to the expansion and contraction E, having maximum amplitude positions WP1, WP2, WP3, WP4. As shown in FIG. 23, the maximum amplitude positions WP1 and WP4 of the standing wave W vibrate describing elliptical orbits EL. The maximum amplitude positions WP2 and WP3 vibrate describing elliptical orbits ER. The direction of rotation of the locus of the standing wave W in the maximum amplitude position WP1 is the same as the direction of rotation of the locus of the standing wave W in the maximum amplitude position WP4. The direction of rotation of the locus of the standing wave W in the maximum amplitude position WP2 is the same as the direction of rotation of the locus of the standing wave W in the maximum amplitude position WP3. The direction of rotation of the locus of the standing wave W in the maximum amplitude positions WP1 and WP4 is opposite to the direction of rotation of the locus of the standing wave W in the maximum amplitude positions WP2 and WP3.

Figure 24:
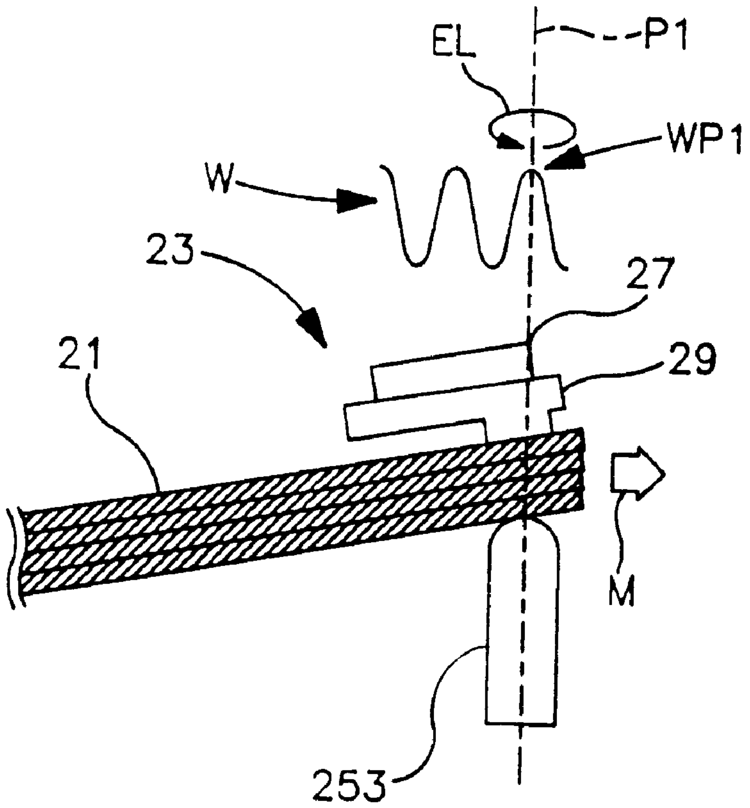
FIG. 24 is a cross-sectional diagram showing the photosensitive, pressure-sensitive paper forwarded by the first ultrasonic motor of the paper feed unit in accordance with the first embodiment of the present invention.

As shown in FIG. 24, the frequency of the expansion and contraction of the piezoelectric element 27 is set such that the position of generation of the maximum amplitude position WP1 of the vibration plate 29 coincides with the center position P1 of the projection 29*a* of the vibration plate 29.

Figure 25:
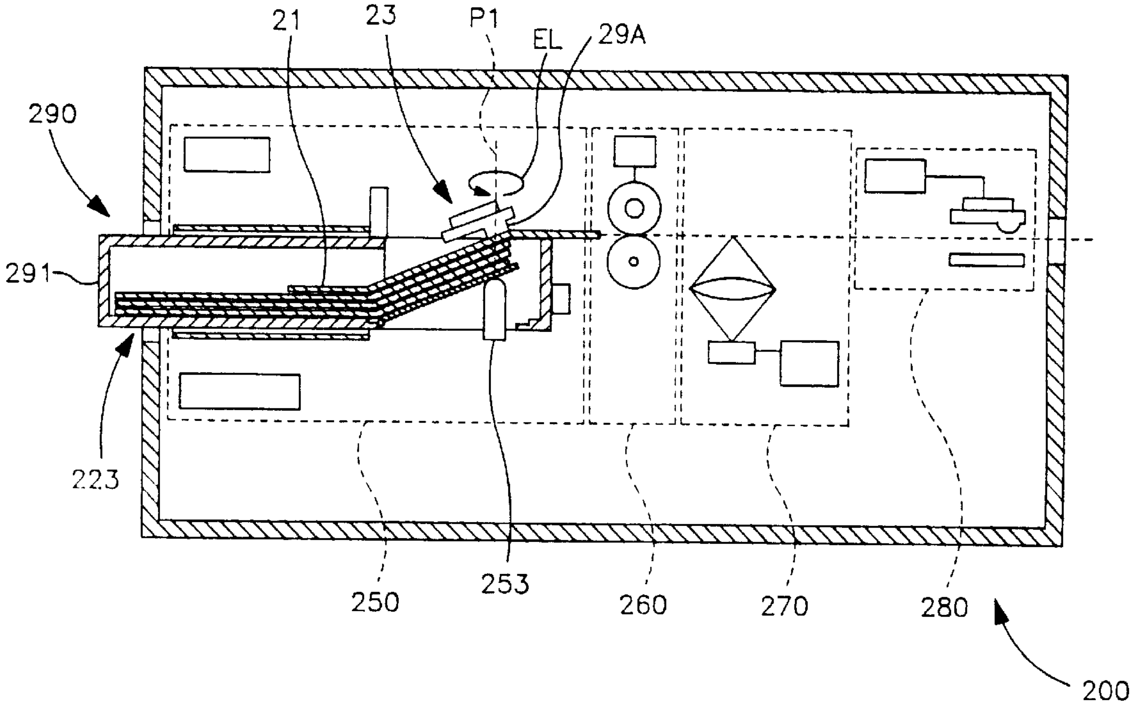
FIG. 25 is a cross-sectional diagram showing the state of forwarding of the photosensitive, pressure-sensitive paper from the paper feed unit to the conveyor unit in accordance with the first embodiment of the present invention.

As shown in FIG. 25, the projection 29*a* is brought into contact with the photosensitive, pressure-sensitive paper 21 by the press-up member 253, and a frictional force repeatedly operates between the projection 29*a* and the photosensitive, pressure-sensitive paper 21. In the motion of the projection 29*a* which vibrates describing an elliptical locus EL, there are included a horizontal motion in a direction parallel to the arrow M shown in FIG. 24, and an up and down motion in a direction perpendicular to the arrow M. When the projection 29*a* moves in a direction parallel to the arrow M, the projection 29*a* urges the photosensitive, pressure-sensitive paper 21. The photosensitive, pressure-sensitive paper 21 moves in a direction parallel to the arrow M by the kinetic friction between the photosensitive, pressure-sensitive paper an the projection 29*a*. On the other hand, when the projection 29*a* moves in a direction perpendicular to the arrow M, the projection 29*a* separates from the photosensitive, pressure-sensitive paper 21. At this time, the friction does not act on the photosensitive, pressure-sensitive paper 21. Accordingly, as shown in FIG. 25, when the projection 29*a* vibrates describing an elliptical locus EL, the photosensitive, pressure-sensitive paper moves in a direction parallel to the arrow M, and is forwarded as far as the conveyor unit 260.

Figure 26:
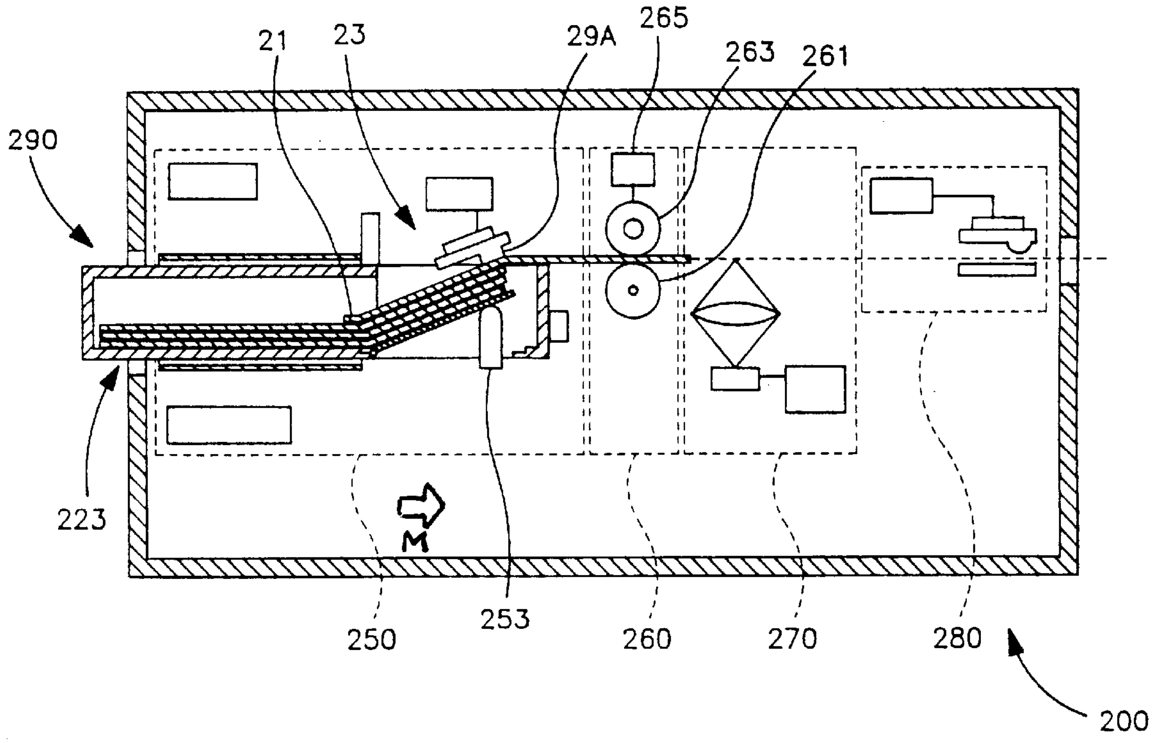
FIG. 26 is a cross-sectional diagram illustrating an operation of forwarding the photosensitive, pressure-sensitive paper from the conveyor unit to the exposure unit in accordance with the first embodiment of the present invention.

As shown in FIG. 26, in the conveyor unit, the second roller 263 is rotated at an approximately constant speed by the rotary mechanism 265. The first roller 261 comes into contact with the second roller 263 and also rotates at an approximately constant speed. The photosensitive, pressure-sensitive paper 21 pulled out from the storage cassette 290 is interposed between the first roller 261 and the second roller 262, and is forwarded at an approximately constant speed toward the exposure unit 270.

Figure 27:
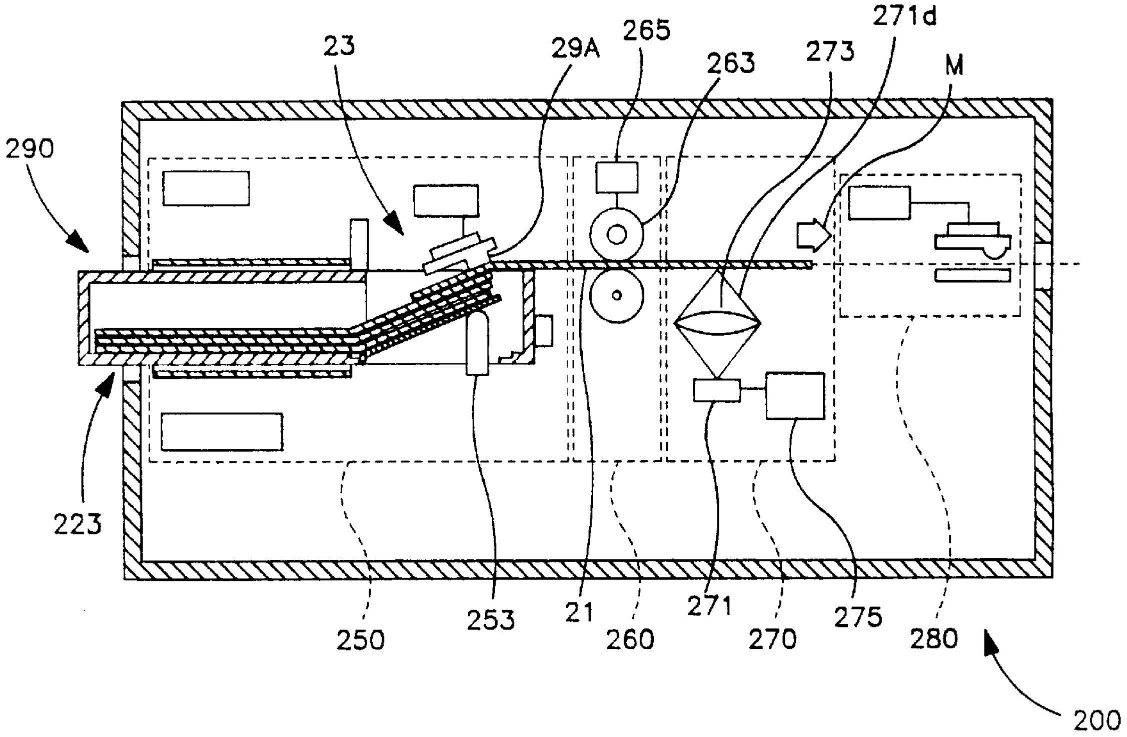
FIG. 27 is a cross-sectional diagram showing a latent image recorded in the photosensitive, pressure-sensitive paper, in the exposure unit in accordance with the first embodiment of the present invention.

As shown in FIG. 27, in the exposure unit 270 negative light 271*d* of the picture data is emitted from the LED array 271, and the negative light 271*d* is imaged in a row on the photosensitive, pressure-sensitive paper 21 by the exposure lens 273. The respective microcapsules R, G, B within the photosensitive, pressure-sensitive paper 21 are hardened by the negative light 271*d*. More specifically, a latent image of the color picture of the negative light 271*d* is recorded on the photosensitive, pressure-sensitive paper 21.

Accompanying the movement of the photosensitive, pressure-sensitive paper 21 by the conveyor unit 260, the LED array 271 repeats further light emission, and successive latent images of the color picture of the negative light 271d are recorded on the photosensitive, pressure-sensitive paper 21. The photosensitive, pressure-sensitive paper 21 on which the successive latent images have been recorded is forwarded to the development unit 280.

Figure 28:
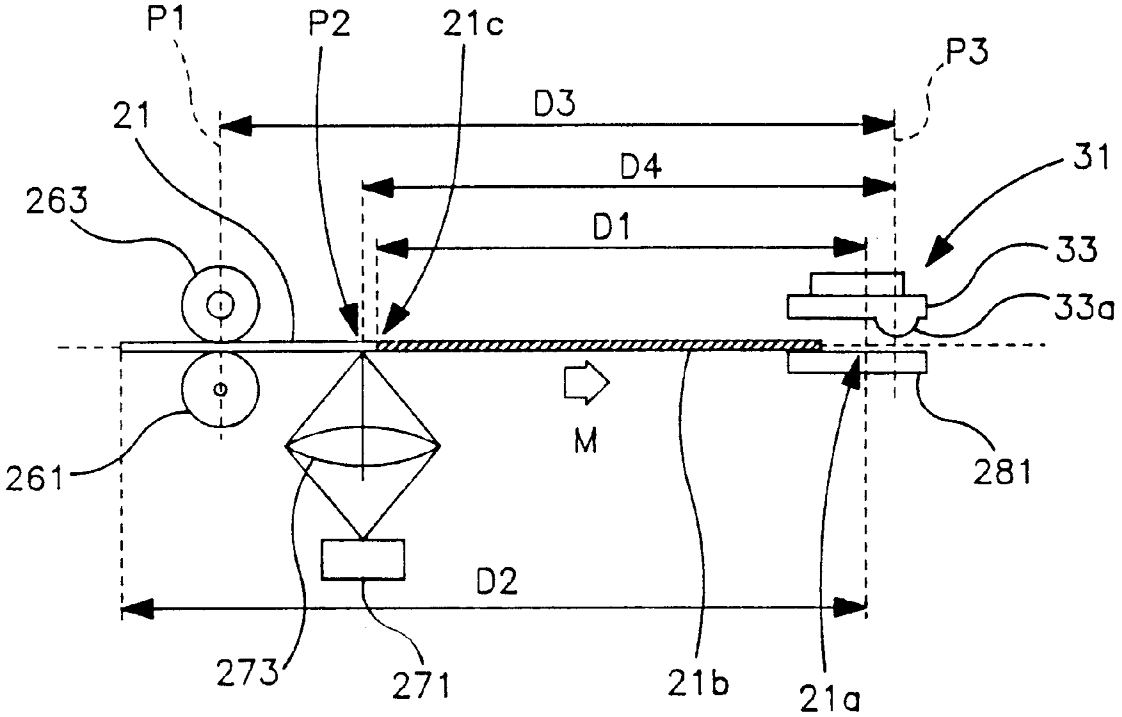
FIG. 28 is a cross-sectional diagram showing a forwarding state of the photosensitive, pressure-sensitive paper in the conveyor unit, exposure unit, and development unit in accordance with the first embodiment of the present invention.

As shown in FIG. 28, the length D2 in the movement direction M of the photosensitive, pressure-sensitive paper 21 is longer than the interval D3 between the position P1 of interposition between the first and second rollers 261, 263, and the center position P3 of the projection 33*a* of the vibration plate 33 of the development unit 280. Because of this, before the forwarding of the photosensitive, pressure-sensitive paper 21 by the first and second rollers 261, 263 has been completed, the front end 21*a* of the photosensitive, pressure-sensitive paper 21 is interposed between the projection 33*a* and the presser plate 281.

The length D1 from the front end 21*a* of the photosensitive, pressure-sensitive paper 21 to the rear end 21*c* of the photosensitive region 21*b* is shorter than the interval D4 between the exposure position P2 of the exposure unit 270 and the center position P3 of the projection 33*a*. Because of this, the interposition of the front end 21*a* of the photosensitive, pressure-sensitive paper 21 by the projection 33*a* and the presser plate 281 is performed after the end of exposure by the exposure unit 270.

Figure 29:
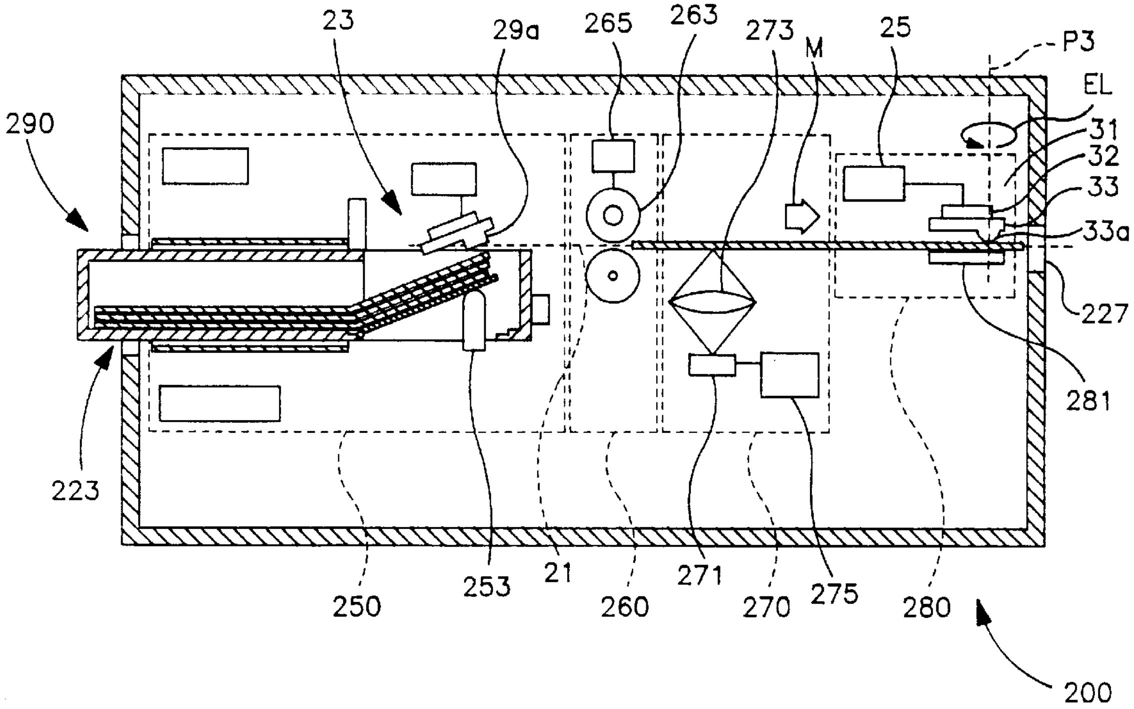
FIG. 29 is a cross-sectional diagram showing the photosensitive, pressure-sensitive paper in a developed state in the development unit in accordance with the first embodiment of the present invention.

As shown in FIG. 29, in the development unit 280 the photosensitive, pressure-sensitive paper 21 is interposed in a compressed state between the second ultrasonic motor 31 and the presser plate 281. The piezoelectric element 32 is then driven by the driver circuit 25, similarly to the first ultrasonic motor 23 of the paper feed unit 250, as shown in FIGS. 20–23. The piezoelectric element 32 expands and contracts at a frequency of 48 kHz, and the projection 33*a* of the vibration plate 33 describes an elliptical orbit EL. The photosensitive, pressure-sensitive paper 21 is vibrationally compressed by the elliptical orbit EL of the projection 33*a* at a pressure greater than the development pressure, and is simultaneously forwarded toward the exit aperture 227.

The microcapsules R, G, B within the photosensitive, pressure-sensitive paper 21 which have been exposed to the negative light 271*d* do not burst due to the compression because they have been hardened, and do not give coloration. On the other hand, the microcapsules R, G, B which were not exposed to the negative light 271*d* are burst by the vibratory compression, and the colorant within these microcapsules R, G, B reacts with the developing agent D to produce coloration.

The photosensitive, pressure-sensitive paper 21 is moved further by the elliptical orbit EL of the projection 33*a* of the vibration plate 33. A color picture of the latent images is then developed on the photosensitive, pressure-sensitive paper 21 as a result of the sequential coloration performed by the vibratory compression by the projection 33*a*.

The developed photosensitive, pressure-sensitive paper 21 is ejected from the ejection aperture 227 of the printer unit 200, and the printing of the photosensitive, pressure-sensitive paper 21 is completed.

In operation of the electronic camera having a printer in accordance with embodiments of the present invention, coupled photography is performed in a state in which the camera unit 100 and the printer unit 200 are connected, or independent photography is performed in a state in which the camera unit 100 and the printer unit 200 are not connected, specifically, by the camera unit 100 independently.

The operation of coupled photography will be described first below.

Figure 30:
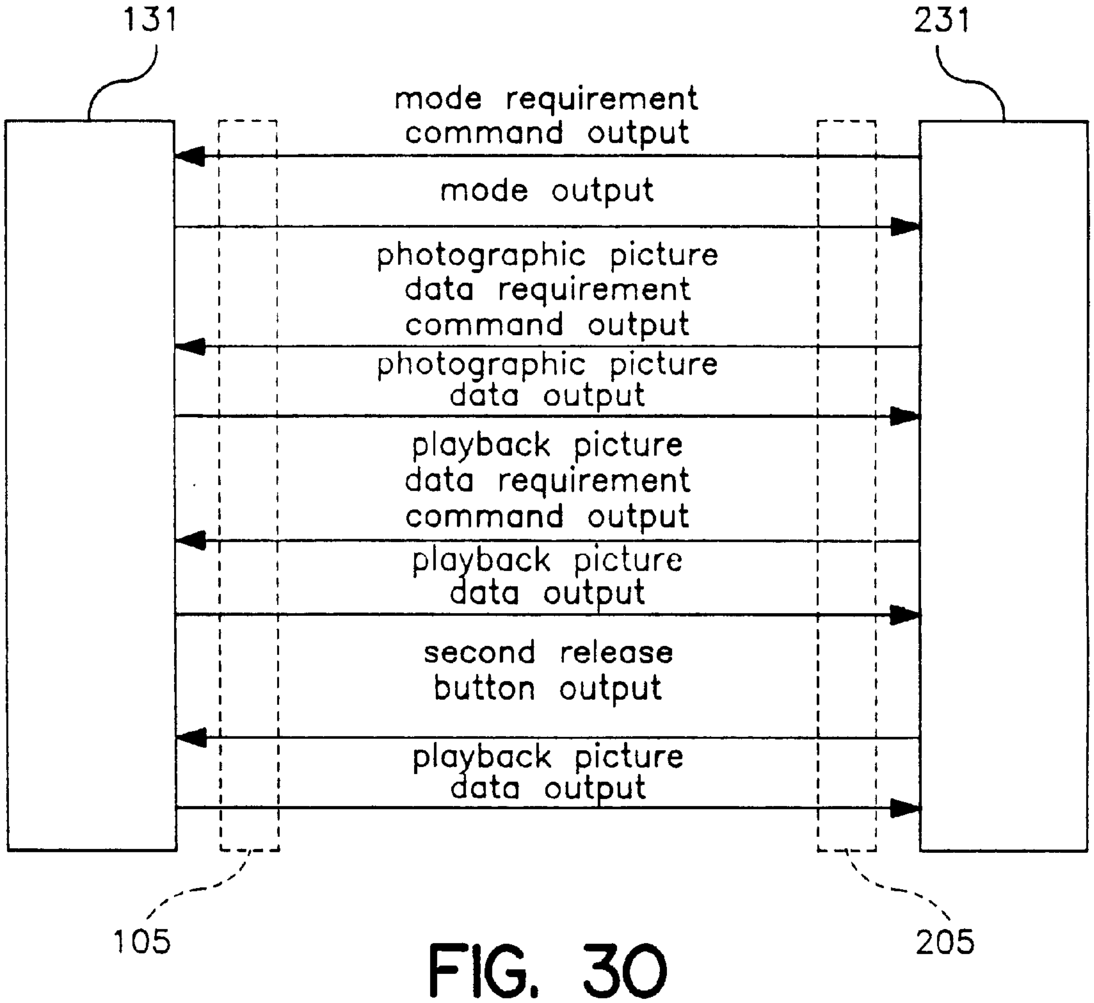
FIG. 30 is an illustrative diagram showing a state of transfer of control commands of a central control circuit of the camera unit and a central control circuit of the printer unit, during coupled photography in accordance with the first embodiment of the present invention.
Figure 31:
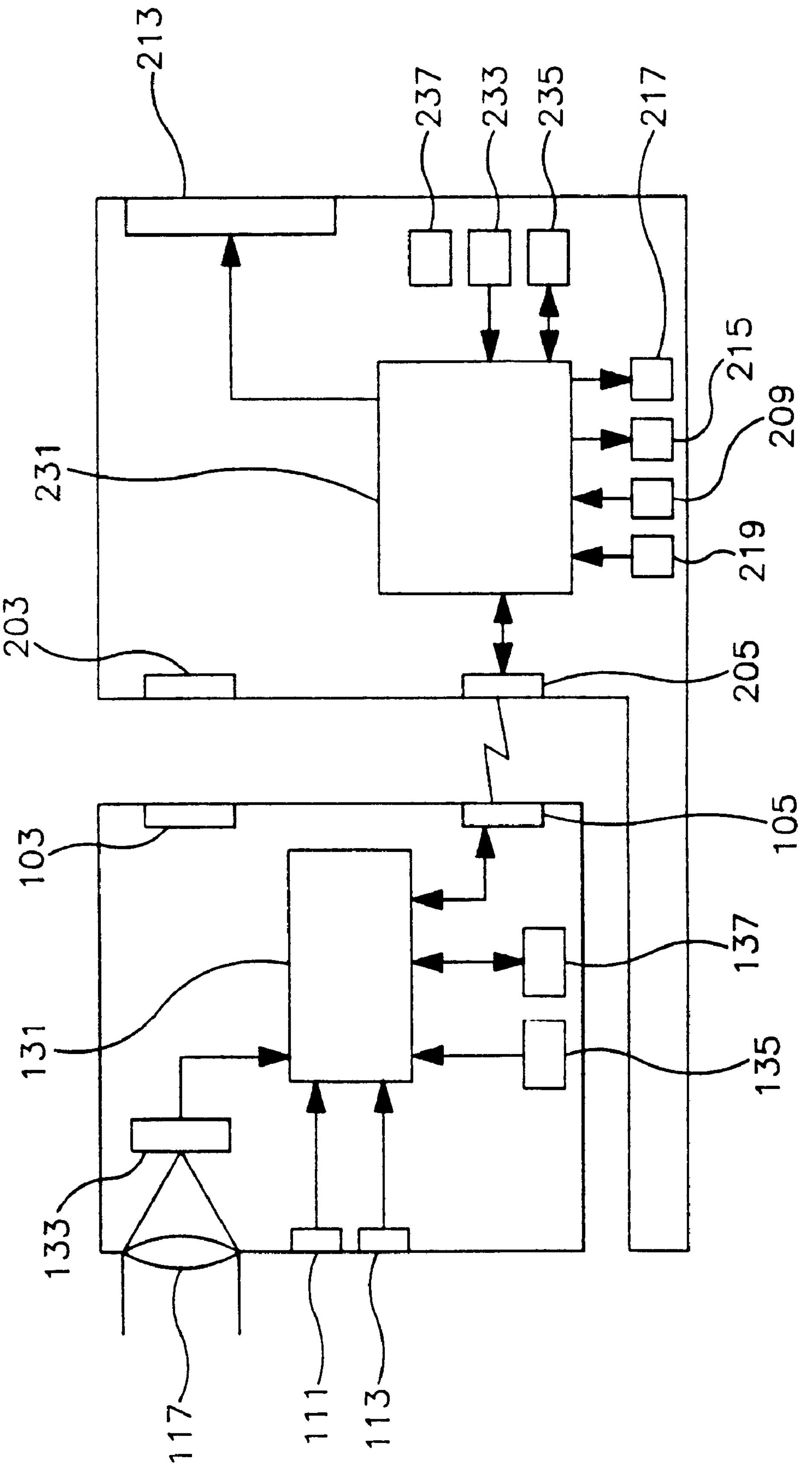
FIG. 31 is a block diagram showing a mechanism of the camera unit and the printer unit during coupled photography in accordance with the first embodiment of the present invention.

As shown in FIGS. 30 and 31, when coupled photography is performed, the central control circuits 131, 231 perform various controls by issuing mutual control commands and communication of picture data using the infrared interfaces 105, 205.

More particularly, as shown in FIG. 30 a mode requirement command is output by the central control circuit 231 to the central control circuit 131. The central control circuit 131, when it inputs the mode requirement command, outputs to the central control circuit 231 the code which represents a mode which the mode switch 113 selects. The central control circuit 131 receives from the central control circuit 231 either a photographic picture data requirement command or a playback picture data requirement command, and outputs photographic picture data or playback picture data to the central control circuit 231. Furthermore, the central control circuit 131 receives a second release command, and outputs playback picture data to the central control circuit 231.

The picture data and control commands output to the central control circuit 231 from the central control circuit 131 are modulated on infrared radiation, according to the data, by the infrared interface 105. The modulated infrared radiation is emitted toward the infrared interface 205 of the printer unit 200, and the received light is demodulated to the original data by the infrared interface 205. Similarly, the various kinds of commands output to the central control circuit 131 from the central control circuit 231 are modulated and demodulated by the infrared interfaces 205 and 105.

Figure 32:
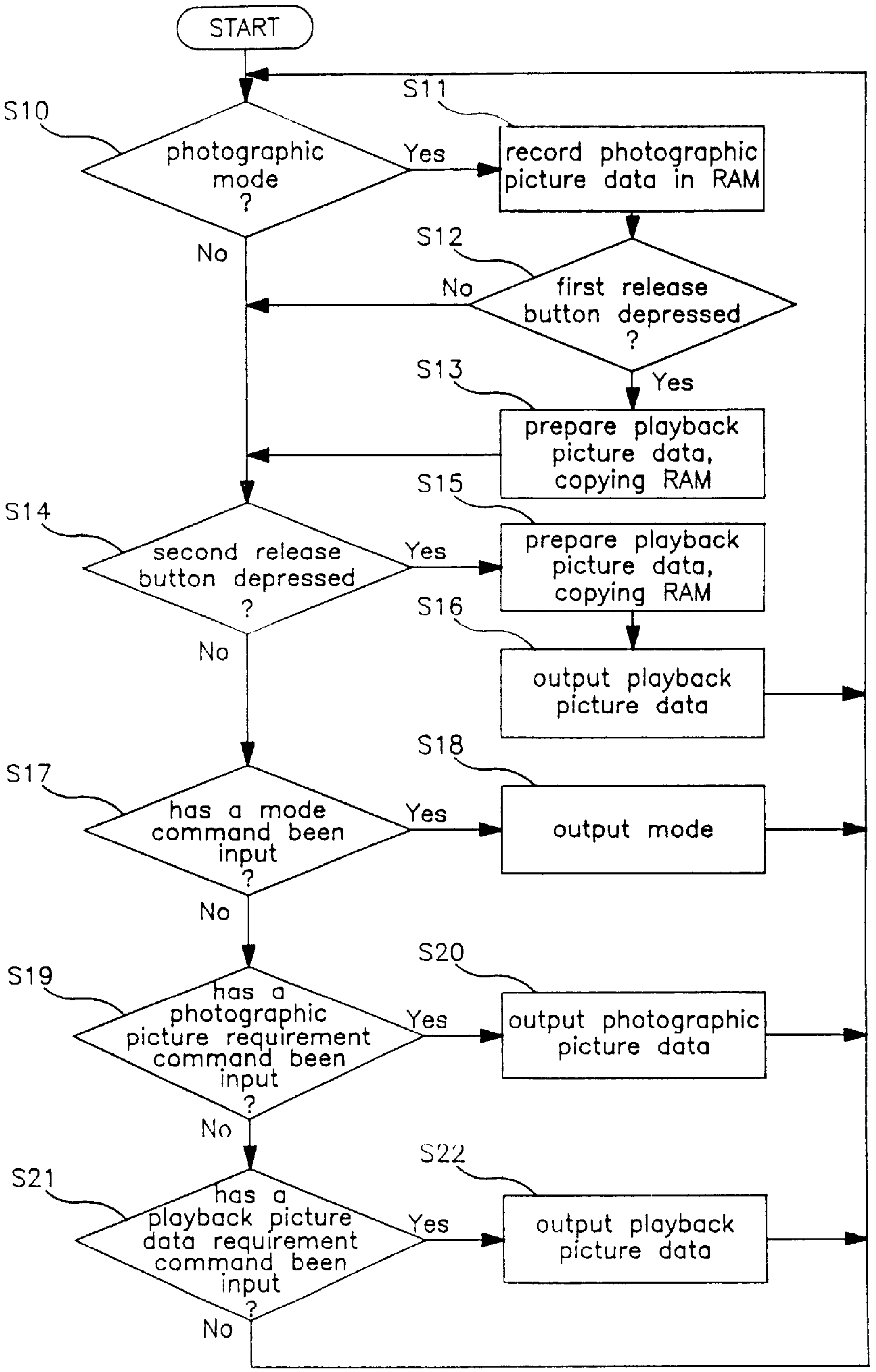
FIG. 32 is a flow chart of an operational process for performing control with the central control circuit of the camera unit during coupled photography in accordance with the first embodiment of the present invention.

FIG. 32 is a flow chart illustrating an operational process for performing control with the central control circuit 131 of the camera unit 100 in accordance with the first embodiment of the present invention.

Firstly, in step S10 the central control circuit 131 detects whether the mode switch 113 of the camera unit 100 is selecting the photographic mode or the playback mode. When the playback mode is detected, the operational process of the central control circuit 131 proceeds to step S14. When the photographic mode is detected, the operational process of the central control circuit 131 proceeds to step S11.

In step S11, an optical image which is imaged by the image storage circuit 133 through the photographic lens 117 is photoelectrically converted by the image storage circuit 133, and A/D converted picture data is formed. The picture data is stored in the picture information storage region 137*a* of the RAM 137 by the central control circuit 131. Next, the operational process performed by the central control circuit 131 continues in step S12.

In step S12, the central control circuit 131 detects whether or not the first release button 111 has been depressed. When the first release button 111 has not been depressed, the operational process proceeds to step S14. In step S12, when it is detected that the first release button 111 has been depressed, the operational process proceeds to step S13.

In step S13, the picture data stored in the picture information storage region 137*a* of the RAM 137 is read out by the central control circuit 131. The picture data read out from the picture information storage region 37*a* is written into the release time picture storage region 137*b* as playback picture data.

Next, the operational process continues in step S14. In step S14, the central control circuit 131 detects whether or not a second release command has been output from the central control circuit 231. When a second release command has not been output from the central control circuit 231, the operational process continues in step S17. When a second release command has been output, the operational process proceeds to step S15.

In step S15, similarly to step S13, the picture data stored in the picture information storage region 137*a* of the RAM 137 is read out by the central control circuit 131, and is written into the release time picture storage region 137*b* as playback picture data. When the picture data is written into the release time picture storage region 137*b*, the operational process proceeds to step S16.

In step S16, the picture data written into the release time picture storage region 137*b* is forwarded from the central control circuit 131 to the central control circuit 231. After step S16, the operational process returns to step S10.

On the other hand, when the operational process proceeds from step S14 to step S17, in step S17 the central control circuit 131 detects whether or not a mode requirement command is input from the central control circuit 231 of the printer unit 200. When the input of a mode requirement command is detected, the operational process continues in step S18.

In step S18, the central control circuit 131 outputs to the central control circuit 231 which of the photographic mode or the playback mode is selected by the mode switch 113. After step S18 is performed, the operational process returns to step S10.

In step S17, when a mode requirement command has not been received from the central control circuit 231, the operational process proceeds to step S19. In step S19, the central control circuit 131 detects whether or not a photographic picture requirement command has been input from the central control circuit 231.

When the central control circuit 131 outputs to the central control circuit 231 that the photographic mode is selected in step S18, a photographic picture data requirement command is issued to the central control circuit 131 (corresponding to step S32 hereinbelow) by the central control circuit 231. When the input of a photographic picture data requirement command is detected in step S19, the operational process proceeds to step S20.

In step S20, the central control circuit 131 outputs to the central control circuit 231 the picture data stored in the picture information storage region 137*a* of the RAM 137. After step S20 is performed, the operational process again returns to step S10.

In step S19, when the photographic picture requirement command is not output from the central control circuit 231, the operation process continues in step S21. In step S21, the central control circuit 131 detects whether or not a playback picture data requirement is received from the central control circuit 231. When the central control circuit 131 outputs to the central control circuit 231 that the playback mode is selected in step S18, a playback picture data requirement command is issued to the central control 131 (corresponding to step S39 hereinbelow) by the central control circuit 231. When the input of a playback picture data requirement command is detected in step S21, the operational process proceeds to step S22.

In step S22, the central control circuit 131 outputs to the central control circuit 231 the playback picture data stored in the release time picture information region 137*b* of the RAM 137. After step S22 is performed, the operational process again returns to step S10.

Figure 33:
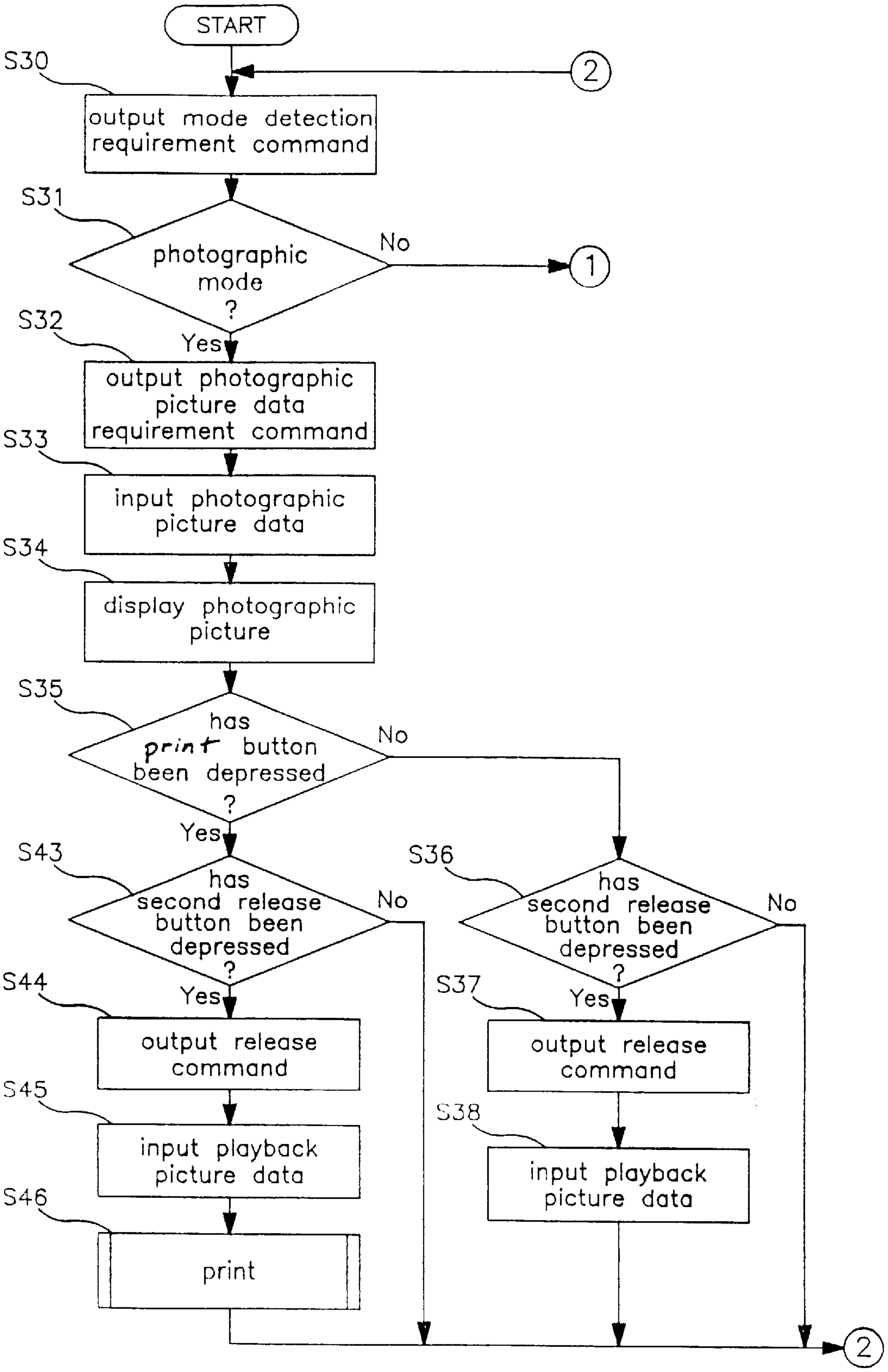
FIG. 33 is a flow chart of an operational process for performing control with the central control circuit of the printer unit during coupled photography in accordance with the first embodiment of the present invention.
Figure 34:
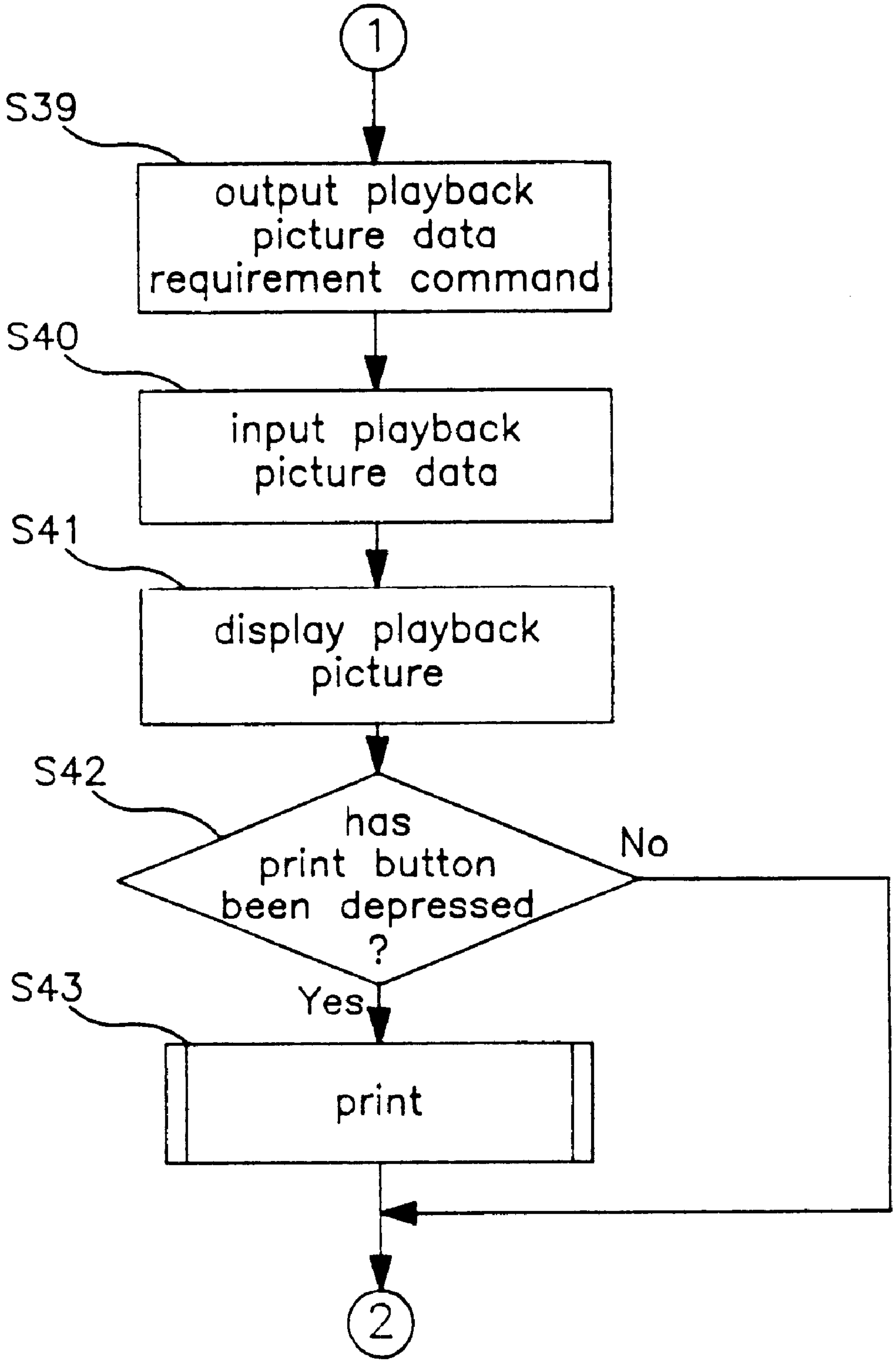
FIG. 34 is a flow chart of an operational process for performing control with the central control circuit of the printer unit during coupled photography in accordance with the first embodiment of the present invention.

FIGS. 33 and 34 are flow charts illustrating an operational process performed by the central control circuit 231 of the printer unit 200 in accordance with the first embodiment of the present invention.

Firstly, in step S30, the central control circuit 231 outputs a mode requirement command to the central control circuit 131 (corresponding to step S17 hereinabove).

Next, in step S31, the central control circuit 231 detects the mode output from the central control circuit 131. When a photographic mode is detected in step S31, the operational process proceeds to step S32. When the central control circuit 231 detects in step S31 that the mode output from the central control circuit 131 is the playback mode, the operational process proceeds to step S39.

In step S32, the central control circuit 231 outputs a photographic picture data requirement command to the central control circuit 131 (corresponding to step S19 above), and the operational process continues in step S33. In step S33, the central control circuit 231 acquires the picture data sent from the central control circuit 131, and stores the picture data in RAM 235 (corresponding to step S20 above). After step S33 is performed, the operational process proceeds to step S34.

In step S34, the central control circuit 231 displays the acquired picture data in the liquid crystal viewfinder 213.

Figure 36A:
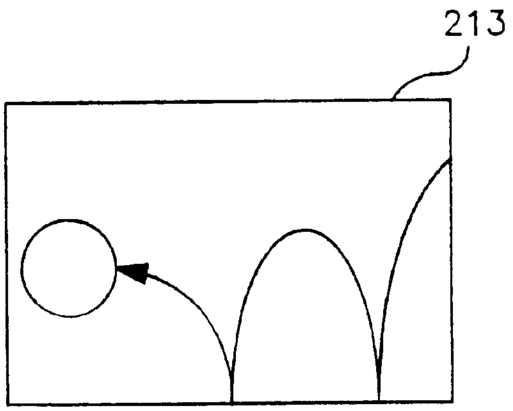
FIG. 36 is a diagram showing various states displayed in a liquid crystal viewfinder in accordance with the first embodiment of the present invention.

In accordance with the first embodiment of the invention, the optical image is photoelectrically converted at a rate of 30 times per second by the image storage circuit 133, and the respective photoelectrically converted picture data is sequentially written into the picture information region 137*a* of RAM 137. At the same time, the respective picture data sent to the printer unit 200 is sequentially written into RAM 235 by the infrared interface 105, 205, and is output to the liquid crystal viewfinder 213. Accordingly, moving picture data is displayed in the liquid crystal viewfinder 213, as shown in FIG. 36A.

Next, the operational process proceeds to step S35. In step S35, the central control circuit 231 detects whether or not the print button 219 of the printer unit 200 has been depressed. When depression of the print button 219 is detected in step S35, the operational process proceeds to step S43. When it is detected that the print button 219 is not depressed in step S35, the operational process continues in step S36.

In step S36, the central control circuit 231 detects whether or not the second release button 209 is depressed. When the second release button 209 is not depressed, the operational process continues in step S30. In step S36, when depression of the second release button 209 has been detected, the operational process proceeds to step S37.

Figure 36B:
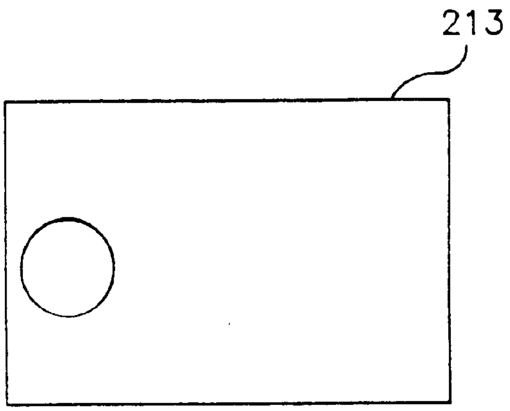

In step S37, playback picture data, which is static picture data at the time that the second release button 209 was pressed, is displayed in the liquid crystal viewfinder 213, as shown in FIG. 36B. In step S37, the central control circuit 231 outputs a second release command to the central control circuit 131 (corresponding to step S14), and the operational process continues in step S38.

In step S38, the central control circuit 231 inputs playback picture data output by the central control circuit 131 (corresponding to step S16). Then, the central control circuit 231 writes the playback picture data to the RAM 235.

Step S37 and step S38 are operations occurring when, in the photographic mode, the print button 219 is not depressed and the second release button 209 is depressed.

Figure 36C:
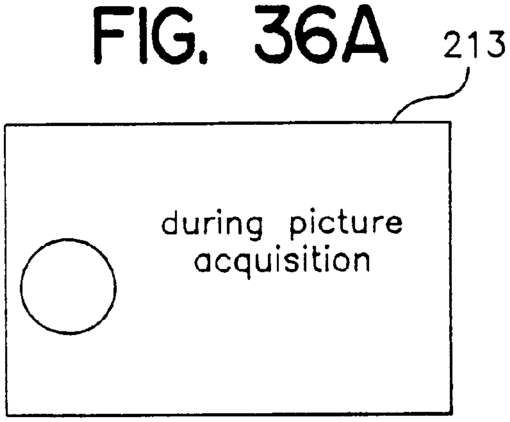

Moreover, in step S38, the playback picture data and "picture during acquisition" is displayed in the liquid crystal viewfinder 213 as shown in FIG. 36C. In the above-described manner, in the photographic mode, when the print button 219 is not depressed and when the second release button 209 is depressed, playback picture data and "acquiring data" are displayed in the liquid crystal viewfinder 213. The operational process then returns to step S30.

On the other hand, when it is detected that the print button 219 is depressed in step S35, the operational process proceeds to step S43. In step S43, similarly to step S36, it is detected whether or not the second release button 209 is depressed.

When it is detected in step S43 that the second release button 209 is not depressed, the operational process proceeds to step S30. When it is detected in step S43 that the second release button 209 is depressed, the operational process continues in step S44. Moreover, in step S43, playback picture data is displayed in the liquid crystal viewfinder 213, as shown in FIG. 36B.

In step S44, similarly to step S37, the central control circuit 231 outputs a second release command to the central control circuit 131 (corresponding to step S14 above), and the operational process proceeds to step S45.

In step S45, the central control circuit 231 inputs playback picture data output from the central control circuit 131 (corresponding to step S16 above). Then, the central control circuit 231 writes the playback picture data to the RAM 235. Moreover, in step S45, the playback picture data and "picture acquisition in progress" are displayed in the liquid crystal viewfinder 213. After step S45 is performed, the operational process proceeds to the print subroutine of step S46.

Steps S44–S46 are operations performed in the photographic mode, when the second release button 209 is depressed while depressing the print button 219.

In the print subroutine of step S46, the central control circuit 231 performs an operational process as set forth in steps S51–S58 of the flow chart shown in FIG. 35, as will be discussed in more detail hereinbelow.

Figure 36D:
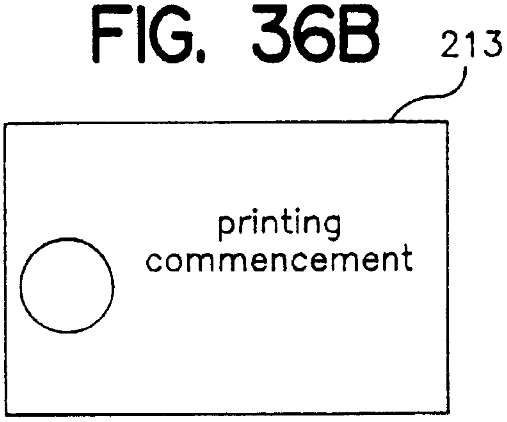

Firstly, in step S51, the central control circuit 231 displays playback picture data and "print commencement" in the liquid crystal viewfinder 213, as shown in FIG. 36D.

Figure 37:
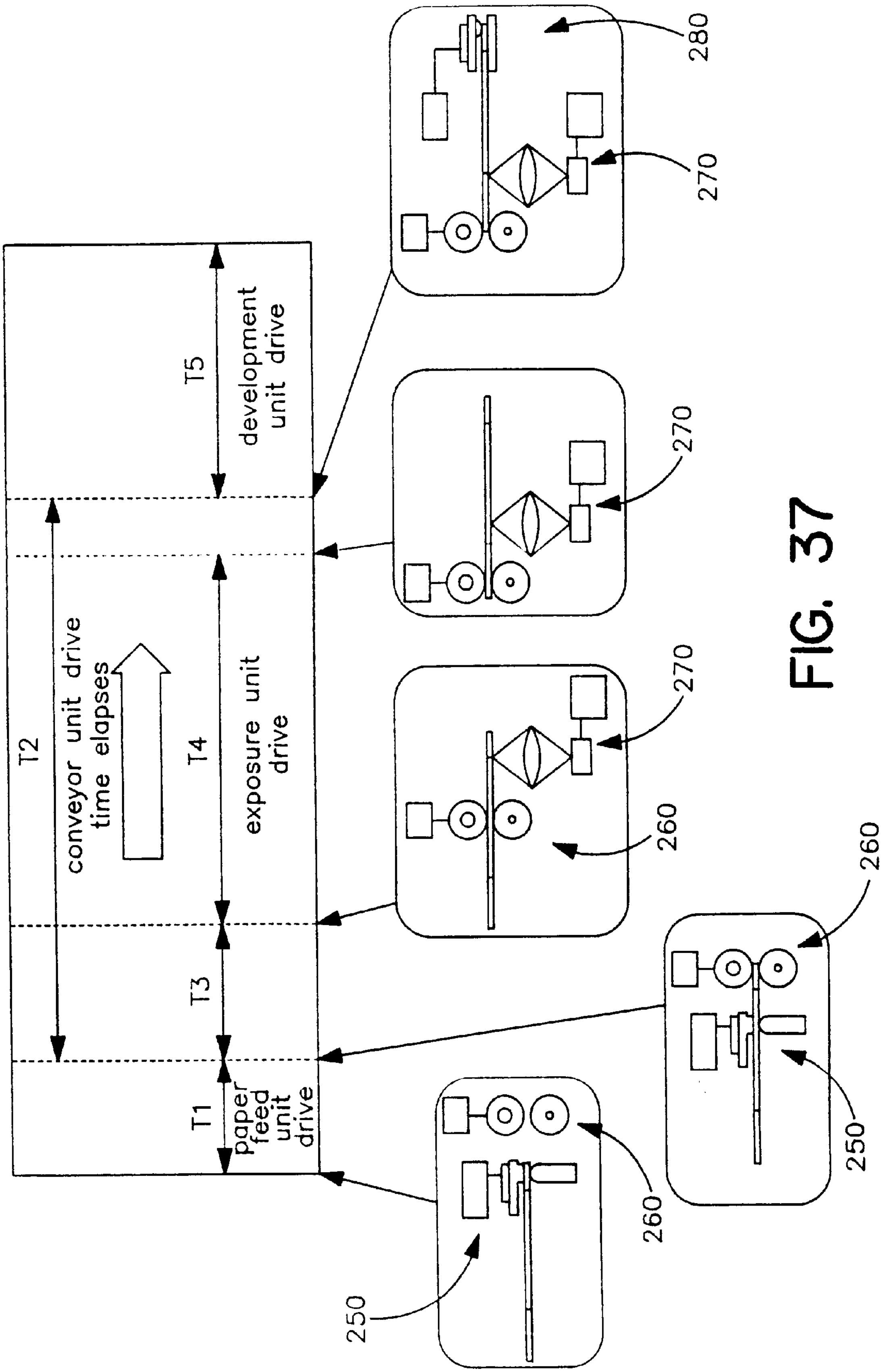
FIG. 37 is a diagram showing a drive sequence and drive timing of the paper feed unit, conveyor unit, exposure unit, and development unit in accordance with the first embodiment of the present invention.

Next, in step S52, the central control circuit 231 controls the paper feed unit 250. As shown in FIG. 37, the first ultrasonic motor 23 of the paper feed unit 250 is driven for the period of time T1. By driving the first ultrasonic motor 23, the photosensitive, pressure-sensitive paper 21 is forwarded from the storage cassette 290 within the printer unit 200. After step S52 is performed, the operational process proceeds to step S53. In step S53, the central control circuit 231 controls the conveyor unit 260. As shown in FIG. 37, the conveyor unit 260 is driven for the period of time T2 to convey the photosensitive, pressure-sensitive paper 21 toward the exposure unit 270. Next, as shown in FIG. 37, after a period T3 has elapsed from the commencement of driving the conveyor unit 260, the central control circuit 231 controls the exposure unit 270 and exposes the latent image of the playback picture data written in the RAM 235 onto the photosensitive, pressure-sensitive paper 21.

Figure 36E:
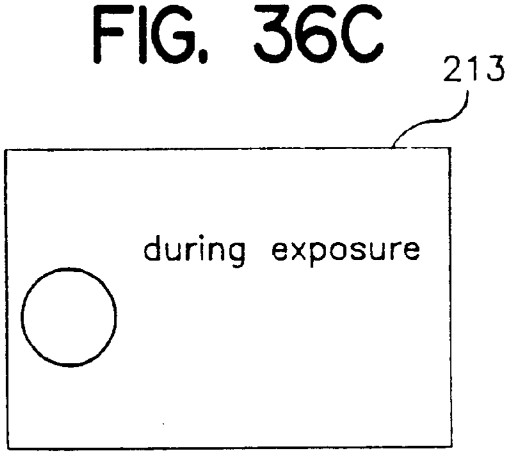

Continuing in step S54, during the performance of exposure, the central control circuit 231 displays the playback picture data and "exposure in progress" in the liquid crystal viewfinder 213, as shown in FIG. 36E. After step S54 is performed, the operational process proceeds to step S55.

In step S55, the central control circuit 231 controls the exposure unit 270 to end the exposure onto the photosensitive, pressure-sensitive paper 21 after a time T4 has elapsed from the control commencement of the exposure unit 270, as shown in FIG. 37.

Next, in step S56, the central control circuit 231 controls the conveyor unit 260 to end the conveying of the photosensitive, pressure-sensitive paper 21 after a time T2 has elapsed, as shown in FIG. 37, and the operational process then proceeds to step S57.

Figure 36F:
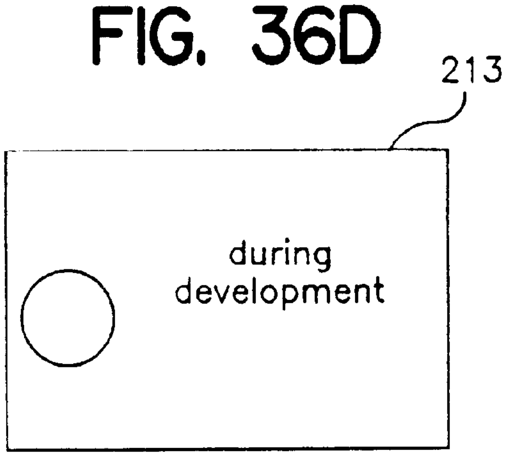

In step S57, the central control circuit 231 controls the development unit 280 for a period of time T5, and performs development of the photosensitive, pressure-sensitive paper 21, as shown in FIG. 37. While development is controlled by the central control circuit 231, the central control circuit 231 displays the playback picture data and "development in progress" in the liquid crystal viewfinder 213, as shown in FIG. 36F. The operational process then proceeds to step S58.

In step S58, the central control circuit 231 controls the development unit 280 to stop the development of the photosensitive, pressure-sensitive paper 21. The printing of playback picture data then ends. After the printing of playback picture data, as shown in FIG. 33, the operational process returns to step S30 from step S46.

In the above-described manner, in the photographic mode, when the second release button 209 is depressed while depressing the print button 219, the playback picture data is printed.

In step S31, when the playback mode is detected and the operational process proceeds to step S39, the central control circuit 231 controls the operational process shown in the flow chart of FIG. 34.

Specifically, as shown in FIG. 34, firstly, in step S39, the central control circuit 231 outputs a playback picture data requirement command to the central control circuit 131 (corresponding to step S21 above). Next, the operational process proceeds to step S40.

In step S40, the central control circuit 231 acquires the playback picture data sent from the central control circuit 131, and stores the acquired playback picture data in RAM 235 (corresponding to step S22 above). Next, the operational process proceeds to step S41. In step S41, the central control circuit 231 displays the stored playback picture data in the liquid crystal viewfinder 213, and the operational process continues in step S42. In step S42, the central control circuit 231 detects whether or not the print button 219 of the printer unit 200 has been depressed. When depression of the print button 219 is not detected in step S42, the operational process returns to step S30. When depression of the print button 219 is detected in step S42, operational process proceeds to step S43.

Figure 35:
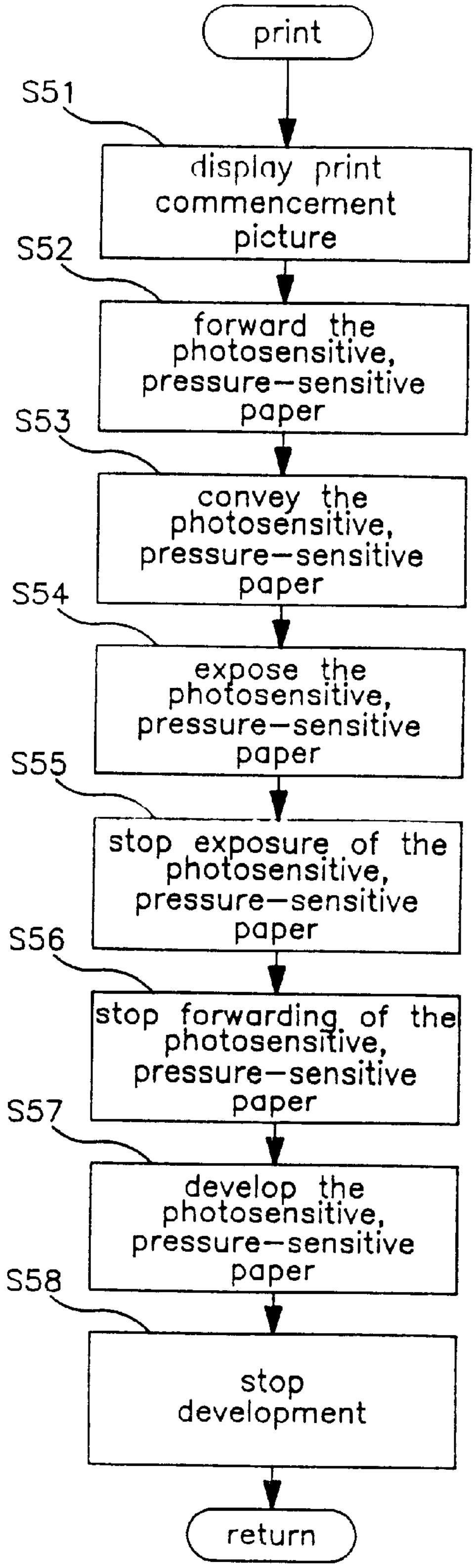
FIG. 35 is a flow chart of an operational process for performing control with the central control circuit of the printer unit during the printing of picture data in accordance with the first embodiment of the present invention.

In step S43, the print subroutine is performed, and the central control circuit 231 executes the operational process set forth in steps S51–S58 of the flow chart shown in FIG. 35.

The central control circuit 231 then controls the paper feed unit 250, conveyor unit 260, exposure unit 270, and development unit 280 to perform printing of the playback picture data.

In the above-described manner, in the playback mode, when print button 219 is depressed, the playback picture data is printed.

An operation of the electronic camera when the camera unit 100 performs independent photography will now be described below in accordance with the first embodiment of the invention.

Figure 38:
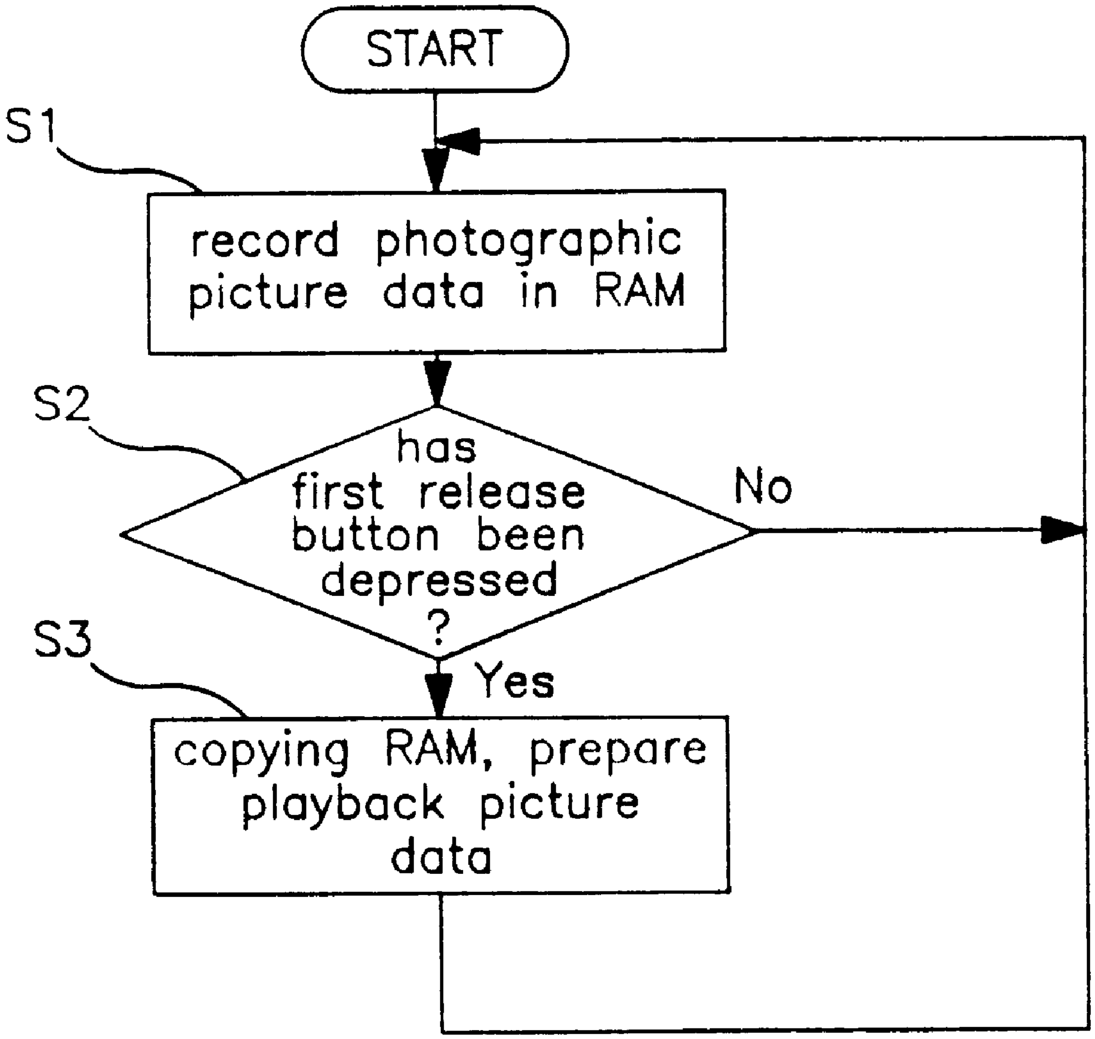
FIG. 38 is a flow chart of an operational process for performing control with the central control circuit of the camera unit during independent photography in accordance with the first embodiment of the present invention.

In the case of independent photography, the central control circuit 131 of the camera unit 100 performs the operational process set forth in the flow chart shown in FIG. 38. Specifically, firstly, in step S1, the central control circuit 131 forms picture data by photoelectric conversion and A/D conversion by the image storage circuit 133. The central control circuit 131 stores the picture data in the picture information region 137*a* of the RAM 137, and the operational process continues in step S2.

In step S2, the central control circuit 131 detects whether or not the first release button 111 is depressed. When it is detected that the first release button 111 is not depressed, the operational process proceeds to step S1. When depression of the first release button 111 is detected in step S2, the operational process proceeds to step S3.

In step S3, the central control circuit 131 reads out the picture data stored in the picture information region 137*a* of the RAM 137, and writes the picture data in the release time picture information region 137*b*. Next, the operational process returns to step S1.

In an electronic camera having a printer in accordance with the embodiments of the invention described above, the camera unit 100 which can be handled with one hand or both hands includes the image storage circuit 133, and the RAM 137 which stores the picture data photoelectrically converted and A/D converted by the image storage circuit 133. Further, in accordance with the present invention, the electronic camera with printer includes a portable camera unit 100 and printer unit 200, and the printer unit 200, which can be handled with one hand or both hands, includes a paper feed unit 250, conveyor unit 260, exposure unit 270 and development unit 280 to effect printing.

Moreover, the camera unit 100 and the printer unit 200 can be freely detachably connected by the connectors 103, 103 of the camera unit 100, and the connectors 203, 203 of the printer unit 200. Furthermore, because the communication of picture data and control information is performed by the infrared interface 105 of the camera unit 100 and the infrared interface unit 205 of the printer unit 200, without connecting the camera unit 100 and the printer unit 200 by a signal line, or the like, for example, the camera unit 100 and printer unit 200 can be connected by the simple connector units 103, 203, which are permanent magnets or the like. In the case that the connectors 103, 103 and the connectors 203, 203 are permanent magnets, the simple connector units 103, 203 can connect the camera unit 100 with the printer unit 200 without consuming the energy in the battery 141.

Therefore, because the connectors 103 are arranged in a position opposite to the position of the optical image side of the camera unit 100, and the connectors 203 are arranged in a position on the optical image side of the printer unit 200, the printer unit 200 can be located in a position opposite the optical image of the camera unit 100.

Furthermore, because the printer unit 200 includes a liquid crystal display 213 to display picture data, picture data which is photographed and picture data which is printed can be displayed by the liquid crystal display 213.

Moreover, the release of picture data can be performed from either of the camera unit 100 or the printer unit 200 by operation of the first release button 111, which is on the camera unit 100, or by operation of the second release button 209, which is on the printer unit 200, because picture data photoelectrically converted by the image storage circuit 133 is stored in the RAM 137.

Further, because the first release button 111 and the second release button 209 are arranged in mutually symmetrical positions separated from the center of the camera unit 100, operation can be performed with either the right hand or the left hand.

Furthermore, because the picture data is stored in the RAM 137 by the operation of at least one of the first release button 111 and the second release button 209, release of picture data can be performed by either of the camera unit 100 or the printer unit 200.

Moreover, because the printer unit 200 includes a print button 219 to instruct printing of the picture data, picture data can easily be printed.

Moreover, because the print button 219 and the second release button 209 are arranged in mutually symmetrical positions separated from the center of the camera unit 100, while operating the second release button 209 with one hand, the print button 219 can be operated with the other hand.

Furthermore, because the camera unit 100 has a mode switch 113 to select the operating mode, the commencement of printing of picture data is controlled by the operation of the second release button 209 and the print button 219 corresponding to the operating mode selected by the mode switch 113, and the storage of picture data in the RAM 137 is controlled by the combination of the operation of the second release button 209 and the print button 219.

Moreover, when operating the second release button 209 and the print button 219 together, because the control is such as to print picture data stored in RAM 137 according to the operating mode selected by the mode switch 113, when storing picture data in the RAM 137, for example, even if only the print button 219 is accidentally operated, nothing is printed, and erroneous operation can prevent printing. Accordingly, useless printing of the photosensitive, pressure-sensitive paper 21 can be prevented.

Still further, when the operating mode selected by the mode switch 113 is the playback mode, when the print button 219 is operated, the printer unit 200 is controlled to print the picture data, and the picture data photographed in the photographic mode can easily be printed in the playback mode.

Moreover, because the printer unit 200 includes a storage unit 290 to store the photosensitive, pressure-sensitive paper 21, a paper feed unit 250 to feed the photosensitive, pressure-sensitive paper 21, a conveyor unit 260 to convey the photosensitive, pressure-sensitive paper 21, an exposure unit 270 to expose the latent image on the photosensitive, pressure-sensitive paper 21, and a development unit 280 to perform coloration of the latent image, the printer unit 200 does not have a built-in consumption member for ink and the like, and can print with a simple mechanism.

Further, because the paper feed unit 250 includes a first ultrasonic motor 23 which vibrates at a frequency of 48 kHz, which is above the audible range, the photosensitive, pressure sensitive paper 21 can be fed without the generation of audible noise.

Furthermore, because the first ultrasonic motor 23 comprises a piezoelectric element 27 and a vibration plate 29 adhered to the piezoelectric element 27, the photosensitive, pressure-sensitive paper 21 can be fed by a simple mechanism.

Moreover, because a parallelepipedal projection 29*a* is formed on the vibration plate 29 which contacts the photosensitive, pressure-sensitive paper 21 at one broader surface, the photosensitive, pressure-sensitive paper 21 can be reliably fed without being developed by the compressive force caused by the ultrasonic vibration.

In accordance with the first embodiment of present invention, a light screening door 293 opens and closes according to the attachment or removal of the storage unit 290, and can prevent exposure to external light of the photosensitive, pressure-sensitive paper 21 stored in the storage unit 290.

Furthermore, the conveyor unit 260 includes a freely rotatable first roller 261 and a second roller 263 which is driven in rotation. Because the photosensitive, pressure-sensitive paper 21 is interposed between the first roller 261 and the second roller 263, the photosensitive, pressure-sensitive paper 21 can be reliably delivered to the exposure unit 270. Accordingly, the latent image in the photosensitive, pressure-sensitive paper 21 can be exposed without disturbance.

Moreover, because a second ultrasonic motor 31 is provided in the development unit 280, which ultrasonic motor 31 vibrates at a frequency of 48 kHz, above the audible range, the photosensitive, pressure-sensitive paper 21 can be developed by the second ultrasonic motor 31 without the generation of audible noise.

In accordance with the first embodiment of present invention, because the second ultrasonic motor 31 comprises a piezoelectric element 32, and a vibration plate 33 adhered to the piezoelectric element 32, the photosensitive, pressure-sensitive paper 21 can be developed by a simple mechanism, and the photosensitive, pressure-sensitive paper 21 can be simultaneously moved. Accordingly, the printer unit 200 can be formed having a small size and light weight.

Moreover, because a projection 33*a* is formed on the vibration plate 33 extending in a direction at right angles to the direction M of movement of the photosensitive, pressure-sensitive paper 21, the photosensitive, pressure-sensitive paper 21 can be reliably moved and vibrationally compressed, and coloration of the latent image can be performed.

In accordance with the present invention, because the interval D3 between the interposition position P1 of the conveyor unit 260 and the center position P3 of the projection 33*a* of the development unit 280 is shorter than the length D2 of the side of the photosensitive, pressure-sensitive paper 21 in the direction of movement M, the photosensitive, pressure-sensitive paper 21 can be reliably moved by the conveyor unit 260 and development unit 280, without being brought to a stop within the printer unit 200.

Furthermore, because the interval D4 between the exposure position P2 of the exposure unit 270 and the center position P3 of the projection 33*a* of the development unit 280 is longer than the length D1 of the front end 21*a* of the photosensitive, pressure-sensitive paper 21 and the rear end 21*c* of the photosensitive region 21*b*, while the photosensitive, pressure-sensitive paper 21 is exposed, the photosensitive, pressure-sensitive paper 21 can be moved by only the conveyor unit 260 stably at a constant speed. Accordingly, exposure of the photosensitive, pressure-sensitive paper 21 can be performed without irregularity.

Second Preferred Embodiment

Figure 39:
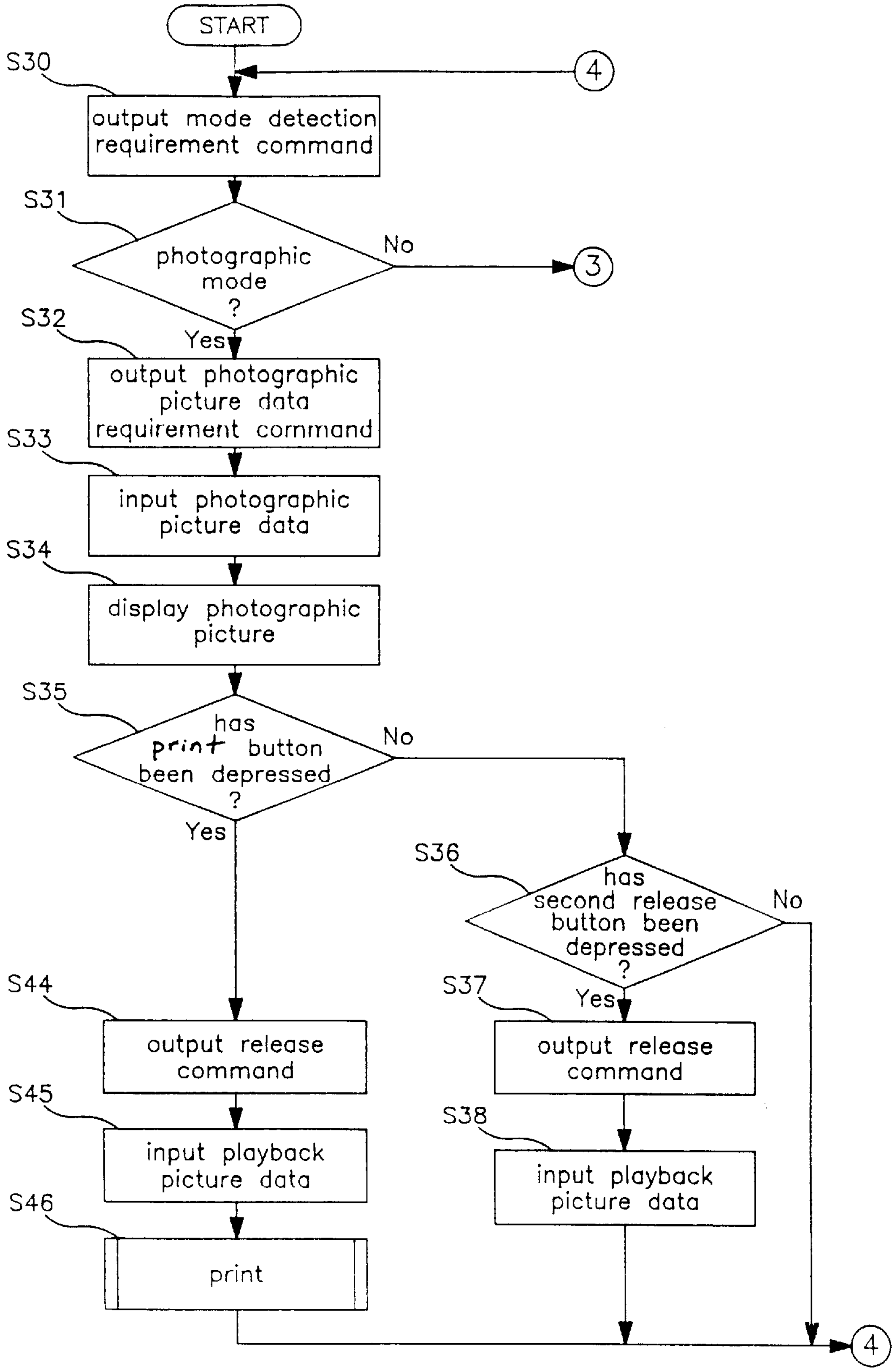
FIG. 39 is a flow chart of an operational process for performing control of a central control circuit of a printer unit of an electronic camera having a printer in accordance with a second embodiment of the present invention.
Figure 40:
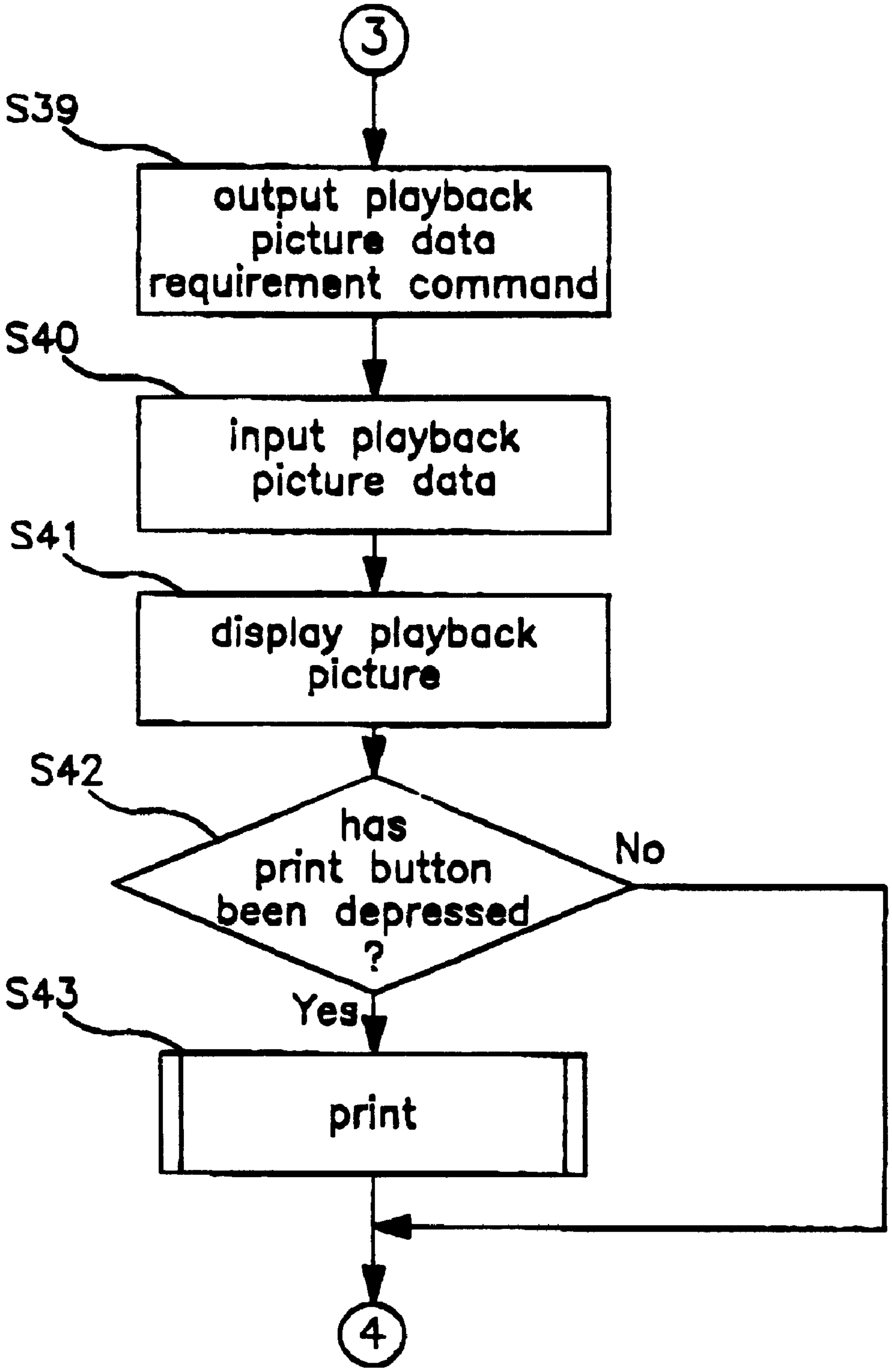
FIG. 40 is a flow chart of an operational process for performing control with the central control circuit of the printer unit of an electronic camera having a printer in accordance with the second embodiment of the present invention.

FIGS. 39 and 40 are flow charts illustrating a control operational process performed by the central control circuit 231 in the printer unit 200 in accordance with a second preferred embodiment of the present invention.

In accordance with the second embodiment of the present invention, in the control performed the central control circuit 231, the operational control performed in step S43 of the first embodiment is omitted, and it is possible for picture data to be printed by only the operation of the print button 219.

The electronic camera having a printer in accordance with the second embodiment of the invention obtains effects similar to those of the first embodiment of the invention. However, in accordance with the second embodiment, when the mode switch 113 selects the photographic mode as the operating mode and the print button 219 is operated, the central control circuit 231 controls the infrared interface 205, the paper feed unit 250, the conveyor unit 260, the exposure unit 270 and the development unit 280 to print the picture data stored in RAM 137. Thus, the picture data can easily be printed by only the operation of the print button 219. Accordingly, the photographic operation and print operation can easily be performed by one-hand operation.

Third Preferred Embodiment

Figure 41:
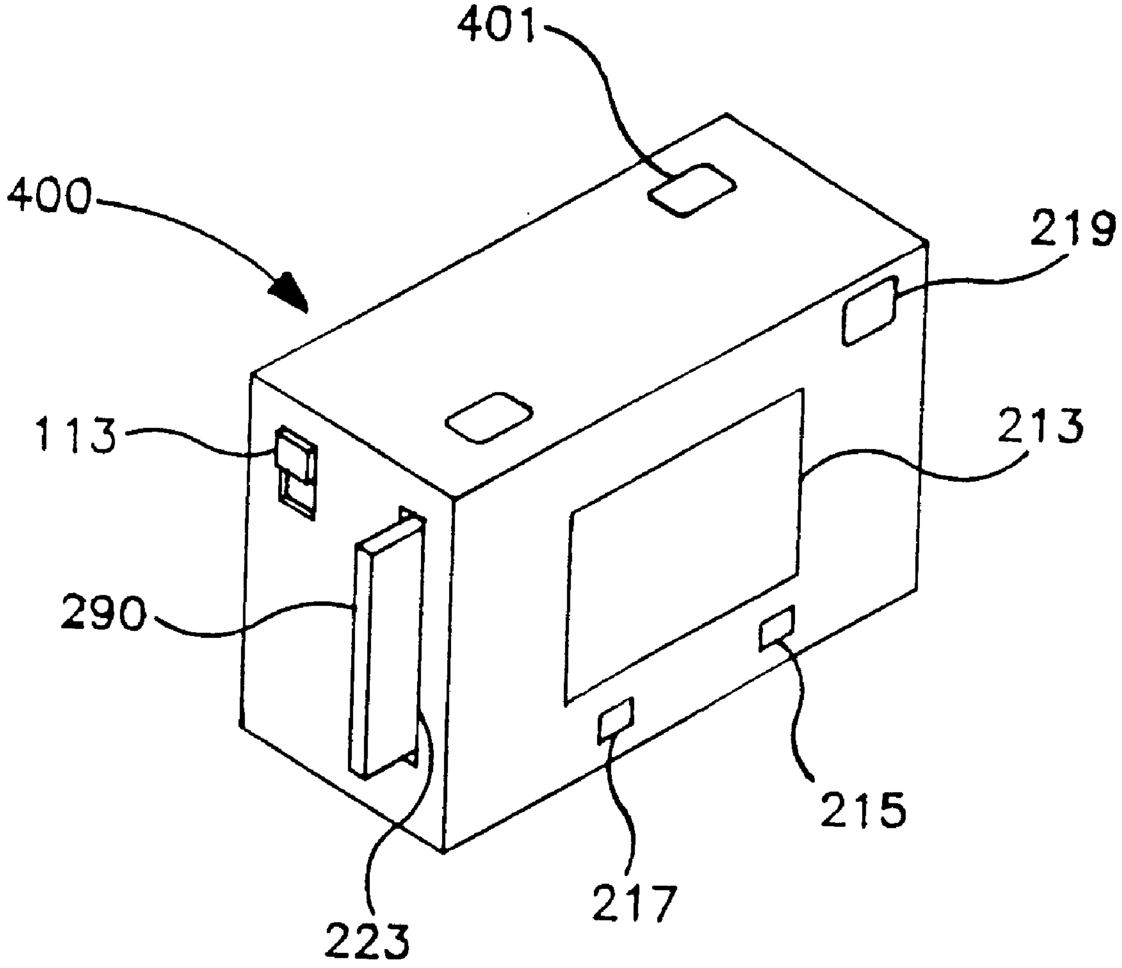
FIG. 41 is an oblique diagram of an electronic camera having a printer in accordance with a third embodiment of the present invention.

FIG. 41 illustrates an electronic camera having a printer in accordance with a third preferred embodiment of the present invention. In accordance with the third embodiment, the camera body 100 is integral with the printer body 200, built into a body unit 400. Furthermore, elements which are the same as or similar to those described above with respect to the first embodiment are referred to by like reference symbols, and a detailed description of these like elements will not be repeated here.

As shown in FIG. 41, the mode switch 113 is arranged on the side surface of the body unit 400. An insertion aperture 223 is formed in a position adjacent to the mode switch 113. A storage cassette 290 is arranged to be freely detachable in the insertion aperture 223. A release button 401 is positioned in the top surface of the body unit 400. A print button 219, liquid crystal viewfinder 213, on-line lamp 215, and print lamp 217 are arranged in the back surface of the body unit 400.

Figure 42:
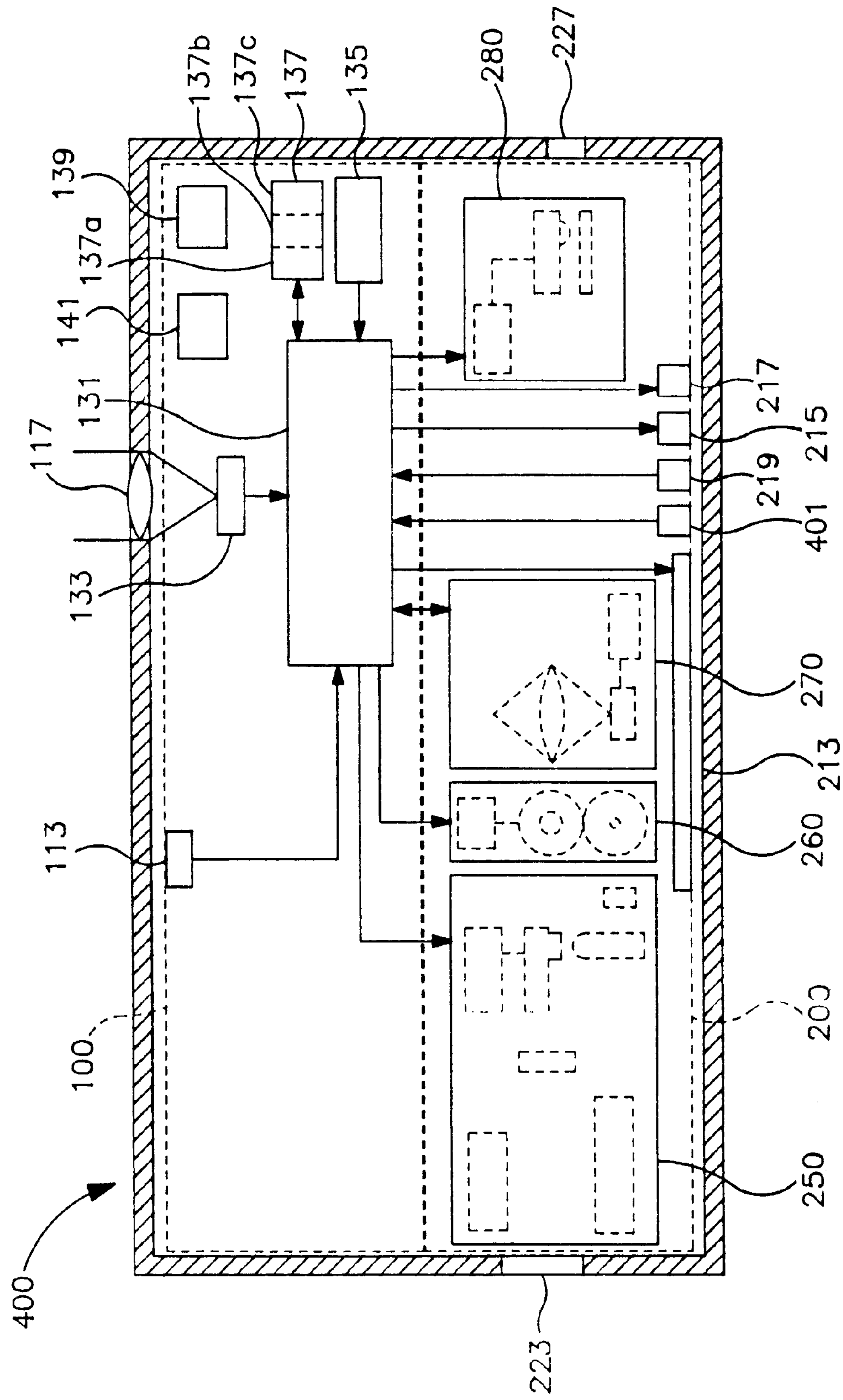
FIG. 42 is a block diagram showing mechanisms of the electronic camera having a printer in accordance with the third embodiment of the present invention.

Moreover, as shown in the functional block diagram of FIG. 42, a photographic lens 117, a mode switch 113, a central control circuit 131, an image storage circuit 133, ROM 135, RAM 137, an interface unit 139 and battery 141 connected to an IC card and the like, are built into the camera unit 100 within the body unit 400.

The printer unit 200 within the body unit 400 includes a liquid crystal viewfinder 213, on-line lamp 215, print lamp 217, print button 219, paper feed unit 250, conveyor unit 260, exposure unit 270, development unit 280, and release button 401.

In accordance with the third embodiment, all the functions of the camera unit 100 and print unit 200 are controlled by the central control circuit 131. Moreover, when the release button 401 is operated, picture data is stored in the RAM 137 by control of the central control circuit 131. Furthermore, picture data stored in the RAM 137 can be displayed in the liquid crystal viewfinder 213.

The electronic camera having a printer in accordance with the third embodiment of the invention obtains effects which are similar to the first embodiment of the invention. However, in accordance with the third embodiment, because the camera unit 100 and printer unit 200 are integrated, all the functions can be controlled by the central control circuit 131. Moreover, because the infrared interfaces 105, 205 become unnecessary, the mechanism of the camera unit 100 and print unit 200 can be made simple in comparison with the first embodiment. Accordingly, the manufacturing cost can be greatly reduced.

Moreover, because the printer unit 200 includes a liquid crystal viewfinder 213 to display the picture data, the picture data which is photographed and the picture data which is printed can be displayed by the liquid crystal viewfinder 213.

Accordingly, because picture data stored in RAM 137 is displayed in the liquid crystal viewfinder 213, playback data stored in RAM 137 can be displayed in the liquid crystal viewfinder 213.

Furthermore, in accordance with the third embodiment, the printer unit 200 has a release button 401, and the photoelectrically converted picture data are stored in the RAM 137 by the operation of the release button 401.

Fourth Preferred Embodiment

Figure 43:
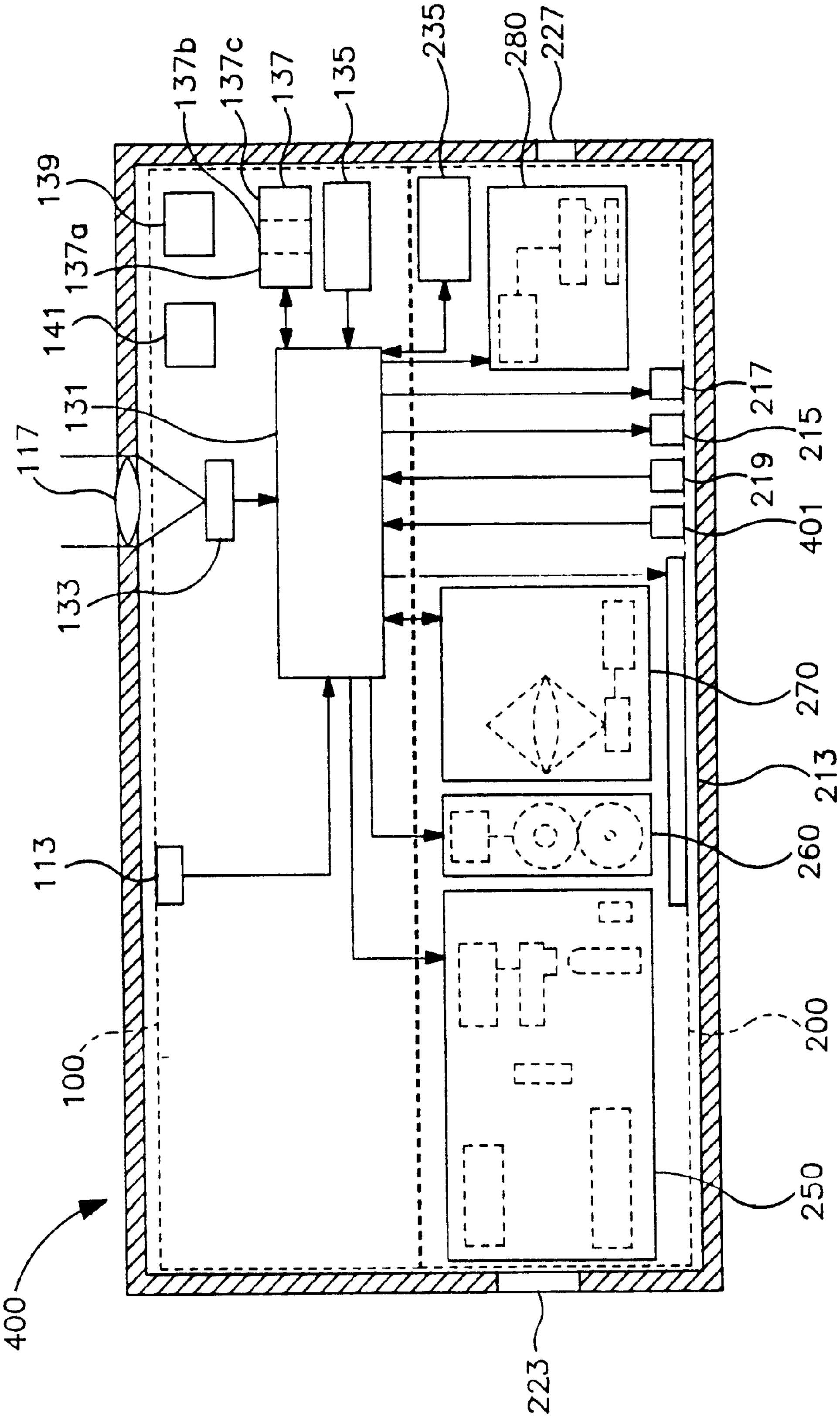
FIG. 43 is a block diagram of an electronic camera having a printer in accordance with a fourth embodiment of the present invention.
Figure 44:
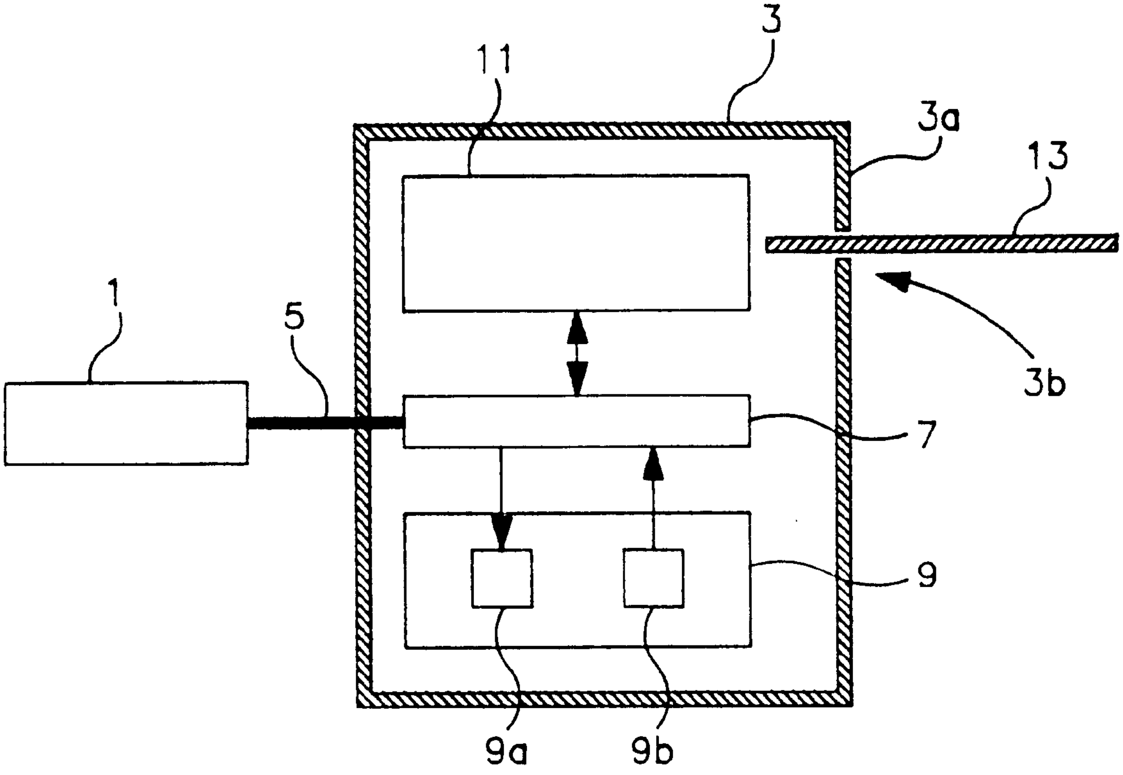
PRIOR ART FIG. 44
FIG. 44 is a cross-sectional diagram of a prior art electronic camera and printer.

FIG. 43 illustrates an electronic camera having a printer in accordance with a fourth preferred embodiment of the present invention. In accordance with the fourth embodiment, a RAM 235 is built into the printer unit 200 within the body unit 400. Furthermore, elements described below with respect to the fourth embodiment of the invention which are the same as or similar to those described above with respect to the first, second and third embodiments are referred to by like reference numerals, and a detailed description of these like elements will not be repeated here.

In accordance with the fourth embodiment, picture data is stored in the RAM 137 by the operation of the release button 401; however, picture data which is transmitted to the RAM 235 and stored in the RAM 235 is displayed in the liquid crystal viewfinder 213.

The electronic camera with printer in accordance with the fourth embodiment obtains effects similar to those obtained with the first and third embodiments. However, in accordance with the fourth embodiment, because the printer unit 200 includes the RAM 235, picture data which are transmitted to the RAM 235 from the RAM 137 is displayed in the liquid crystal viewfinder 213. Further, the picture data transferred from the RAM 137 to the RAM 235 can be printed while displaying the picture data in the liquid crystal viewfinder 213.

Furthermore, in accordance with the first embodiment of the invention, the camera unit 100 stores photoelectrically converted and A/D converted picture data in the RAM 137. However, there is no limitation to storing picture data in a RAM 137. For example, the picture data may be stored in an IC card or the like, via the interface unit 139. In this case, picture data can be stored without limitation of memory capacity.

Moreover, in accordance with the first embodiment of the invention, the mode switch 113 was described as arranged in the camera unit 100. However, the present invention is not limited to the mode switch being in the camera unit 100. For example, the mode switch 113 may be arranged in the printer unit 200.

In accordance with the first embodiment of the present invention, the connection units 103 and 203 are described as formed by permanent magnets. However, the present invention is not limited to the connection units 103, 203 being formed by permanent magnets. For example, the connection units 103 and 203 may be formed by simple locking levers and locking holes, and may be used if they can connect the camera unit 100 and the printer unit 200 to the degree that communication by the infrared interfaces 105, 205 can be reliably performed.

Moreover, in accordance with the first embodiment of the present invention, the projection 29*a* of the first ultrasonic motor 23 of the paper feed unit 250, and the projection 33*a* of the second ultrasonic motor 31 of the development unit 280, are set to the maximum amplitude positions. However, the present invention is not limited to setting the projections 29*a*, 33*a* at the maximum amplitude positions. For example, the projections may be set to maximum amplitude positions WP2, WP3, WP4.

In accordance with the first embodiment of the invention, the expansion and contraction E of the piezoelectric elements 27, 32 is at a frequency of 48 kHz. However, the present invention is not limited to setting the expansion and contraction to a frequency of 48 kHz. For example, the expansion and contraction E of the piezoelectric elements 27, 32 may be at a frequency such that a standing wave W arises in the projection 29*a* of the first ultrasonic motor 23 and in the projection 33*a* of the second ultrasonic motor 31.

In accordance with embodiments of the present invention, camera unit includes an image storage device and a first memory to store the picture data, photoelectrically converted by this image storage device, and the printer unit includes a printing device which prints the picture data. Accordingly, the electronic camera with printer is a portable camera unit and printer unit.

In accordance with the embodiments of the present invention, the camera unit and the printer unit are freely, detachably connected by the first connector of the camera unit and the second connector of the printer unit, and because communication of picture data and control information is performed by first communication device of the camera unit and second communication device of the printer unit, the camera unit and the printer unit can easily be connected together by the first and second connectors, without connection using signal wires and the like.

In accordance with embodiments of the present invention, because the first connector is arranged in the opposite side of the position of the optical image side of the camera unit, and the second connector is arranged in a position on the optical image side of the printer unit, the printer unit can be arranged in a position of the opposite side to the optical image of the camera body.

In accordance with embodiments of the present invention, because the printer unit includes a display to display picture data, photographed picture data and printed picture data can be displayed by display.

In accordance with embodiments of the present invention, because the picture data photoelectrically converted by the image storage device is stored in the first memory by the operation of the first release device included in the camera unit, or by the operation of the second release device included in the printer unit, release can be performed of picture data from either the camera unit or the printer unit.

In accordance with embodiments of the present invention, because the first release device and the second release device are arranged, mutually symmetrically, in positions separated from the center of the camera unit, the release operation can be performed with either the right hand or the left hand.

In accordance with embodiments of the present invention, because the picture data is stored in the first memory by the operation of at least one of the first release device and the second release device, the release of picture data can be performed at either of the camera unit or the printer unit.

In accordance with embodiments of the present invention, because the printer unit includes an instruction device to instruct printing of picture data, picture data can easily be printed.

In accordance with embodiments of the present invention, because the instruction device and the second release device are mutually symmetrically arranged in positions separated from the center of the camera, when release of the photographic image is performed, operating the second release means with one hand, the photographic image can be printed, operating the instruction device simultaneously with the other hand.

In accordance with embodiments of the present invention, the camera unit includes a selection device to select the operating mode, and according to the operating mode selected by the selection device, because the start of printing is controlled, by operating the second release device and the instruction device, controlling storing of picture data to the first memory, by combining the operation of the second release device and the instruction device, can control respectively, storage to the first memory, and a procedure of printing of picture data.

In accordance with embodiments of the present invention, because the picture data stored in the first memory is printed, storing picture data in the first memory, when the operating mode selected by the selection device is the photographic mode, the second release device and the instruction device operate together, for example, even if the instruction device alone is operated accidentally, nothing is printed, and printing can be stopped by erroneous operation. Accordingly, wasteful printing of photosensitive, pressure-sensitive paper can be prevented.

In accordance with embodiments of the present invention, when the instruction device is operated, and the operating mode selected by the selection device is the playback mode, picture data is printed by the control of the printer unit, and picture data which were photographed in the photographic mode can easily be printed in the playback mode.

In accordance with embodiments of the present invention, when the instruction device is operated, and the operating mode selected by the selection device is the photographic mode, because picture data stored in the first memory is provided, storing picture data in the first memory, picture data can easily be printed by operating only the instruction device.

In accordance with embodiments of the present invention, because the printer unit includes a display to display picture data, the picture data which is photographed and picture data which is printed can be displayed.

In accordance with embodiments of the present invention, because picture data which is stored in the first memory is displayed in the display, the playback picture data which is stored in the first memory can be displayed in the display.

In accordance with embodiments of the present invention, the printer unit includes a second memory, and because of transmitting the picture data to the second memory from the first memory, picture data can be displayed in the display using the second memory of the printer unit.

In accordance with embodiments of the present invention, the printer unit includes a release device, and photoelectrically converted picture data is stored in the first memory, by the operation of the release device in the printer unit.

In accordance with embodiments of the present invention, because the printer unit includes a storage device to store photosensitive, pressure-sensitive paper, and a paper feed device to forward the photosensitive, pressure-sensitive paper, and a conveyor device to convey the photosensitive, pressure-sensitive paper, and an exposure unit expose a latent image on the photosensitive, pressure-sensitive paper, and a development device to perform coloration of the latent image, an image can easily be printed without a built-in device which consumes ink and the like.

In accordance with embodiments of the present invention, because the paper feed unit includes a first ultrasonic motor which vibrates at a frequency above the audible frequency, the photosensitive, pressure-sensitive paper can be forwarded by the first ultrasonic motor without the generation of noise.

In accordance with embodiments of the present invention, because the first ultrasonic motor comprises a piezoelectric element and a vibration member adhered to the piezoelectric element, the photosensitive, pressure-sensitive paper can be forwarded by a simple mechanism.

In accordance with embodiments of the present invention, because an approximately parallelepipedal projection is formed on the vibration element and contacts the photosensitive, pressure-sensitive paper at one surface, the photosensitive, pressure-sensitive paper can be forwarded without development by the compressive force due to the ultrasonic vibration.

In accordance with embodiments of the present invention, because the light screening door is opened and closed according to the detachment or attachment of the storage unit, the photosensitive, pressure-sensitive paper stored in the storage unit can be prevented from being exposed to external light.

In accordance with embodiments of the present invention, the conveyor unit includes a freely rotatable first roller and a rotationally driven second roller, and because the photosensitive, pressure-sensitive paper is interposed between the first and second rollers, the photosensitive, pressure-sensitive paper can be forwarded to the exposure unit while being maintained at a constant speed. Accordingly, the latent image in the photosensitive, pressure-sensitive paper can be exposed without disturbance.

In accordance with embodiments of the present invention, because the development unit includes a second ultrasonic motor which vibrates at a frequency above the audible range, the photosensitive, pressure-sensitive paper can be reliably developed without the generation of noise.

In accordance with embodiments of the present invention, because the second ultrasonic motor is comprises a piezoelectric element and a vibration member adhered to the piezoelectric element, the photosensitive, pressure-sensitive paper can be developed with a simple mechanism, and the photosensitive, pressure-sensitive paper can simultaneously be moved. Accordingly, the printer unit can be of small form and light weight.

In accordance with embodiments of the present invention, because a projection which extends at right angles to the direction of movement of the photosensitive, pressure-sensitive paper is formed on the vibration member, the photosensitive, pressure-sensitive paper can be reliably, vibrationally compressed, and coloration of the latent image can be reliably performed.

In accordance with embodiments of the present invention, because the interval between the exposure unit and the development unit is made longer than the length of the photosensitive region of the photosensitive, pressure-sensitive paper in the movement direction, the photosensitive, pressure-sensitive paper can be stably moved at a constant speed. Accordingly, the exposure of the photosensitive, pressure-sensitive paper can be performed without disturbance.

Fifth Preferred Embodiment

A paper feed device in accordance with a fifth preferred embodiment of the present invention will now be described below with reference to FIGS. 45–53.

Figure 49:
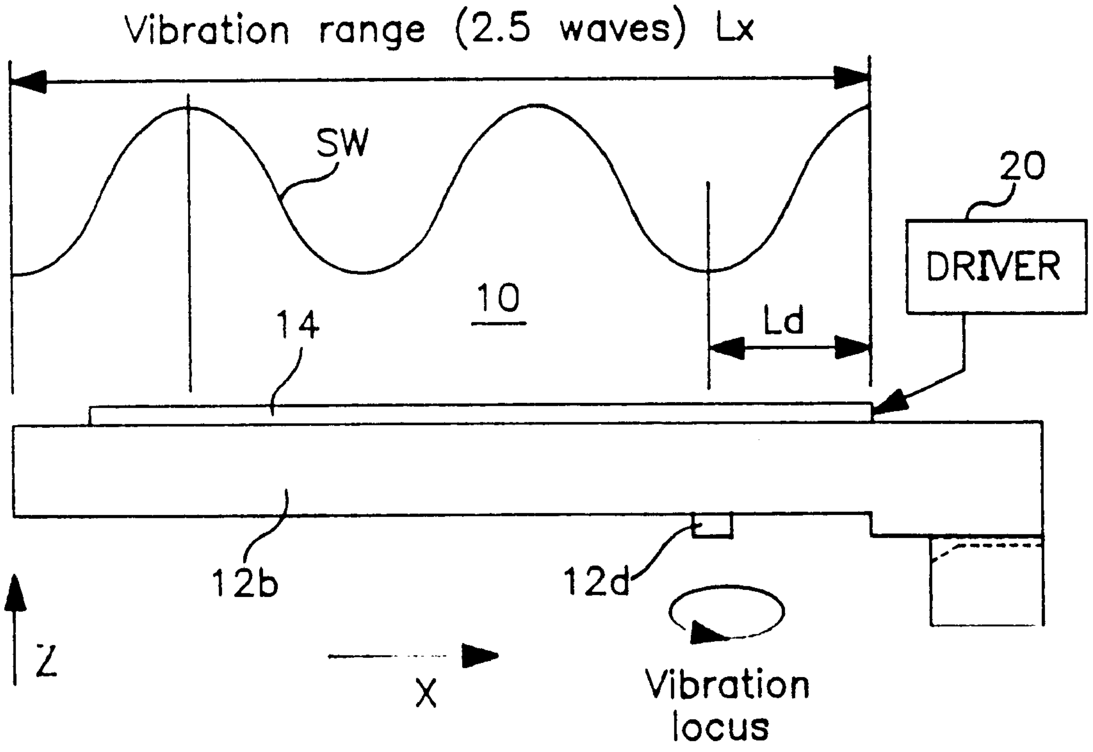
FIG. 49 is a block diagram showing a drive state of the paper feed head in accordance with the fifth embodiment of the present invention.
Figure 50:
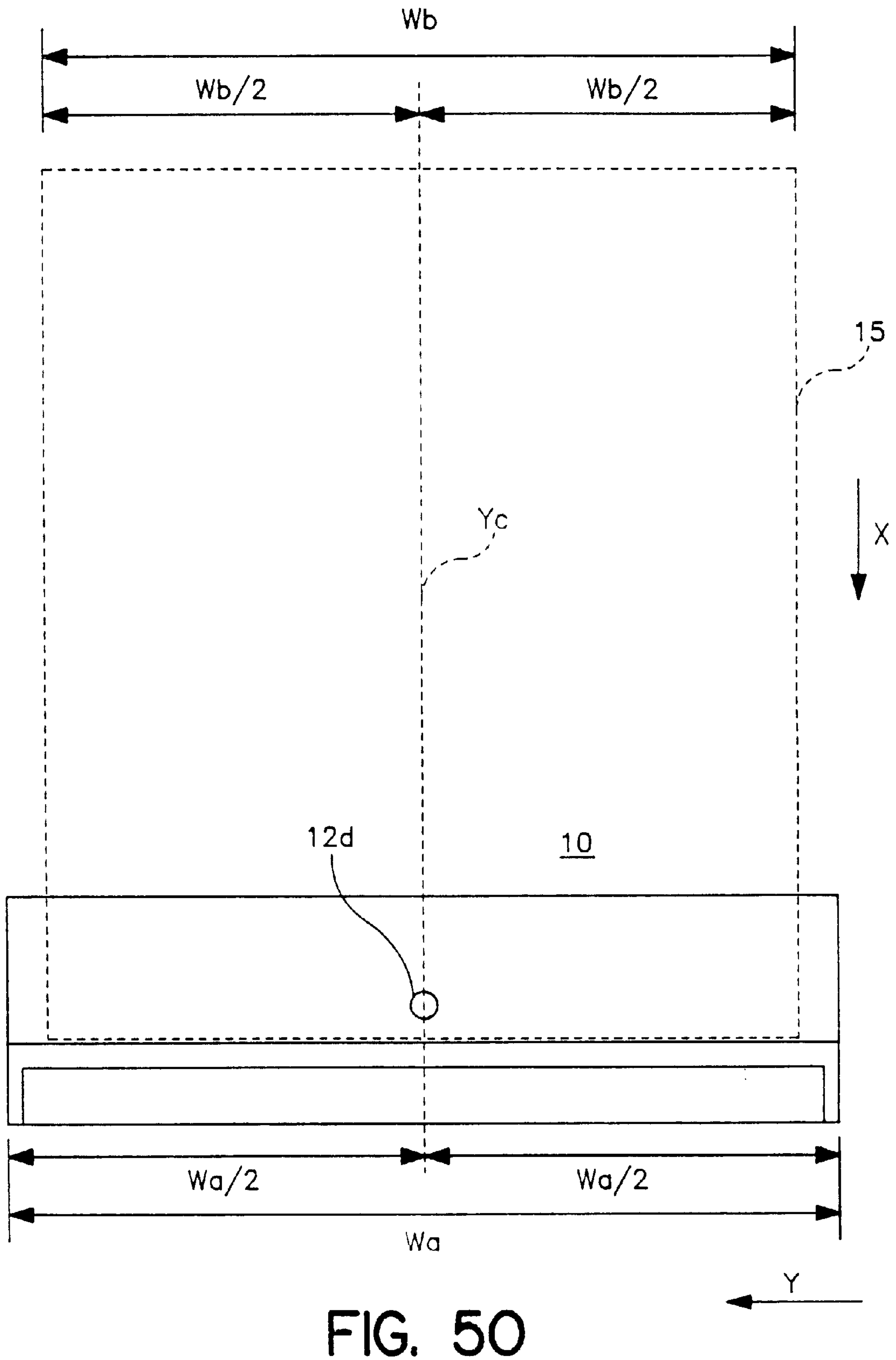
FIG. 50 is a bottom view of the paper feed head showing the positional relationships of the paper feed head and a delivered recording sheet in accordance with the fifth embodiment of the present invention.
Figure 51:
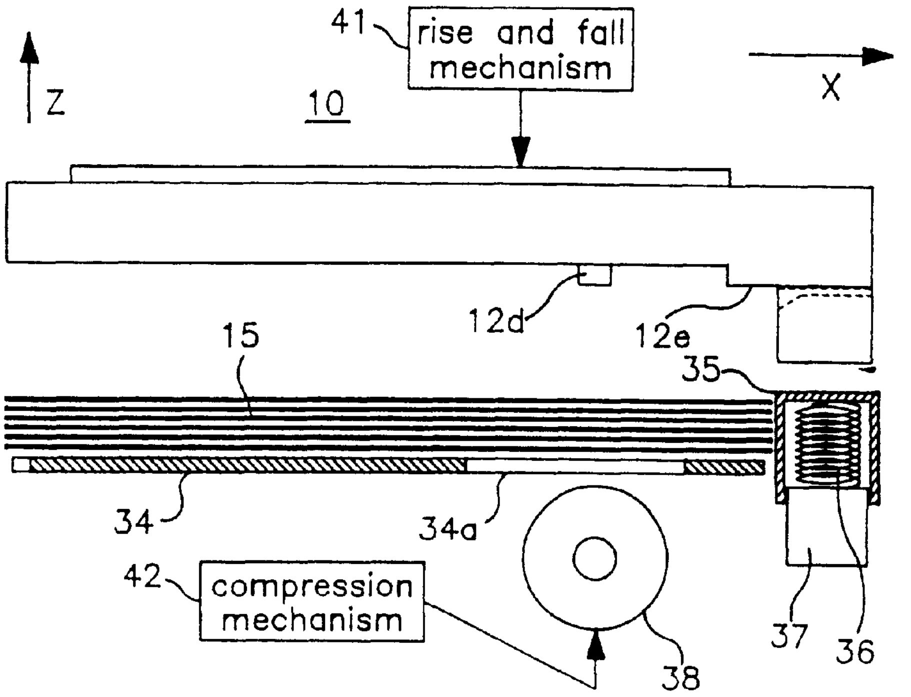
FIG. 51 is a front view of the paper feed device showing a main portion of the paper feed device in accordance with the fifth embodiment of the present invention.
Figure 52:
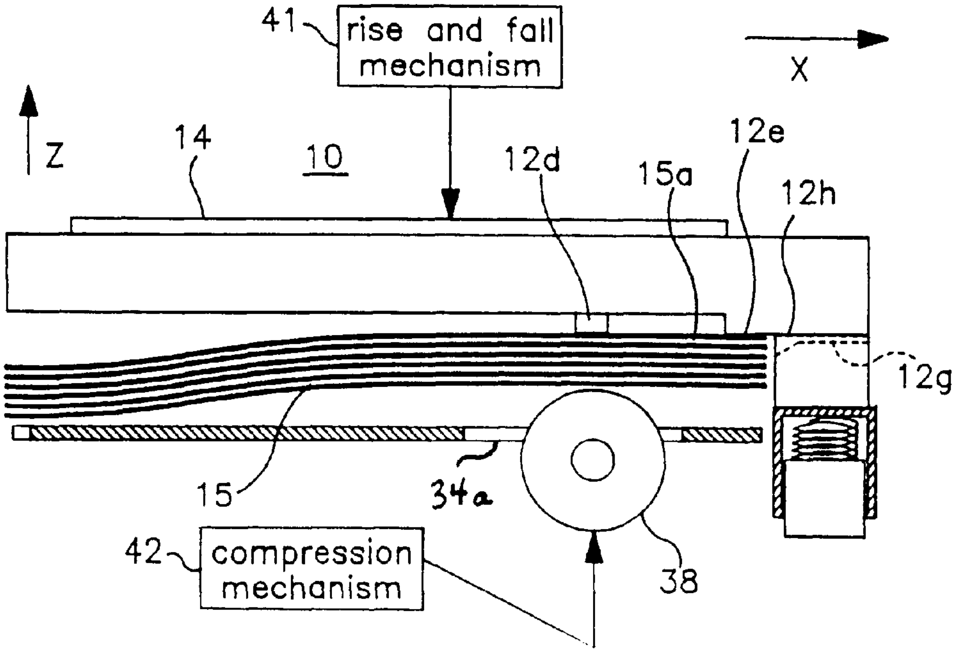
FIG. 52 is a front view of the paper feed device showing the main portion of the paper feed device in accordance with the fifth embodiment of the present invention.
Figure 53:
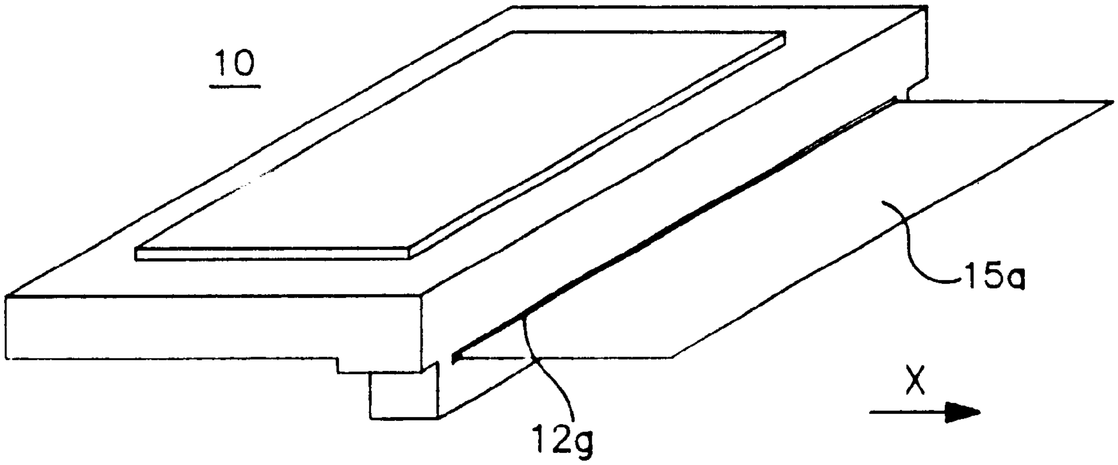
FIG. 53 is an oblique view of the paper feed head showing the positional relationships of the paper feed head and the delivered recording sheet in accordance with the fifth embodiment of the present invention.

FIGS. 45–48 illustrate a paper feed head which is part of a main unit of the paper feed device in accordance with the fifth preferred embodiment of the present invention. More particularly, FIGS. 45–48 respectively illustrate an oblique view, a front view, a left-hand side view and a bottom view of a paper feed head 10 of the paper feed device in accordance with the first embodiment of the present invention. FIG. 49 is a block diagram showing the drive state of the paper feed head 10; FIG. 50 is a bottom view of the paper feed head 10 showing the positional relationships of the paper feed head 10 and a delivered recording sheet 15; FIGS. 51 and 52 are front views of the main portion of the paper feed device; and, FIG. 53 is an oblique view of the paper feed head 10 showing the positional relationships of the paper feed head 10 and the delivered recording sheet 15 in accordance with the first preferred embodiment of the present invention.

The paper feed head 10 will now be described with reference first to FIGS. 45–48. The paper feed head 10 operates as an ultrasonic motor, and is used as a drive device to deliver recording sheets 15 one at a time. The paper feed head 10 includes a vibration member 12 in the form of a flat plate, preferably made of metal, and a piezoelectric element 14 integral with the vibration member 12, fixed adhesively to an upper surface 12*a* of the vibration member 12. The piezoelectric element 14 expands and contracts in the direction of the axis shown by the arrow X in the figures when a voltage is applied. By applying an alternating voltage to the piezoelectric element 14, mechanical vibrations are generated in the vibration member 12 which is integral with the piezoelectric element 14.

The upper surface 12*a* of the vibration member 12 is formed as a flat surface, but as described hereinbelow, the vibration member 12 comprises a plurality of portions having mutually different thicknesses, wherein the thickness dimension is in the direction of the arrow Z in the figures.

The vibration member 12 comprises a vibration unit 12*b* having a small thickness and occupying a comparatively large region, and a non-vibration unit 12*c* outside the vibration unit 12*b*, and which does not vibrate. When the piezoelectric element 14 is driven, the vibration unit 12*b* vibrates, and the non-vibration unit 12*c* does not vibrate. The vibration unit 12*b* is a rectangular region shown as the vibration range in FIGS. 46 and 48. Further, the vibration unit 12*b* is formed with one (1) projection 12d contacting the recording sheet 15 to drive the recording sheet 15. The vibration unit 12*b* has a constant thickness, except for the projection unit 12*d*.

The non-vibration unit 12*c* includes a guide portion 12*e* having a comparatively small thickness and a barrier portion 12*f* having a large thickness. A slit 12*g* is formed in the barrier portion 12*f*. The slit 12*g* is a through hole or aperture, which passes through the barrier portion 12*f* in the direction of the arrow X.

Figure 46:
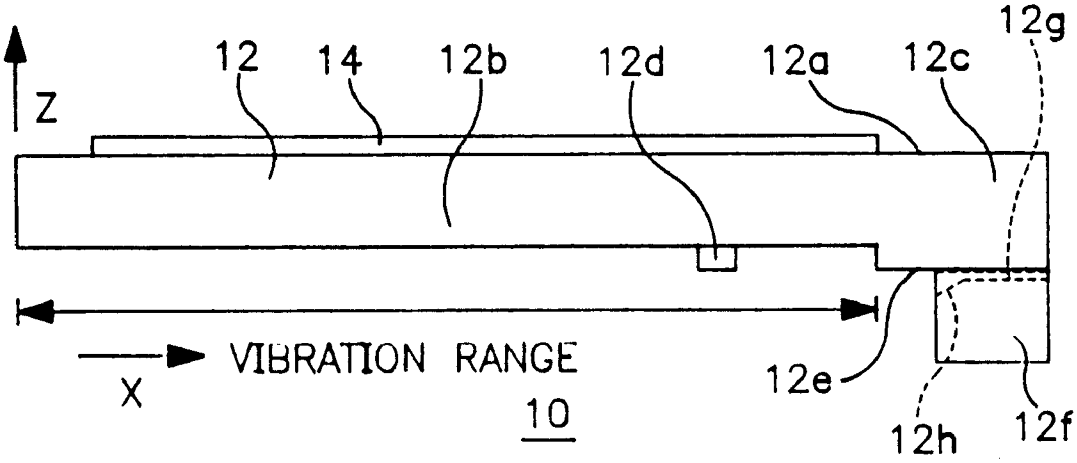
FIG. 46 is a front view of the paper feed head of the paper feed device in accordance with the fifth embodiment of the present invention.
Figure 47:
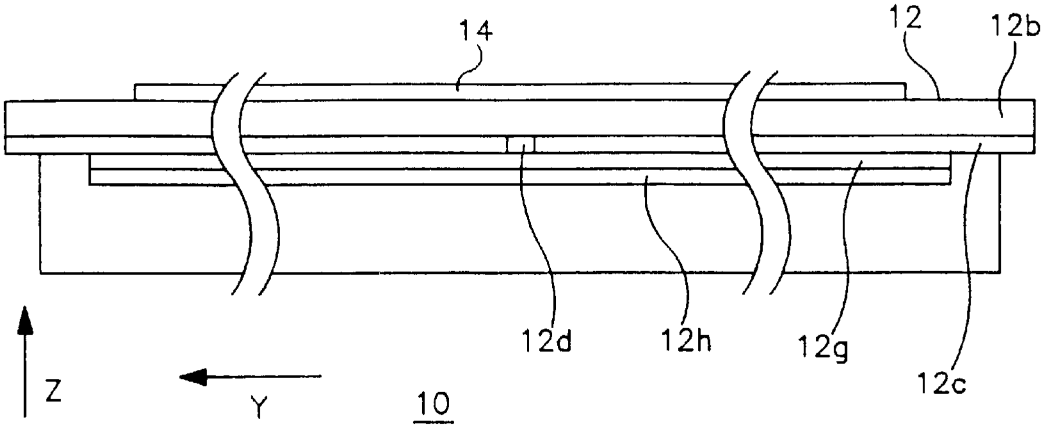
FIG. 47 is a left-hand side view of the paper feed head of the paper feed device in accordance with the fifth embodiment of the present invention.
Figure 48:
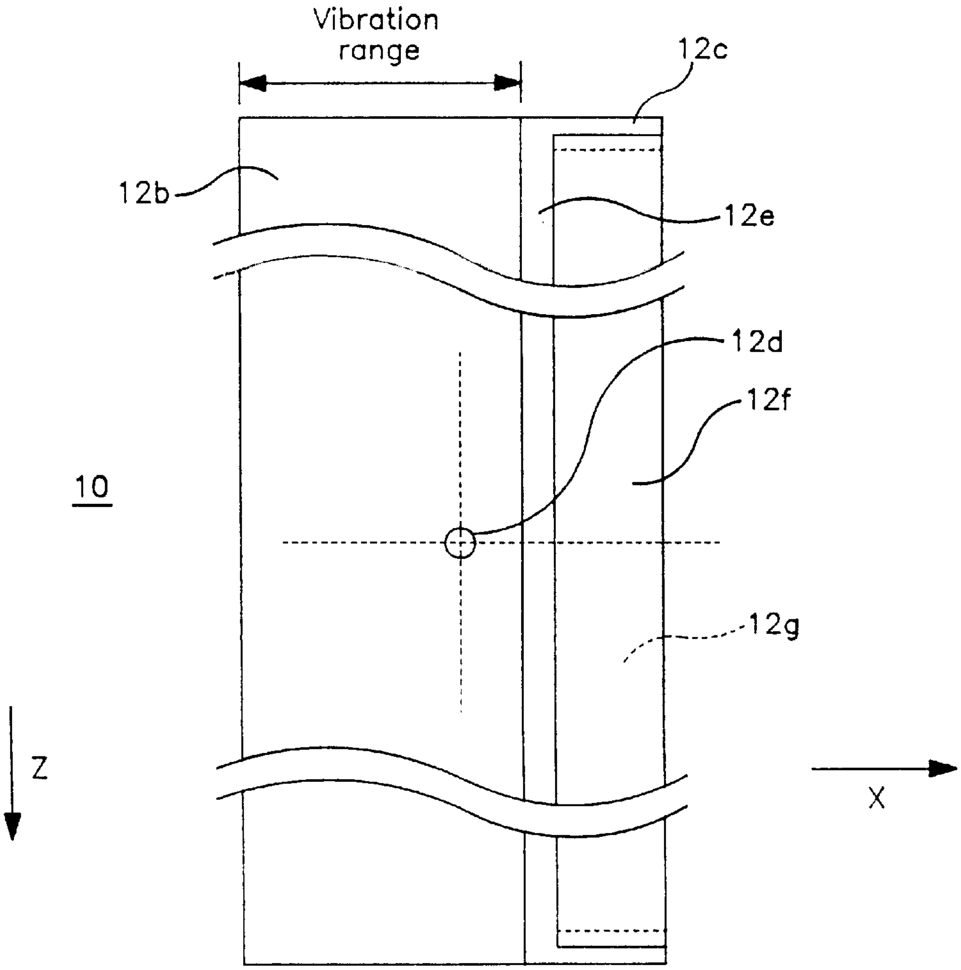
FIG. 48 is a bottom view of the paper feed head of the paper feed device in accordance with the fifth embodiment of the present invention.

The slit 12*g* includes a large portion having a uniform thickness, or approximately uniform thickness, and a tapered portion 12*h* formed in a left-hand side of the X direction of the slit 12*g*, as shown in FIG. 46. The thickness of the large portion of the slit 12*g* is greater than one (1) and less than two (2) thicknesses of the recording sheet 15. Preferably, the thickness of the large portion of the slit 12*g* is made about 1.5 times the thickness of a recording sheet 15. The tapered portion 12*h* is formed in the lower surface of the slit 12*g*, and is an inclined surface having constant inclination. As shown in FIG. 46, the thickness of the tapered portion 12*h* (i.e., the size of the aperture) is greatest at the left-hand side of the barrier portion 12*f*, and the thickness becomes smaller as the tapered portion 12*h* advances in the X direction toward the right-hand side of the barrier portion 12*f*. The thickness of the tapered portion 12*h* is preferably greater than the thickness of two (2) recording sheets 15.

The width of the slit 12*g* in the direction of the arrow Y is slightly larger than the greatest width of the recording sheet 15 being fed. Accordingly, the recording sheets 15 pass through the slit 12*g* one at a time. The width of the vibration member 12 in the direction of the arrow Y is of a little greater extent than the width of the slit 12*g*.

The thickness of the projection portion 12*d* of the vibration member 12 is the same as the thickness of the guide unit 12*e*. The bottom surface of the projection 12*d* and the bottom surface of the guide unit 12*e* are in the same height position.

As shown in FIG. 49, in order to cause the vibration unit 12*b* to vibrate, an alternating current electric power is applied by a driver 20 (FIG. 49) to the piezoelectric element 14. The alternating current electric power is preferably sinusoidal alternating current power having a constant frequency of 48 kHz. Furthermore, the electric power applied to the piezoelectric element 14 may include waveforms other than sinusoidal alternating current power, for example, the electric power applied to the piezoelectric element may be rectangular wave electric power.

If the piezoelectric element 14 is driven at a frequency of 48 kHz, the frequency of the vibration which is generated becomes 48 kHz, and because this frequency is higher than the human audible range, the generation of audible noise is reduced.

The thickness and the length of the vibration unit 12*b* in the X direction are adjusted beforehand according to the frequency of the electric power applied to the piezoelectric element 14. As shown in FIG. 49, when alternating current electric power is applied to the piezoelectric element 14, the vibration produces a standing wave SW in the vibration unit 12*b* as a result of the repeated expansion and contraction of the piezoelectric element 14.

The wave number of the standing wave SW produced in the vibration unit 12*b* is preferably 2.5 waves. Moreover, the center position of the projection 12*d* relative to the X direction is at a distance Ld of 0.5 waves from one end of the vibration unit 12*b*. The distance Ld has a magnitude of one fifth of the distance Lx of the vibration range of the vibration unit 12*b*.

As shown in FIG. 49, because the position of the projection 12*d* coincides with a peak of the waveform of the standing wave SW, a vibration having a large amplitude arises in the projection 12*d*. Furthermore, as shown in FIG. 49, the locus of the vibration generated in the position of the projection 12*d* becomes an ellipse.

As shown in FIG. 50, in accordance with the fifth embodiment of the invention, with respect to the Y direction, a center line Yc, which divides in half the width Wa of the paper feed head 10 in the Y direction, is set to coincide with the center of the recording sheet 15 in the width direction. The projection 12*d* is arranged on the center line Yc.

More specifically, a drive force is applied to the recording sheet 15 in the center portion of a width direction of the recording sheet 15 by the projection 12*d* to drive the recording sheet 15. The load with respect to the drive force is the weight and static frictional force of the recording sheet 15, and because the load is about uniform to the right and left of the projection 12*d*, the direction of the drive force and the direction of advance of the recording sheet 15 normally coincide. Because the projection 12*d* moves along the elliptical locus, when the projection 12*d* moves in the X direction, the projection 12*d* urges the recording sheet 15. By means of kinetic friction between the bottom surface of the projection 12*d* and the recording sheet 15, the projection 12*d* moves the recording sheet 15 in the X direction. On the other hand, when the projection 12*d* vibrates in a direction opposite to the X direction, the projection 12*d* is separated from the recording sheet 15. Accordingly, the projection 12*d* puts out the recording sheet 15 in the X direction. Proceeding in this manner, the recording sheet 15 can be delivered straight in the X direction.

FIG. 51 illustrates the main portions of the paper feed device in accordance with the fifth embodiment of the present invention. As shown in FIG. 51, the recording sheets 15 are positioned in a stack on a tray 34. In the state shown in FIG. 51, the movement of the recording sheets 15 in the X direction is regulated by a movable stop 35 located in the neighborhood of one end of the tray 34.

The movable stop 35 is hollow and is supported on a fixed member 37. The movable stop 35 is freely movable in the Z direction via a compression coil spring 36 arranged in its interior cavity while supported on the fixed member 37. In the state shown in FIG. 51, the movable stop 35 is raised by the force of the compression coil spring 36. The movable stop 35 can be pushed downward by applying a force from above.

As shown in FIG. 51, the paper feed head 10 is arranged on the upper side of one end of the recording sheets 15. The paper feed head 10 is movably supported in the Z direction by a rise and fall mechanism 41.

A press-up roller 38 is arranged in a position opposite the projection 12*d* of the paper feed head 10, with the recording sheets 15 sandwiched between the press-up roller 38 and paper feed head 10. The press-up roller 38 is supported in a freely rotatable state, and is capable of rising in the Z direction. The press-up roller 38 is coupled to a compression mechanism 42 which generates a force to raise the press-up roller 38.

As shown in FIG. 51, when a paper feed operation is not being carried out, the paper feed head 10 and the press-up roller 38 are respectively set in positions moved-away from the recording sheets 15. When the paper feed operation is being carried out, the paper feed head 10 is lowered to the predetermined position shown in FIG. 52 by the rise and fall mechanism 41. The press-up roller 38 presses up on the recording sheets 15 with a predetermined force through an aperture 34*a* of the tray 34.

The rise (compression) of the press-up roller 38 causes the surface of the uppermost recording sheet 15*a* of the recording sheets 15 to come in contact with the bottom surface of the projection 12*d* of the paper feed head 10 and the bottom surface of the guide portion 12*e*.

Because the projection 12*d* and the press-up roller 38 are arranged in mutually opposite positions, an about uniform force is applied at the contact surface of the projection 12*d* and the recording sheets 15. Because the contact force between the recording sheet 15 and projection 12*d* is a uniform force, no deformation and the like of the recording sheet 15 occurs.

Furthermore, since the position at which the press-up roller 38 comes into contact with the recording sheet 15 is close to the end of the recording sheet 15 in the direction of the arrow X, even though the pressed-up portion of the recording sheet 15 is not supported at the surface, the end of the recording sheet 15 is arranged in a position to come into contact with the bottom surface of the guide unit 12*e* of the paper feed head 10 or close to the bottom surface of the guide unit 12*e*.

With the paper feed device in the state shown in FIG. 52, when a predetermined alternating current electric power is applied to the piezoelectric element 14 of the paper feed head 10, ultrasonic vibrations are repeated such that the projection 12*d* describes an elliptical locus. The ultrasonic vibration causes the upper side of the recording sheet 15*a*, which is in contact with the projection 12*d*, to be delivered in the direction of the arrow X. As shown in FIG. 53, the recording sheet 15*a* is sent in the X direction through the slit 12*g*.

Since the recording sheets 15 are stacked, there is a possibility that two or more recording sheets 15 are delivered from the tray 34 in the unchanged superposed state, as a result of the effect of the frictional force between the mutually superposed recording sheets 15.

However, because the thickness of the slit 12*g* is smaller than two (2) recording sheets 15, two (2) or more superposed recording sheets 15 do not simultaneously pass through the slit 12*g*. Moreover, because the tapered portion 12*h* having a thickness that gradually changes is formed close to the aperture at the entry side of the slit 12*g*, at the time of the paper feed operation the recording sheets 15 are separated one (1) at a time, as shown in FIG. 53. Therefore, except for the top recording sheet 15*a*, more recording sheets 15 are prevented from entering the slit 12*g* by coming up against the inclined surface of the tapered portion 12*h*.

The tapered portion 12*h* is close to the aperture at the entry side of the slit 12*g*. Because the aperture has a thickness equivalent to the thickness of two (2) or more recording sheets 15, even when there is a temporary curvature or roughness of the recording sheets 15, the uppermost recording sheets 15*a* can reliably enter the slit 12*g*.

When the uppermost recording sheet 15*a* has been completely delivered, the recording sheets 15 are pressed up by the compression force of the press-up roller 38 by the thickness of a recording sheet 15*a*. The recording sheet 15*a* which was the second of the recording sheets 15 moves to a position where it contacts the projection 12*d* and the guide portion 12*e* of the paper feed head 10. Then, the paper feed operation described above is then repeated.

Furthermore, in accordance with the fifth preferred embodiment of the present invention, the recording sheets 15 are preferably special paper, for example, the recording sheets 15 may be photosensitive paper, and have a photosensitive surface on one side, and no photosensitive layer on the other side. Moreover, the recording sheets 15 preferably have the property of color formation when pressure is applied to the photosensitized portion.

There are cases in which curvature or roughness of the recording sheets 15 occurs as a result of non-uniformity of the materials which the recording sheets 15 comprise or as a result of the temperature and humidity of the surroundings in which the recording sheets 15 are kept. However, paper feed can be performed without particular impediment even when other types of paper or material are used as the recording sheets 15, such as general recording paper, paper for overhead projector OHP use, telephone cards, credit cards and the like plastic cards.

Furthermore, in accordance with the fifth preferred embodiment of the invention, a movable stop 35 is used to regulate the movement of the recording sheet 15 on the tray 34. However, the present invention is not limited to a movable stop, and a fixed general stop may also be used. However, if a fixed general stop is used, it is necessary to machine a notch or the like in the barrier portion 12*f* so that the fixed stop and the barrier portion 12*f* of the paper feed head 10 do not collide.

Sixth Preferred Embodiment

Figure 54:
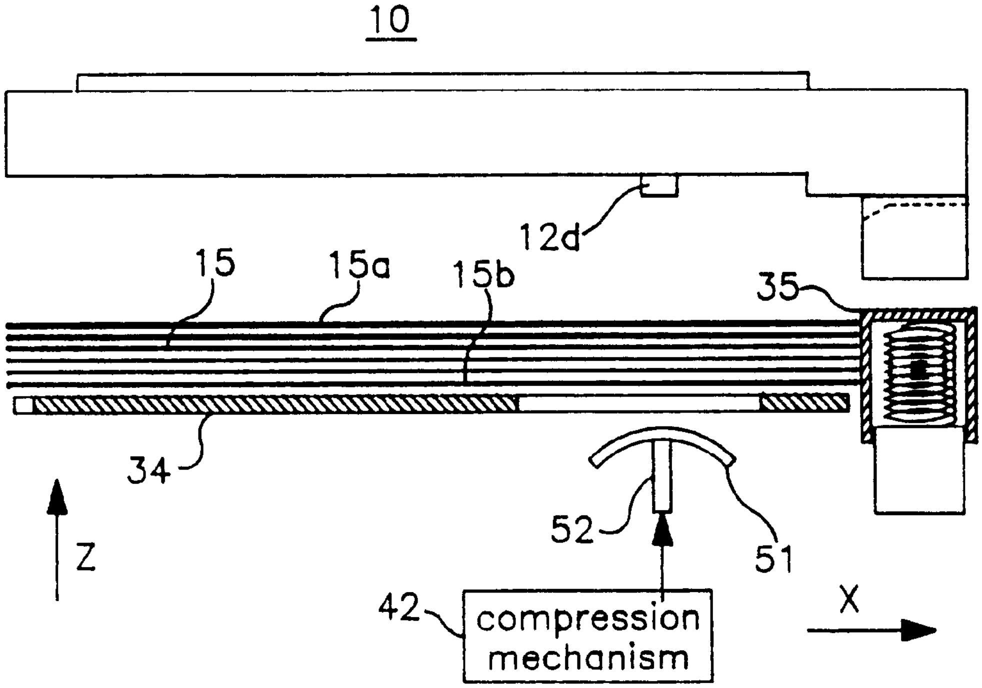
FIG. 54 is a front view diagram showing the main portions of a paper feed device in accordance with a sixth embodiment of the present invention.

FIG. 54 is a side view of a paper feed device in accordance with a sixth preferred embodiment of the present invention. Elements which are the same as or similar to those described with respect to the fifth embodiment of the invention are referred to by the same reference symbols and numerals, and a detailed description of the like elements will not be repeated here.

As shown in FIG. 54, a convex plate 51 projects upward and has a fixed curvature with respect to the X direction. A press-up member 52 is connected to the convex plate 51. The convex plate 51 and the press-up member 52 are arranged in a position opposite the projection 12*d* of the paper feed head 10, with the recording sheet 15 sandwiched between the projection 12*d* and the paper feed head 10.

The convex plate 51 has a width in the Y direction (the direction perpendicular to the plane of the paper in FIG. 54) which is the same as or greater than the width of the projection 12*d* in the Y direction shown in FIG. 1. The convex plate 51 is set in a position in which the center of the convex plate 51 in the Y direction is opposite the projection 12*d*.

At the time when paper feed is not performed, the convex plate 51 is arranged in the moved-away position shown in FIG. 54. When the paper feed operation is performed, the convex plate 51 is pressed up by a compression mechanism 42 via the press-up member 52. The convex plate 51 presses up on the recording sheets 15 until reaching a position in which the uppermost recording sheet 15*a* comes into contact with the projection 12*d*.

Because of the curvature of the contact portion of the convex plate 51 with the recording sheet 15, the friction between the convex plate 51 and the recording sheet 15 is comparatively small. Because of the comparatively small friction between the convex plate 51 and the recording sheet 15, even when feeding the lowermost sheet 15*b* of the recording sheets 15 in contact with the convex plate 51, the lowermost sheet 15*b* can be reliably delivered.

Seventh Preferred Embodiment

Figure 55:
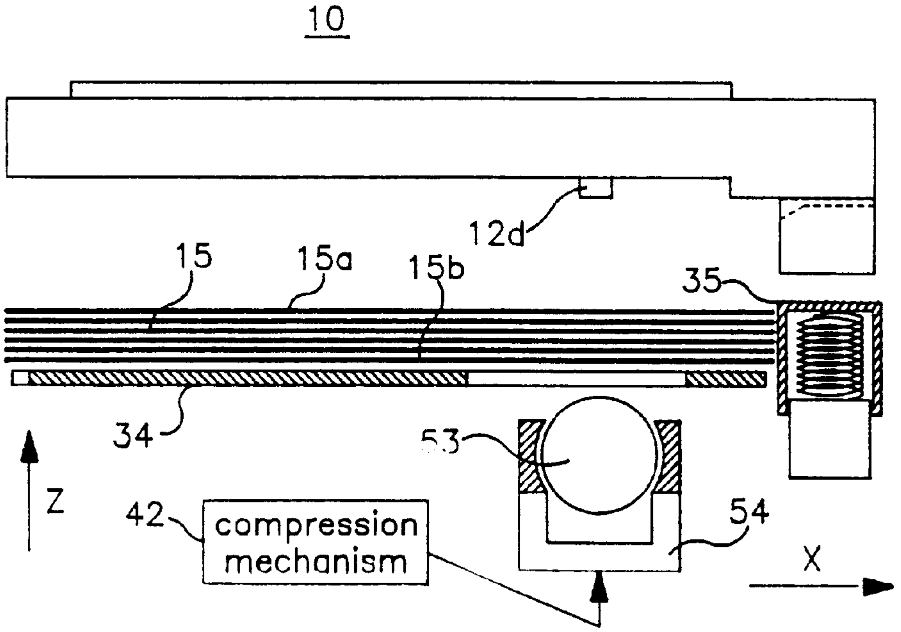
FIG. 55 is a front view diagram showing the main portions of a paper feed device in accordance with a seventh embodiment of the present invention.

FIG. 55 illustrates a paper feed device in accordance with a seventh preferred embodiment of the present invention. Elements which are the same as or similar to those described with respect to the fifth embodiment of the present invention are referred to by the same reference numerals and symbols and a detailed description of the like elements will not be repeated here.

Referring to FIG. 55, a ball 53 is arranged in a position opposite the projection 12*d* of the paper feed head 10, with the recording sheet 15 sandwiched between the ball 53 and the projection 12*d*. The ball 53 is spherical and is supported by a support member 54 such that it can freely rotate in forward and backward, up and down, right and left directions. The ball 53 is arranged so that a portion of the ball 53 is exposed above the top part of the support member 54.

When a paper feed operation is not performed, the ball 53 is arranged in the moved-away position shown in FIG. 55. When the paper feed operation is performed, the ball 53 is pressed upward via the support member 54 by the compression mechanism 42. The ball 53 then presses up on the recording sheet 15 until reaching a position in which the uppermost recording sheet 15*a* comes into contact with the projection 12*d*.

Because the portion of the ball 53 which contacts the recording sheet 15 has a curved surface, and the ball 53 is freely rotatable, the recording sheet 15*b* can move freely with no restriction. Accordingly, even when performing paper feed of the lowermost recording sheet 15*b* of the recording sheets 15 in contact with the convex plate 51, the recording sheet 15*b* can be reliably delivered.

Eighth Preferred Embodiment

Figure 56:
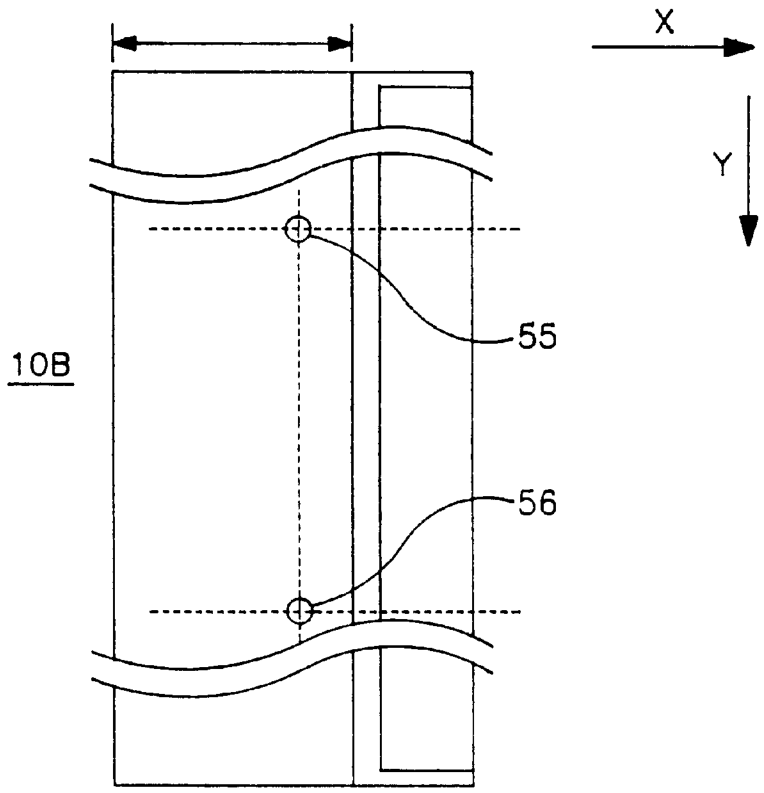
FIG. 56 is a bottom view of the paper feed head in accordance with an eighth embodiment of the present invention.
Figure 57:
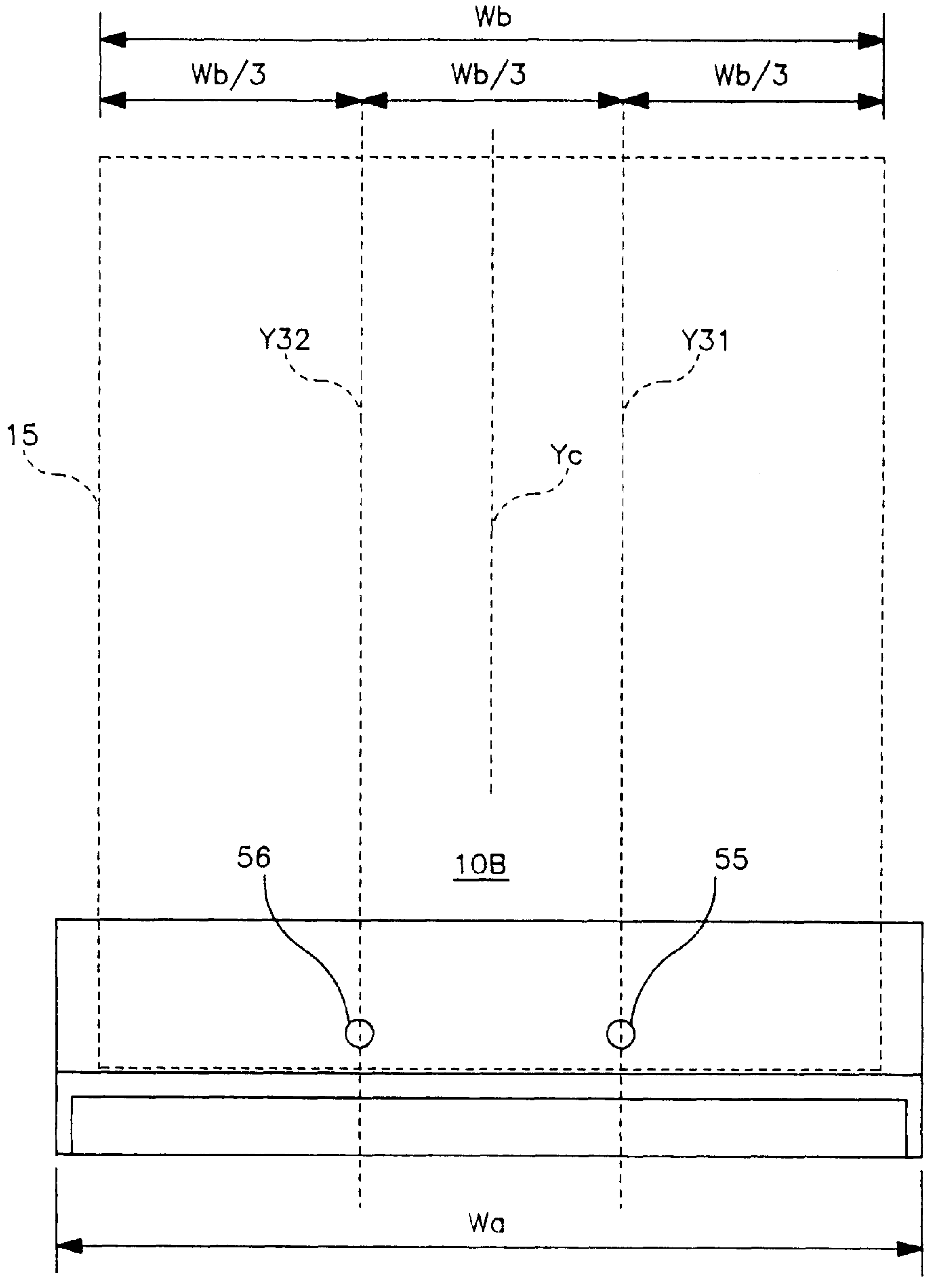
FIG. 57 is a bottom view showing the positional relationships of the paper feed head and the recording sheet in accordance with the eighth embodiment of the present invention.

FIGS. 56 and 57 are bottom surface diagrams of a paper feed head 10B in accordance with an eighth preferred embodiment of the present invention. Elements which are the same as or similar to those described with respect to the fifth embodiment of the present invention are referred to by like reference numerals, and a detailed description of these like elements will not be repeated here.

Figure 45:
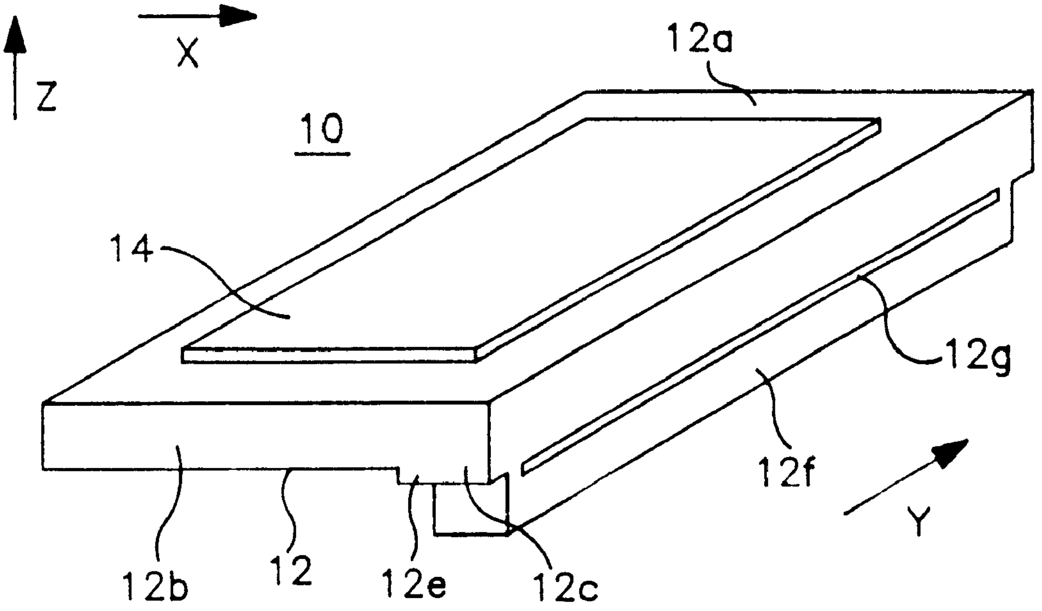
FIG. 45 is an oblique view of a paper feed head of a paper feed device in accordance with a fifth embodiment of the present invention.

The structure and function of the paper feed head 10B are similar to that of the paper feed head 10 shown in FIG. 45. However, the paper feed head 10B includes two projections 55 and 56. The structure and form of the projections 55, 56 are similar to the projection 12*d*.

The projections 55, 56 are formed in positions with respect to the X direction which are the same as the position of the projection 12*d*. As shown in FIG. 57, the positions of the projections 55, 56 in the Y direction are on axes Y31 and Y32, respectively, at a third of the width Wb of the recording sheet 15 which passes through the paper feed head 10B. More specifically, the two (2) projections 55 and 56 are arranged at mutually equal distances from the center axis Yc in the width direction.

When using the paper feed head 10B to feed a recording sheet 15, because the drive force to feed the paper is applied by the two (2) projections 55 and 56, which are symmetrically positioned with respect to the center (Yc) of the recording sheet 15, the direction of the total drive force applied to the recording sheet 15 is in the direction along the arrow X in FIG. 56, the same as the drive force at the respective positions of the projections 55, 56.

Accordingly, the recording sheets 15 are delivered, without curvature, straight in the direction of the arrow X. Moreover, twice the drive force is obtained when two projections 55, 56 are provided in comparison with one projection.

Ninth Preferred Embodiment

Figure 58:
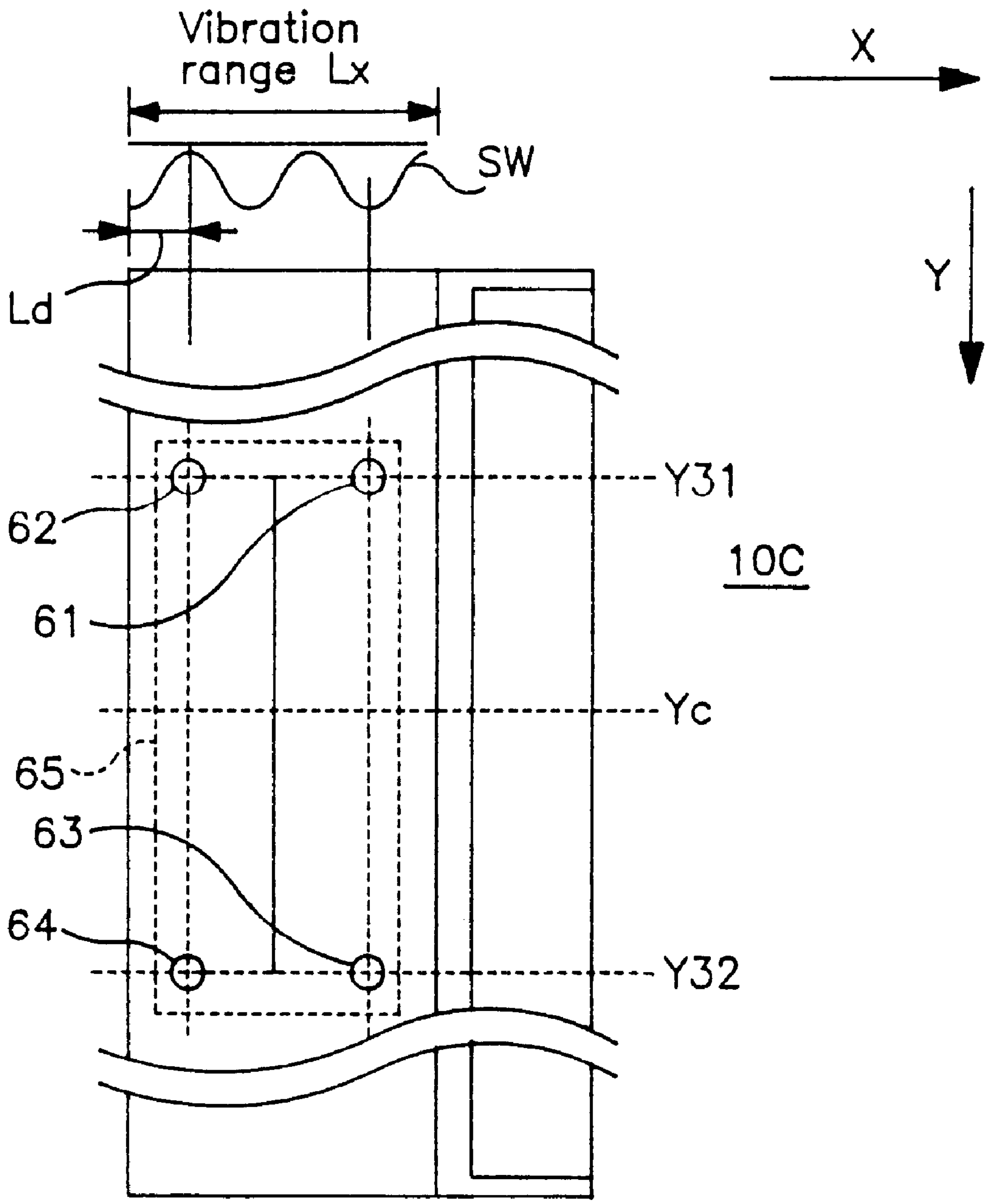
FIG. 58 is a bottom view diagram of the paper feed head in accordance with a ninth embodiment of the present invention.
Figure 59:
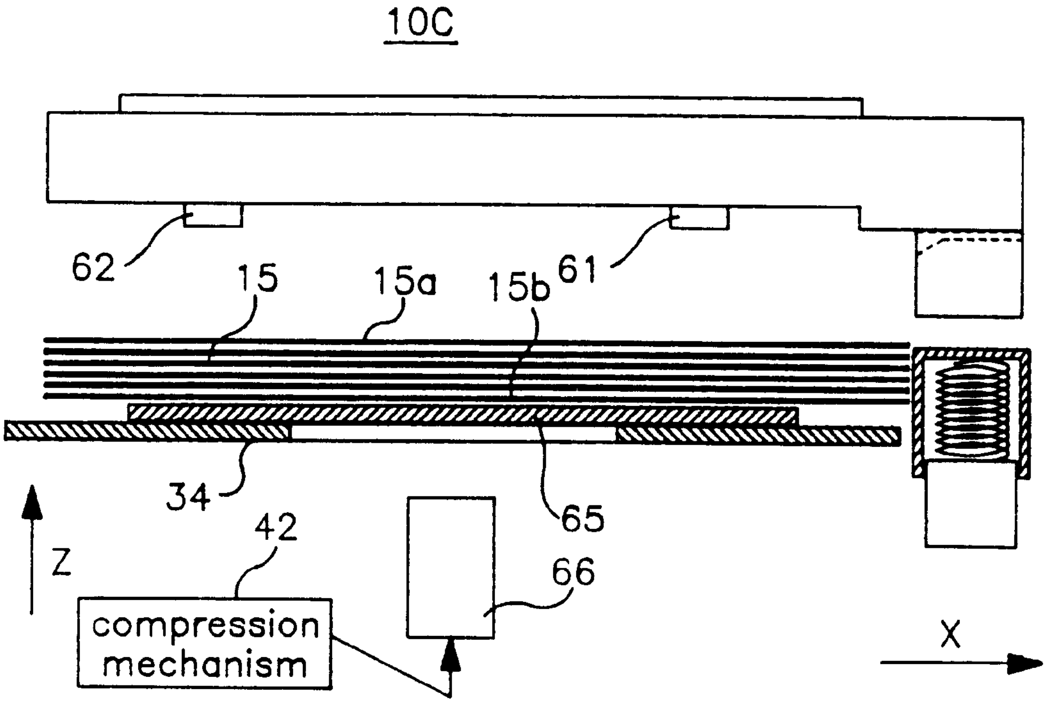
FIG. 59 is a front view diagram showing the main portions of a paper feed device in accordance with the ninth embodiment of the present invention.
Figure 60:
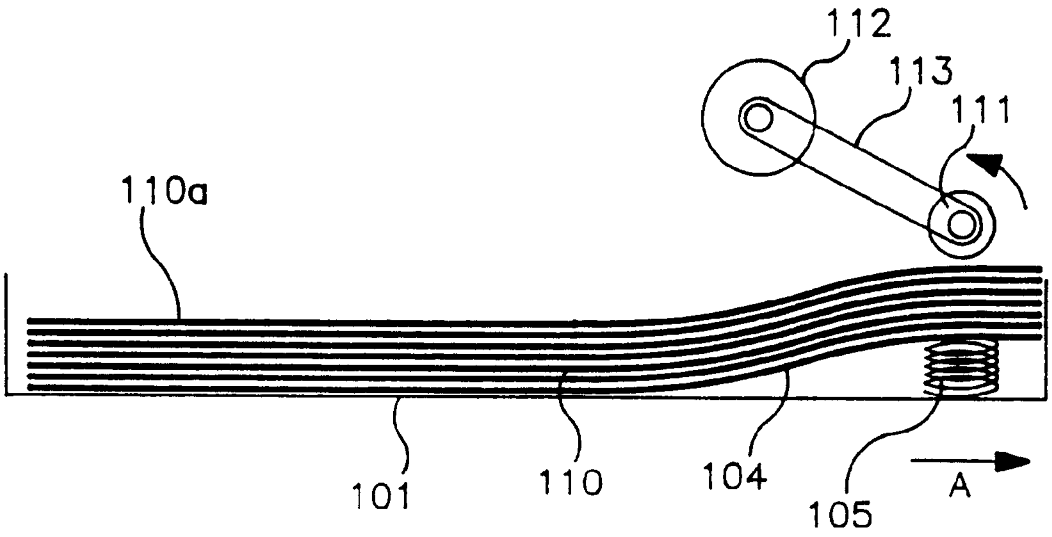
FIG. 60 PRIOR ART
FIG. 60 is a front view diagram showing a prior art paper feed device.

FIG. 57 illustrates a bottom surface diagram of a paper feed head 10C in accordance with a ninth preferred embodiment of the invention. FIG. 58 illustrates main portions of a paper feed device which uses the paper feed head 10C in accordance with the fifth preferred embodiment of the invention. Elements which are the same as or similar to those described with respect to the fifth embodiment of the present invention are referred to by like reference numerals, and a detailed description of these like elements will not be repeated here.

The structure and operation of the paper feed head 10C are similar to that of the paper feed head 10 shown in FIG. 45. However, the paper feed head 10C includes four (4) projections 61, 62, 63 and 64. The structure and configuration of the four (4) projections 61, 62, 63 and 64 are similar to the projection 12*d*.

The positions at which the projections 61 and 63 are formed in the X direction are the same as the projection 12*d*. The projections 62 and 64 are formed in the X direction at positions at a distance Ld of 0.5 wave of the standing wave SW from the left-hand end of the vibration range. The distance Ld is one-fifth of the distance Lx of the vibration range of the vibration unit 12*b*.

More particularly, the four (4) projections 61, 62, 63 and 64 are all arranged in positions which coincide with the top parts of peaks of the waveform of the standing wave SW. Accordingly, vibrations of large amplitude arise in the respective portions of the four (4) projections 61, 62, 63 and 64.

The vibration locus in the positions of the projections 62 and 64 is elliptical, in the same positions of the projections 61, 63.

As shown in FIG. 57, the Y direction positions of the projections 61, 62, 63, 64 are on axes Y31 and Y32. The axes Y31, Y32 are at positions which divide the width Wb of the recording sheet 15 which passes through the paper feed slit 10C into three (3) equal parts. More particularly, the four (4) projections 61, 62, 63 and 64 are arranged at equal distances from the center axis Yc in the width direction.

In the case of paper feed of the recording sheet 15 using the paper feed head 10C in order for paper feed by the projections 61, 62, 63 and 64 in positions which are symmetrical with respect to the center line (Yc) of the recording sheet 15, the total drive force which is applied to the paper sheets 15 is the same as the drive force at the position of the respective projections 61, 62, 63, 64, and is in the direction along the arrow X in FIGS. 57 and 58.

Accordingly, the recording sheets 58 are delivered, without curvature, straight in the direction of the arrow X. Moreover, when four projections 61, 62, 63, 64 are disposed in the paper feed head 10C, four times the drive force is obtained in comparison with the first embodiment of the present invention.

As shown in FIG. 58, the neighborhood of the end of the recording sheet 15 is located on the tray 34 via the press-up plate 65. The press-up plate 65 is preferably a thin metal sheet having a flat surface. The press-up plate 65 is supported on the tray 34 in a state capable of movement only in the direction of the arrow Z in FIG. 15, that is, in the thickness direction of the recording sheet 15.

As shown in FIG. 57, the surface of the press-up plate 65 has a rectangular form, larger than the rectangle of the respective top points of the four (4) projections 61, 62, 63, 64. The center of the press-up plate 65 is located in the center of the rectangle of the top points of the four (4) projections 61, 62, 63, 64.

A press-up member 66 is arranged in a position opposite the central portion of the press-up plate 65 and below the press-up plate 65. The press-up member 66 is movably supported in the Z direction, and is connected to a compression mechanism 42.

As shown in FIG. 58, when paper feed is not being performed, the press-up member 66 is arranged in a moved-away position. In the case that paper feed is performed, the press-up plate 65 is pressed up while being kept horizontal via the press-up member 66 and the compression mechanism 42. The press-up plate 65 presses the recording sheet 15 upward as far as a position in which the uppermost recording sheet 15*a* is able to come into contact with the projections 61, 62, 63, 64.

In this case, the recording sheet 15 and the projections 61, 62, 63 and 64 come uniformly into contact with mutually equal pressures. Accordingly, the drive forces arising at the positions of the four (4) projections 61, 62, 63 and 64 are also uniform.

Because the press-up plate 65 is a metal sheet which has a flat surface, the frictional force between the press-up plate 65 and the recording sheets 15 is comparatively small. Accordingly, even when feeding of the lowermost sheet 15*b* of the recording sheets 15 in contact with the press-up plate 65, the lowermost sheet 15*b* can be reliably delivered.

In accordance with embodiments of the present invention, the frequency of the alternating current component of the electric power applied to the piezoelectric element may be higher than the human audible frequencies, and because the frequency of the vibration arising in the sheet drive mechanism is high, the generated noise becomes difficult for human ears to hear.

In accordance with embodiments of the present invention, even when plural sheets are delivered, still in the superposed state, only one (1) sheet passes through the slit. In particular, by passing through the slit of the sheet separation unit, the superposed sheets are separated and delivered one at a time.

In accordance with embodiments of the present invention, an electric motor, paper feed roller and belt are not necessary for a paper feed drive mechanism, and a smaller size and lighter weight are possible, noise generation can be reduced, and durability is improved.

In accordance with embodiments of the present invention, because the thickness of the tapered portion gradually decreases accompanying the forward travel of the sheets, when two (2) or more sheets have entered the aperture in the unchanged superposed state, one sheet comes into contact with the inclined surface of the tapered portion, and the entry of more than one sheet is regulated. Accordingly, two (2) or more superposed sheets are separated by the tapered portion, and only one sheet passes through the slit.

Moreover, because the thickness of the aperture portion of the slit is large, even when the sheet end has curvature or roughness, one (1) or more sheets are caused to enter the slit.

In accordance with embodiments of the invention, the uppermost one (1) sheet is delivered by the projection, and can enter the slit. Guiding the sheet in the sheet separation unit without vibration, the path of movement of the sheet can be controlled. Accordingly, one sheet delivered by the projection can be guided, without bending, by the sheet separation unit.

In accordance with embodiments of the present invention, because the drive force to deliver the sheet is applied at the center of the sheet, there is a load with respect to the drive force, and the weight and static frictional force of the sheet become about equal to the right and left (width direction) of the position where the drive is applied. Accordingly, it is difficult to change the direction of travel of the sheet, and the sheet travels straight in the direction of the applied drive force.

In accordance with embodiments of the present invention, because the drive force to deliver a sheet is uniformly applied to the right and left with respect to the center of the sheet, there is a load with respect to the drive force, the weight and static frictional force of the sheet become about equal to the right and left (width direction) with respect to the sheet center. Accordingly, it is difficult to change the direction of travel of the sheet, and the sheet travels straight in the direction of the applied drive force.

In accordance with embodiments of the present invention, because drive forces are applied to the sheet in plural respective positions, a comparatively large force is applied to the sheet, and the paper feed operation can be performed with good efficiency.

In accordance with embodiments of the present invention, the top portions of two peaks of the vibration waveform have a large amplitude of vibration. Accordingly, by arranging the projections in the neighborhood of the peaks of the vibration waveform position, the sheet can be more efficiently moved.

The present invention is not limited to the embodiments described above, and various modifications are possible within the scope of the invention.

For example, the state of contact of the sheet and the projection can be adjusted. Furthermore, state of contact of the plural projections and the sheet can be made uniform. Moreover, the last sheet remaining on the tray can be delivered.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable electronic camera system, comprising:

a camera unit comprising:

an image conversion and storage device to photoelectrically convert an optical image to picture data, a first memory, a first release device to store in the first memory the picture data photoelectrically converted by the image conversion and storage device; and a printer unit comprising:

a print device, and an instruction device to instruct commencement of printing of the picture data by the print device, wherein the instruction device is separately disposed from the first release device.

2. A portable electronic camera, comprising:

a camera unit comprising:

an image conversion and storage device to photoelectrically convert an optical image to picture data, and a first memory to store the picture data;

a printer unit comprising:

a print device to print the picture data;

a first connection device in the camera unit to connect the camera unit and the printer unit in a mutually detachable state;

a first communication device in the camera unit to communicate the picture data and control information between the camera unit and the printer unit;

a second connection device in the printer unit to connect the camera unit and the printer unit in a mutually detachable state; and a second communication device in the printer unit to communicate the picture data and the control information between the camera unit and the printer unit.

3. The portable electronic camera as recited in claim 2, wherein the first connection device is in a position on a side opposite to the optical image, and the second connection device is in a position facing the optical image.

4. The portable electronic camera as recited in claim 2, wherein the printer unit comprises a display to display the picture data.

5. The portable electronic camera as recited in claim 2, wherein the camera unit further comprises a first release device to store in the first memory the picture data photoelectrically converted by the image conversion and storage device, and the printer unit further comprises a second release device to store in the first memory the picture data photoelectrically converted by the image conversion and storage device.

6. The portable electronic camera as recited in claim 5, wherein the first release device is in a position separated from a center of the camera unit, and the second release device is arranged in a position opposite the first release device, with respect to the center of the camera unit.

7. The portable electronic camera as recited in claim 5, wherein when at least one of the first release device and the second release device operates, the camera unit stores the picture data in the first memory.

8. The portable electronic camera as recited in claim 5, further comprising:

an instruction device to instruct commencement of printing of the picture data by the printer device.

9. The portable electronic camera as recited in claim 8, wherein the instruction device is opposite to the second release device with respect to the center of the camera unit.

10. The portable electronic camera as recited in claim 8, wherein the camera unit further comprises a selection device to select an operating mode, where an operation of the second release device and the instruction device control the storing of the picture data to the first memory and the commencement of printing, according to the operating mode selected by the selection device.

11. The portable electronic camera as recited in claim 10, wherein when the operating mode selected by the selection device is a photographic mode, and when the second release device and the instruction device are actuated together, the camera unit stores the picture data in the first memory, and the printer unit prints the picture data stored in the first memory.

12. The portable electronic camera as recited in claim 10, wherein when the instruction device is actuated, and the operating mode selected by the selection device is a playback mode, the printer unit prints the picture data.

13. The portable electronic camera as recited in claim 10, wherein when the instruction device is actuated, and the operating mode selected by the selection device is a photography mode, the printer unit prints the picture data stored in the first memory.

* * * * *